United States Patent [19]

Sammon et al.

[11] 3,755,780

[45] Aug. 28, 1973

[54] METHOD FOR RECOGNIZING CHARACTERS

[75] Inventors: John Sammon, Utica; Jon Sanders, New York, both of N.Y.

[73] Assignee: Pattern Analysis & Recognition Inc., Rome, N.Y.

[22] Filed: June 28, 1971

[21] Appl. No.: 157,443

[52] U.S. Cl. .............. 340/146.3 AC, 340/146.3 AE

[51] Int. Cl. ............................................ G06k 9/10

[58] Field of Search ......... 340/146.3 AC, 146.3 AE, 340/146.3 FT, 146.3 AQ, 146.3 S, 146.3 R, 146.3 D, 146.3 Q, 146.3 Y

[56] References Cited

UNITED STATES PATENTS

| | | | |
|---|---|---|---|
| 3,609,685 | 9/1971 | Deutsch | 340/146.3 AE |
| 3,111,646 | 11/1963 | Harmon | 340/146.3 AQ |
| 3,290,650 | 12/1966 | Bailey, Jr. et al. | 340/146.3 AC |
| 3,297,993 | 1/1967 | Clapper | 340/146.3 AE |

OTHER PUBLICATIONS

Grimsdale et al., "A System for the Automatic Recognition of Patterns," Proc. of IEEE, Vol. 106, Pt.B, No. 26, March 1959, Pages 210–221.

Kuhl, "Classification and Recognition of Hand-Printed Characters," IEEE International Convention Record (Part 4), 1963, pages 75–93.

*Primary Examiner*—Thomas A. Robinson
*Attorney*—George Gottlieb, Michael I. Rackman et al.

[57] ABSTRACT

A method for recognizing a digitized character. The shape of the character is represented by the number, positions and shapes of alternating contour convexities, as viewed from two sides of the character. The number and positions of the convexities define the sort group of the character, there being nine sort groups in the systems described. Each sort group has associated with it a separate linear discriminant logic test for every pair of characters which share the sort group. Depending on the sort group of the character to be recognized, the associated pairwise discriminant tests are performed, and the character class which passes a specified number of the tests is identified as the class of the character to be recognized.

131 Claims, 18 Drawing Figures

INVENTORS
JOHN SAMMON
JON SANDERS
BY Gottlieb Rackman & Reisman
ATTORNEYS

FIG. 2

COLUMNS

| ROWS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | | | | | | | | | | | | | | | | | | | | | | | 0 |
| 3 | 0 | | | | | | | | | | | | | | | | | | | | | | | 0 |
| 4 | 0 | | | | | | | | | 1 | 1 | 1 | | | | | | | | | | | | 0 |
| 5 | 0 | | | | | | | | 1 | 1 | 1 | 1 | 1 | 1 | | | | | | | | | | 0 |
| 6 | 0 | | | | | | 1 | 1 | 1 | 1 | 1 | 1 | 1 | 1 | | | | | | | | | | 0 |
| 7 | 0 | | | | | | 1 | 1 | 1 | | | | 1 | 1 | 1 | | | | | | | | | 0 |
| 8 | 0 | | | | | | 1 | 1 | | | | | | 1 | 1 | | | | | | | | | 0 |
| 9 | 0 | | | | | | | | | | | | 1 | 1 | 1 | | | | | | | | | 0 |
| 10 | 0 | | | | | | | | | | | 1 | 1 | 1 | | | | | | | | | | 0 |
| 11 | 0 | | | | | | | | | | 1 | 1 | 1 | 1 | | | | | 1 | | | | | 0 |
| 12 | 0 | | | | | | | | | 1 | 1 | 1 | 1 | | | | | | | | | | | 0 |
| 13 | 0 | | | | | | | | | | | | | | | | | | | | | | | 0 |
| 14 | 0 | | | | | | | 1 | 1 | 1 | 1 | | | | | | | | | | | | | 0 |
| 15 | 0 | | | | | | | 1 | 1 | 1 | 1 | | | | | | | | | | | | | 0 |
| 16 | 0 | | | | | | 1 | 1 | 1 | 1 | 1 | | | | 1 | | | | | | | | | 0 |
| 17 | 0 | | | | | | 1 | 1 | 1 | 1 | 1 | 1 | 1 | 1 | 1 | 1 | 1 | 1 | 1 | | | | | 0 |
| 18 | 0 | | | | | | | 1 | 1 | 1 | 1 | 1 | 1 | 1 | 1 | 1 | 1 | 1 | 1 | | | | | 0 |
| 19 | 0 | | | | | | | 1 | 1 | 1 | 1 | 1 | 1 | 1 | 1 | 1 | 1 | 1 | 1 | | | | | 0 |
| 20 | 0 | | | | | | | | | | | | | | | | | | | | | | | 0 |
| 21 | 0 | | | | | | | | | | | | | | | | | | | | | | | 0 |
| 22 | 0 | | | | | | | | | | | | | | | | | | | | | | | 0 |
| 23 | 0 | | | | | | | | | | | | | | | | | | | | | | | 0 |
| 24 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 4

COLUMNS

| ROWS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 |
| 2 | 0 | | | | | | | | | 1 | 1 | 1 | | | | | | | | | | | | 0 |
| 3 | 0 | | | | | | | | 1 | 1 | 1 | 1 | 1 | 1 | | | | | | | | | | 0 |
| 4 | 0 | | | | | | 1 | 1 | 1 | 1 | 1 | 1 | 1 | 1 | | | | | | | | | | 0 |
| 5 | 0 | | | | | | 1 | 1 | 1 | 1 | 1 | 1 | 1 | 1 | | | | | | | | | | 0 |
| 6 | 0 | | | | | | 1 | 1 | 1 | | | | 1 | 1 | 1 | | | | | | | | | 0 |
| 7 | 0 | | | | | | 1 | 1 | | | | | | 1 | 1 | | | | | | | | | 0 |
| 8 | 0 | | | | | | 1 | 1 | | | | | | 1 | 1 | | | | | | | | | 0 |
| 9 | 0 | | | | | | | | | | | | 1 | 1 | 1 | | | | | | | | | 0 |
| 10 | 0 | | | | | | | | | | | 1 | 1 | 1 | | | | | | | | | | 0 |
| 11 | 0 | | | | | | | | | | | 1 | 1 | 1 | | | | | | | | | | 0 |
| 12 | 0 | | | | | | | | | | 1 | 1 | 1 | 1 | | | | | 1 | | | | | 0 |
| 13 | 0 | | | | | | | | | 1 | 1 | 1 | 1 | | | | | | | | | | | 0 |
| 14 | 0 | | | | | | | | | 1 | 1 | 1 | 1 | | | | | | | | | | | 0 |
| 15 | 0 | | | | | | | | | | | | | | | | | | | | | | | 0 |
| 16 | 0 | | | | | | | 1 | 1 | 1 | 1 | | | | | | | | | | | | | 0 |
| 17 | 0 | | | | | | | 1 | 1 | 1 | 1 | | | | | | | | | | | | | 0 |
| 18 | 0 | | | | | | | 1 | 1 | 1 | 1 | | | | | | | | | | | | | 0 |
| 19 | 0 | | | | | | 1 | 1 | 1 | 1 | 1 | | | | 1 | | | | | | | | | 0 |
| 20 | 0 | | | | | | 1 | 1 | 1 | 1 | 1 | | | | 1 | | | | | | | | | 0 |
| 21 | 0 | | | | | | 1 | 1 | 1 | 1 | 1 | 1 | 1 | 1 | 1 | 1 | 1 | 1 | 1 | | | | | 0 |
| 22 | 0 | | | | | | | 1 | 1 | 1 | 1 | 1 | 1 | 1 | 1 | 1 | 1 | 1 | 1 | | | | | 0 |
| 23 | 0 | | | | | | | 1 | 1 | 1 | 1 | 1 | 1 | 1 | 1 | 1 | 1 | 1 | 1 | | | | | 0 |
| 24 | 0 | 0 | 0 | 0 | 0 | 0 | 0 | 1 | 1 | 1 | 1 | 1 | 1 | 1 | 1 | 1 | 1 | 1 | 1 | 0 | 0 | 0 | 0 | 0 |

PATENTED AUG 28 1973

3,755,780

SHEET 09 OF 14

FIG. 15

| I | L HIST (I), BREAK CORRECTED | LAI (I) | EDIT LAI (I) | L MARK (I) - STRING 1 | L MARK (I) - STRING 23 | EDIT LAI (I)-STRING 4 | L MARK (I)- STRING 4 | | R HIST (I), BREAK CORRECTED | RAI (I) | EDIT RAI (I) | R MARK (I)- STRING 1 | R MARK (I)- STRING 23 | EDIT RAI (I)-STRING 4 | R MARK (I)- STRING 4 |
|---|---|---|---|---|---|---|---|---|---|---|---|---|---|---|---|
| 1 | 10 | 0 | 0 | 0 | 1 | 0 | 1 | | 12 | 0 | 0 | 0 | 1 | 0 | 1 |
| 2 | 10 | -1 | -1 | 0 | 0 | -1 | 0 | | 12 | 2 | 2 | 0 | 0 | 2 | 0 |
| 3 | 9 | -2 | -2 | 0 | 0 | -2 | 0 | | 14 | 0 | 0 | 0 | 0 | 0 | 0 |
| 4 | 7 | 0 | 0 | 0 | 1 | 0 | 1 | | 14 | 0 | 0 | 0 | 0 | 0 | 0 |
| 5 | 7 | 0 | 0 | 0 | 0 | 0 | 0 | | 14 | 1 | 1 | 0 | 0 | 1 | 0 |
| 6 | 7 | 0 | 0 | 0 | 0 | 0 | 0 | | 15 | 0 | 0 | 0 | 1 | 0 | 1 |
| 7 | 7 | 0 | 0 | 0 | 0 | 0 | 0 | | 15 | 0 | 0 | 0 | 0 | 0 | 0 |
| 8 | 7 | 6 | 5 | 1 | 1 | 5 | 1 | | 15 | 0 | 0 | 0 | 0 | 0 | 0 |
| 9 | 13 | -1 | 0 | 0 | 1 | 0 | 1 | | 15 | -1 | -1 | 1 | 1 | -1 | 1 |
| 10 | 12 | 0 | 0 | 0 | 0 | 0 | 0 | | 14 | 0 | 0 | 0 | 0 | 0 | 0 |
| 11 | 12 | -1 | -1 | 1 | 1 | -1 | 1 | | 14 | 5 | 0 | 0 | 0 | 0 | 0 |
| 12 | 11 | -1 | -1 | 0 | 0 | -1 | 0 | | 19 | -6 | -1 | 0 | 0 | -1 | 0 |
| 13 | 10 | 0 | 0 | 0 | 0 | 0 | 0 | | 13 | 0 | 0 | 0 | 0 | 0 | 0 |
| 14 | 10 | -1 | -1 | 0 | 0 | -1 | 0 | | 13 | -1 | -1 | 0 | 0 | -1 | 0 |
| 15 | 9 | -1 | -1 | 0 | 0 | -1 | 0 | | 12 | -1 | -1 | 0 | 0 | -1 | 0 |
| 16 | 8 | 0 | 0 | 0 | 0 | 0 | 0 | | 11 | 0 | 0 | 0 | 0 | 0 | 0 |
| 17 | 8 | 0 | 0 | 0 | 0 | 0 | 0 | | 11 | 0 | 0 | 0 | 0 | 0 | 0 |
| 18 | 8 | -1 | -1 | 0 | 0 | -1 | 0 | | 11 | 4 | 4 | 1 | 1 | 8 | 1 |
| 19 | 7 | 0 | 0 | 0 | 0 | 0 | 0 | | 15 | 0 | 0 | 0 | 1 | 0 | 1 |
| 20 | 7 | 0 | 0 | 0 | 0 | 0 | 0 | | 15 | 4 | 4 | 0 | 1 | 0 | 0 |
| 21 | 7 | 1 | 1 | 1 | 1 | 1 | 1 | | 19 | 0 | 0 | 0 | 1 | 0 | 0 |
| 22 | 8 | 0 | 0 | 0 | 0 | 0 | 0 | | 19 | 0 | 0 | 0 | 0 | α | 1 |
| 23 | 8 | 0 | 0 | 0 | 0 | 0 | 0 | | 19 | 0 | 0 | 0 | 0 | | 0 |
| 24 | 8 | | α | | 1 | α | 1 | | 19 | | α | | 1 | | |
| 25 | | | | | 0 | | 0 | | | | | | 0 | | |

METHOD FOR RECOGNIZING CHARACTERS

This invention relates to optical character reading systems and, more particularly, to methods for the automatic recognition of both handprinted and machine printed characters.

The most common use of computer systems today is in the field of business data processing where the computer is used for a wide variety of processing tasks such as accounting, inventory control, scheduling, purchasing, billing, etc. However, before the computer can be used for these functions, the input data must be converted from human readable form to machine readable form. Usually this is accomplished by a human operator who first reads the data and then depresses keys which, in turn, perform the required conversion. Key punch systems for cards and paper tape, key to tape systems, and key to disk systems are currently the most popular techniques utilized for data input. In recent years, optical character readers (OCR) have been introduced for the purpose of automatically scanning and recognizing the printed characters with the intention of replacing the human keying operation.

To date, most OCR systems have been designed to read specific machine printed type fonts. A few machines have been built to read handprinted characters usually limited to the numerics and a few special alpha characters which are restricted to pre-assigned non-numeric fields. It is customary in the use of such handprint machines to constrain the author to print characters in accord with a pre-specified set of rules. The recognition performance of these machines is severely degraded if the author deviates from the utilized standards pre-specified for the handprint characters. In an effort to overcome this deficiency, it has become common to have humans pre-screen the handprinted data prior to inputting to the OCR system. Data which deviates from the standards is set aside for human keying and only the pre-judged acceptable data is input to the OCR machine. The requirement for pre-screening and human keying seriously degrades the cost effectiveness of such OCR systems.

An object of this invention is to provide efficient recognition methods capable of reading unconstrained handprinted and machine printed characters with an accuracy comparable to human performance but at a much higher rate (throughput).

The main prior art technique utilized for the recognition of machine printed characters involves matching the unknown character to a set of prestored templates. The templates are idealized replicas of the character set. The unknown character is recognized as the character associated with that template which most closely resembles the unknown character. The template matching technique can be implemented in an efficient manner and works quite well for single font machine printed characters. The same method can be used for multi-font machine printed character recognition by employing a set of templates for each type font.

The template matching scheme has not been successful in recognizing handprinted characters. The lack of success is related to the high degree of variation in human handprinting even when the authors are trained to print in accordance with pre-specified standards. In recognition of this fact, some recent handprint machines have employed the alternate technique of feature extraction and classification. The function performed by feature extraction is that of converting the scanned character to a string of numbers or features which are used by the classification logic to recognize the character. There is no precise definition of a feature and indeed many different feature sets have been used in the prior art. The primary goal in designing a feature set is that the resultant features possess only the essential shape information which describe the characters to be recognized while at the same time distinguish characters which belong to different classes. Perhaps the most common feature extraction technique used today is that of "stroke analysis" in which feature extraction algorithms search for the presence or absence of strokes located in pre-specified areas of the character. For example, a feature might indicate the presence of a long vertical stroke located along the right side of the character or the presence of a "cup" shaped stroke located in the upper left hand portion of the character. The resultant features are binary, indicating the presence or absence of the characteristic measured by the feature. This method can work well provided that the authors draw their characters within tolerable limits of the pre-specified standards. These techniques are particularly sensitive to stroke breaks, "salt and pepper noise" (black dots or holes within a line), and variations from the standards.

The classification technique used in conjunction with the binary feature extraction normally takes one of two forms. The first common form uses logical statements of the acceptable combinations of features for each character to decide the identity of the unknown character. The second form of classification logic uses the string of binary features as a binary vector. This feature vector is correlated with a set of pre-stored character vectors. A decision is rendered depending upon the character vector which correlates most closely with the feature vector. If no character vector sufficiently correlates a rejection decision is output.

The two broad steps of the illustrative embodiment of the invention, following the digitizing of the character to be recognized, involve feature extraction and classification. The scanning and digitizing function produces a binary raster representation of the character to be recognized. The feature extraction step utilizes a technique referred to herein as the Convexity Decomposition Method. The shape of the character is represented as a series of alternating positive and negative convexities or "bumps" when viewing the character from the perimeter of a box enclosing that character. The character can be recognized by the number and shape of the convexities around its perimeter. Once the convexities have been detected, their shapes are obtained by making several continuous measurements (as opposed to binary) upon them. It is the numerical values of these shape measurements which comprise a portion of the feature vector. In addition to these features, several other features are computed to aid in discriminating similarly shaped characters such as 4's and 9's. The feature vector is then used by the classification logic in reaching a decision as to the class of the character to be recognized.

The classification logic, in the illustrative embodiments of the invention, "sorts" the characters on the basis of the numbers and positions of convexities representing them. The sort group of the character to be recognized is used to determine the particular classification logic to be used in making a final decision. That is, the classification logic associated with a particular sort group is used to discriminate the different characters within the same sort group. A separate discriminant logic test is provided for every pair of characters which share a common sort group. The results of pairwise tests performed on the characters in the selected sort group are utilized to produce a character decision or a rejection of the character. The executions of the individual pairwise tests may be ordered (preferably, utilizing an optimal method, referred to as the Minimal Path Method) so as to minimize the average number of tests required to produce a final decision.

It is a feature of the invention to automatically height normalize a binary raster representation of the unknown character to a standard height.

It is another feature of the invention to correct identifiable breaks in character strokes.

It is another feature of the invention to smooth and eliminate noise in the contour of the character to be recognized.

It is another feature of the invention to determine the contour of the character to be recognized as viewed from outside the character (e.g., from two of the four sides) for determining the convexities thereof.

It is another feature of the invention to use continuous (as opposed to binary) feature values to measure the shape of the convexities of the character to be recognized.

It is another feature of the invention to use special continuous measurements to discriminate similarly shaped character classes.

It is another feature of the invention to use sort groups to facilitate the classifying of the unknown character.

It is another feature of the invention to use a set of discriminants to distinguish character classes within each sort group.

It is another feature of the invention to sequence through a series of pairwise tests so as to minimize the average number of tests required to recognize a character.

Further objects, features and advantages of the invention will become apparent upon consideration of the following detailed description in conjunction with the drawing in which:

FIG. 2 depicts a typical binary raster representation of a handprinted character "two";

FIG. 4 depicts the height normalized binary raster representation of the handprinted two of FIG. 2;

FIG. 15 is a table indicating the results of various computations illustrated in FIGS. 3A and 3B associated with the processing of the character two shown in FIG. 4.

Figure 1:
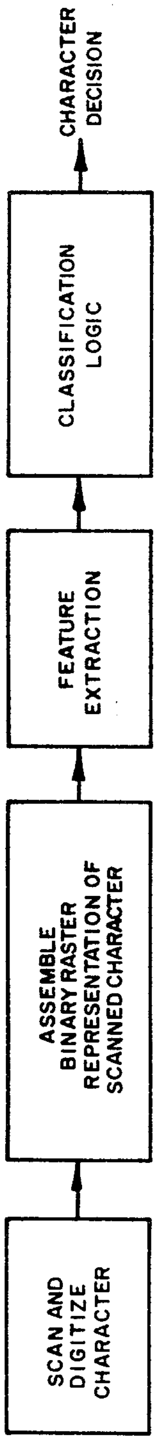
FIG. 1 is a functional block diagram which presents an overview of the character recognition process in accordance with the present invention.

After the the character to be recognized is scanned and digitized, as is known in the art and as can be accomplished by using many different types of commercially available equipments, the digitized data is assembled (FIG. 1) in a binary raster form as shown by the typical example of FIG. 2. The raster is comprised of 24 rows and 24 columns; other raster sizes can be used and the 24 × 24 raster size is only illustrative. The rows are assumed to be numbered 1 through 24 beginning at the top and the columns are numbered 1 through 24 beginning at the left. (Except for the border, 0's are omitted.)

The feature extraction and classification principles described below can be used for a wide variety of character shapes including alpha and numeric characters. The implementation of these principles generally varies from one character set to another. For illustrative purposes, the case of handprinted and machine printed numerics will be considered in detail.

Figure 3A:
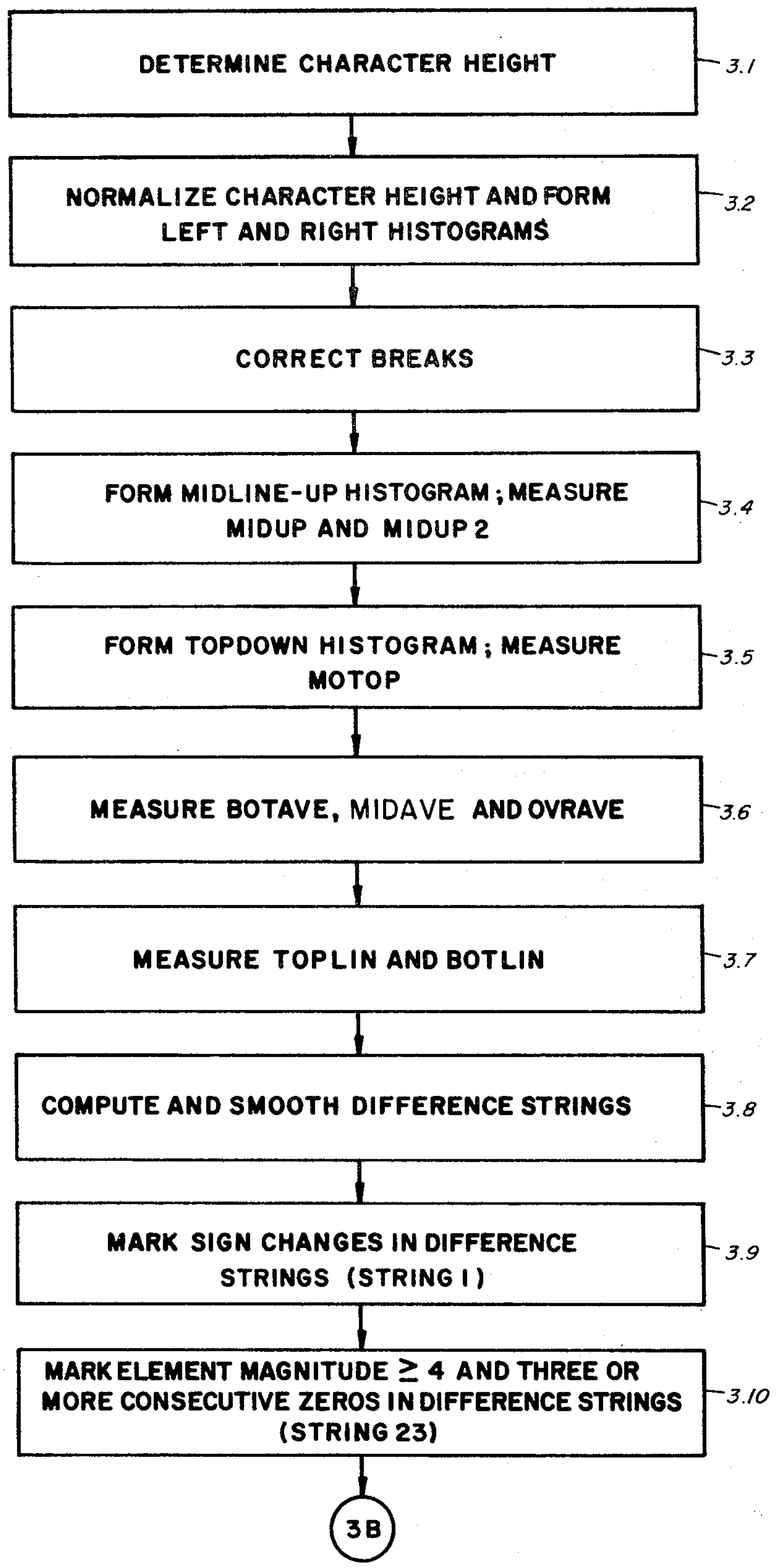
FIGS. 3A and 3B illustrate the functional block diagram of the feature extraction algorithms and classification logic in accordance with the present invention.
Figure 3B:
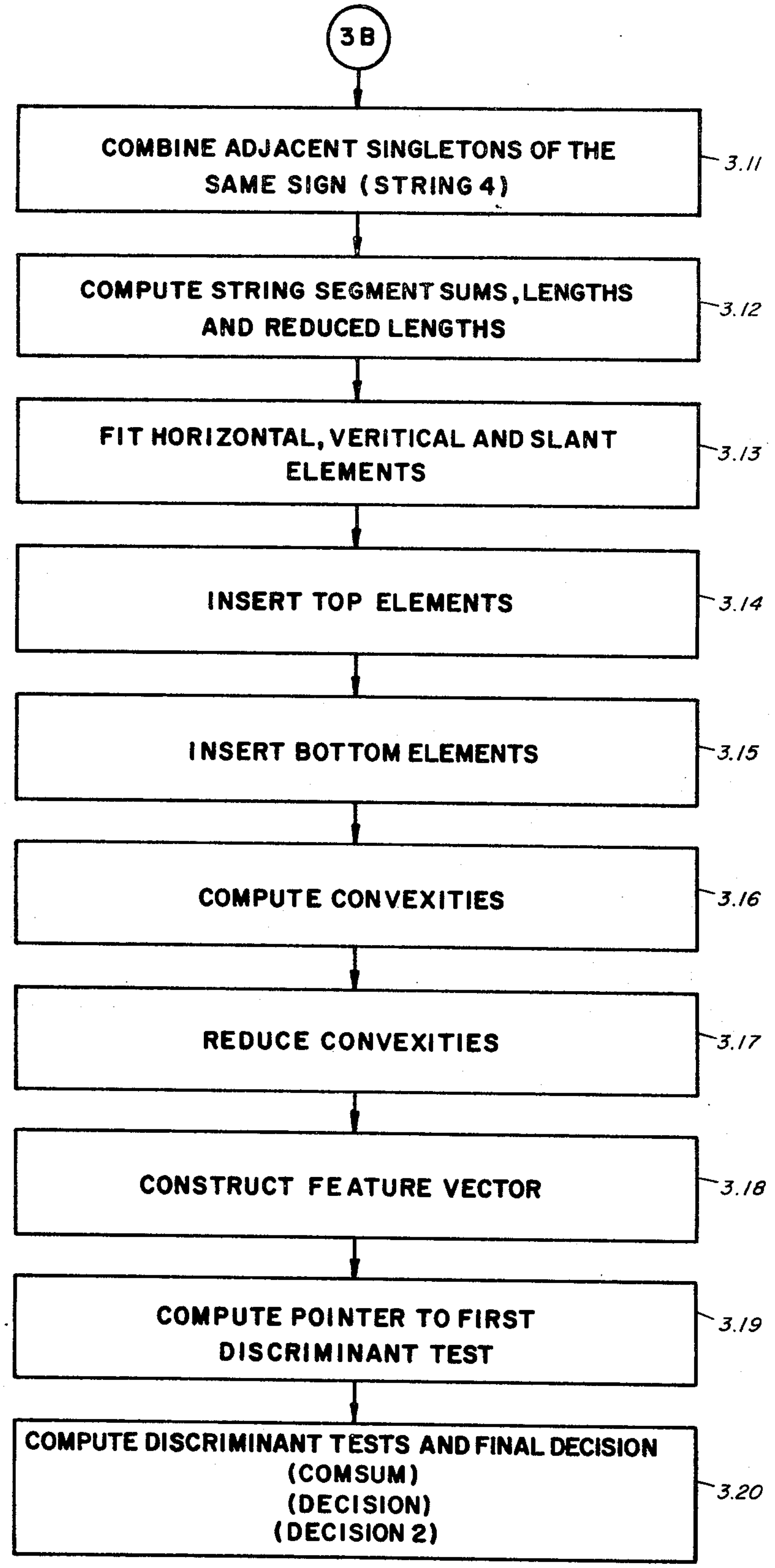

The functional block diagram (flow chart) of FIGS. 3A and 3B illustrates the operation of the feature extraction and classification algorithms for the recognition of handprinted and machine printed numeric characters in accordance with the invention. The flow chart comprises 20 labeled boxes, each of which represents a subfunction in the recognition of the binary raster representation of a character and each of which can be implemented by programming a general purpose computer. One such implementation is described in detail below to illustrate the specific form of the programming routines. (The actual programming of any computer depends, of course, on the computer itself but the steps described below can be implemented in a straightforward manner using conventional programming languages.)

In step 3.1 of the overall method, the height of the character is determined. This is accomplished by scanning the rows of the character (binary raster representation), noting the top and bottom extremities. Thus, the height of the handprinted two of FIG. 2 is found to be 16 units since it is contained between rows 4 and 19. Upon completion of this task, the height, denoted as H, is saved and the program advances to step 3.2 at which time the character is height normalized. The normalization function "stretches" a character so that its resulting height will be 24 units. For characters with an original height less than 24 units (i.e., H<24), the stretching function is accomplished by duplicating certain rows of the original raster. In effect, a new binary raster, containing the normalized character, is constructed from the original raster by copying the rows of the original raster into the rows of the new raster, with some of the original rows being copied more than once. The formula for computing the row number of the original raster to be copied into a specific row of the new raster is as follows:

Row 2 = Maxrow − [ H*(2*Maxrow − 2*Row1 + 1)/2*Maxrow ] − Diff where

Row 1 = row number in new raster

Row 2 = row number in original raster

Maxrow = maximum number of rows in both new and original raster = 24

H = original character height

Diff = the number of rows between the bottom of the character and Maxrow

[X] = the lower integer value of X.

For the illustrative case in which Maxrow = 24, H = 16 and Diff = 5, the data shown in Table 1 is computed. It should be noted that rows 4, 6, 8, 10, 12, 14, 16 and 18 are duplicated. The resultant normalized character is shown in FIG. 4.

TABLE 1

| Row 1 | Row 2 |
|---|---|
| 1 | 4 |
| 2 | 4 |
| 3 | 5 |
| 4 | 6 |
| 5 | 6 |
| 6 | 7 |
| 7 | 8 |
| 8 | 8 |
| 9 | 9 |
| 10 | 10 |
| 11 | 10 |
| 12 | 11 |
| 13 | 12 |
| 14 | 12 |
| 15 | 13 |
| 16 | 14 |
| 17 | 14 |
| 18 | 15 |
| 19 | 16 |
| 20 | 16 |
| 21 | 17 |
| 22 | 18 |
| 23 | 18 |
| 24 | 19 |

In addition to the height normalization, left and right character histograms are formed in step 3.2. These histograms, designated LHIST and RHIST, contain the basic contour shape information as seen by viewing the character from the left and right edges of a box enclosing the character. The $I^{th}$ element of LHIST, designated LHIST(I) is simply the column number of the first non-zero bit encountered when scanning along the $I^{th}$ row beginning at the left. Similarly RHIST(I) is the column number of the first non-zero bit encountered when scanning along the $I^{th}$ row from the right. In the special instance where no non-zero bits exist along a specific row, that is, there is a break in the vertical dimension of the character, both LHIST and RHIST are set equal to the maximum column number plus 1. The left and right histograms corresponding to the two of FIG. 2 are listed in Table 2. The break which is detected in row 15 initially results in LHIST(15) = RHIST(15) = 25.

TABLE 2

| I | Left Histogram LHIST(I) | Right Histogram RHIST(I) |
|---|---|---|
| 1 | 10 | 12 |
| 2 | 10 | 12 |
| 3 | 9 | 14 |
| 4 | 7 | 14 |
| 5 | 7 | 14 |
| 6 | 7 | 15 |
| 7 | 7 | 15 |
| 8 | 7 | 15 |
| 9 | 13 | 15 |
| 10 | 12 | 14 |
| 11 | 12 | 14 |
| 12 | 11 | 19 |
| 13 | 10 | 13 |
| 14 | 10 | 13 |
| 15 | 25 (9 after break correction) | 25 (12 after break correction) |
| 16 | 8 | 11 |
| 17 | 8 | 11 |
| 18 | 8 | 11 |
| 19 | 7 | 15 |
| 20 | 7 | 15 |
| 21 | 7 | 19 |
| 22 | 8 | 19 |
| 23 | 8 | 19 |
| 24 | 8 | 19 |

Upon completion of the normalization and histogram computations, the program proceeds to step 3.3 at which time any breaks in the character which were detected in step 3.2 are corrected. The correction procedure operates on the histograms, replacing all break elements (i.e., elements with value equal to 25) with the average of the histogram values just preceding and following. If LHIST(I) and LHIST(J), (J>I), are the first and last elements not equal to 25 adjoining a break (i.e., LHIST(K) = 25, I<K<J), then $$LHIST(K)=\left[\frac{LHIST(I)+LHIST(J)}{2}\right],\ I<K<J$$

where the symbol [ ] represents the lower integer value of the computed average. Referring to Table 2, it is noted that after applying the correction procedure the left and right histograms are corrected as follows:

$$LHIST(15)=\left[\frac{LHIST(14)+LHIST(16)}{2}\right]=\left[\frac{10+8}{2}\right]=9$$

$$RHIST(15)=\left[\frac{RHIST(14)+RHIST(16)}{2}\right]=\left[\frac{13+11}{2}\right]=12$$

Thus LHIST(15) becomes equal to 9 and RHIST(15) becomes equal to 12.

At this point, the character has been normalized and the left and right histograms have been computed and corrected for breaks. The remaining feature extraction operations of steps 3.4 through 3.18 utilize the normalized raster and the histograms to extract a set of measurements which in turn comprise a feature vector. The feature vector is then passed on to the classification logic (steps 3.19 and 3.20) so that a decision may be made. The feature extraction algorithms compute two distinct sets of features. The first set is composed of the eight features computed in steps 3.4 through 3.7. These features measure special characteristics of the normalized raster and are useful for discriminating similarly shaped characters. The second set of features, computed in steps 3.8 through 3.17, are direct measurements of the shape of the left and right contours of the normalized character. This latter set is computed only after the execution of steps involving:

a. the fitting of the contours with straight line segments restricted to the horizontal, vertical and slant (i.e., ±45°) directions (steps 3.8 through 3.15), and b. the decomposition of the straight line segments into groups of convex and concave elements (steps 3.16 and 3.17).

In step 3.4 of FIG. 3, the first of the eight special measurements is computed and designated MIDUP. As the name implies, this feature measures a characteristic related to the upward view of the character from a row somewhere around the middle of the character. The row selected depends upon Maxrow and is equal to [2*Maxrow/3]. For the specific case of 24 rows, Maxrow = 24 and the "middle" row used is row 16. The upward view of the character from row 16 is obtained by computing a "midline-up" histogram designated MHIST. The $I^{th}$ element of MHIST, designated MHIST(I) is simply the row number of the first non-zero bit encountered when scanning the $I^{th}$ column upward from (and including) the $16^{th}$ row. In the case where no non-zero bit is found, the value of MHIST for that column is set equal to zero. The midline-up histogram for the character two of FIG. 4 is listed in Table 3.

TABLE 3

| I | Midline-Up Histogram MHIST(I) | Topdown Histogram THIST(I) |
|---|---|---|
| 1 | 0 | 24 |
| 2 | 0 | 24 |
| 3 | 0 | 24 |
| 4 | 0 | 24 |
| 5 | 0 | 24 |
| 6 | 0 | 24 |
| 7 | 8 | 4 |
| 8 | 16 | 4 |
| 9 | 16 | 3 |
| 10 | 16 | 1 |
| 11 | 16 | 1 |
| 12 | 14 | 1 |
| 13 | 14 | 3 |
| 14 | 12 | 3 |
| 15 | 9 | 6 |
| 16 | 0 | 21 |
| 17 | 0 | 21 |
| 18 | 0 | 21 |
| 19 | 12 | 12 |
| 20 | 0 | 24 |
| 21 | 0 | 24 |
| 22 | 0 | 24 |
| 23 | 0 | 24 |
| 24 | 0 | 24 |

The midline-up histogram is used to determine the beginning column and ending column of the upper portion of the character, the two columns being designated BEGIN and END respectively. Next, the maximum histogram value in columns BEGIN through BEGIN+3 inclusive is found and designated MAX1. The maximum histogram value in columns END—6 through END inclusive is found and designated MAX2. Finally, the minimum histogram value in columns BEGIN+3 through END—4 inclusive is found and designated MIN. These three measurements are combined as follows to produce the value of the MIDUP feature.

$$\text{MIDUP} = \begin{cases} \text{MAX1} + \text{MAX2} - 2*\text{MIN} & \text{END-BEGIN}>7 \\ 0 & \text{Otherwise} \end{cases}$$

where $$\text{MAX1} = \text{MAX}\{\text{MHIST(I)}\}, \text{I} = \text{BEGIN, BEGIN+1}, \ldots, \text{BEGIN+3}$$

$$\text{MAX2} = \text{MAX}\{\text{MHIST(I)}\}, \text{I} = \text{END—6, END—5}, \ldots, \text{END}$$

$$\text{MIN} = \text{MIN}\{\text{MHIST(I)}\}, \text{I} = \text{BEGIN+3}, \ldots, \text{END—4}.$$

Referring to Table 3, it is seen that for the raster of FIG. 4

BEGIN = 7

END = 19

MAX1 = 16

MAX2 = 14

MIN = 9

MIDUP = 16+14—2*9=12.

In step 3.4, a second feature is measured and designated MIDUP2. Its value is determined by counting the number of rows between middle row 16 and the row containing the first non-zero bit along the LHIST(16)—1 column when scanning upward from (but not including) row 16. Stated differently, the column to be checked for a non-zero bit is determined by scanning the $16^{th}$ row from the left until the first non-zero bit is found. By backing off one column, the column which will be scanned next is determined. This column is simply LHIST(16)—1. Finally, the LHIST(16)—1 column is scanned upward from row 16 until a non-zero bit is found. The row number containing this bit is subtracted from 16 to produce MIDUP2. Turning to the example shown in FIG. 4, it is seen that LHIST(16)—1 = 7 and that the row containing the first non-zero bit is row 8. Thus MIDUP2 = 16 − 8 = 8. The values of both the MIDUP and the MIDUP2 features are saved and the program advances to step 3.5 of FIG. 3.

The MIDUP and MIDUP2 features are useful in discriminating certain sevens from either fours or nines. Consider, for example, sevens such as:

7 and 7.

The first seven will resemble a closed-top four and the second will resemble a nine when viewing these characters from the left and right sides. However, the MIDUP and MIDUP2 measurements allow these sevens to be distinguished since the view up from the middle line for both fours and nines will be blocked by a relatively low horizontal stroke which is not present in the case of a seven.

The third of the eight special measurements, designated MOTOP, is computed in step 3.5. Effectively, this feature measures the degree of openness at the top of a character and hence the name "open top measurement" symbolically referenced MOTOP. This feature is derived from viewing the character from the top row and is computed from the values of a "topdown" histogram designated THIST. The value of the $I^{th}$ element of THIST is THIST(I) and is simply the row number of the first non-zero bit in the $I^{th}$ column. The topdown histogram for the character two of FIG. 4 is listed in Table 3. The THIST histogram is first used to determine the beginning column and the ending column of the character to be used for the MOTOP computation, the columns being designated BEGIN and END respectively. Next, the maximum histogram value in columns BEGIN+2 through END—2 inclusive is found and designated TMAX. The minimum histogram value in columns BEGIN through BEGIN+3 inclusive is determined next and designated TMIN1. Finally, the minimum histogram value in columns END—3 through END inclusive is found and designated TMIN2. These measurements are combined to produce the value of the MOTOP feature as shown below:

$$MOTOP = \begin{cases} 2*TMAX - (TMIN1 + TMIN2) & END-BEGIN>8 \\ 0 & \text{Otherwise} \end{cases}$$

$TMAX = MAX\{THIST(I)\}$, $I = BEGIN+2, BEGIN+3, \ldots, END-2$ $TMIN1 = MIN\{THIST(I)\}$, $I = BEGIN, BEGIN-1, \ldots, BEGIN+3$ $TMIN2 = MIN\{THISHT(I)\}$, $I = END-3, END-2, \ldots, END$ Referring to Table 3, it is seen that for the raster of FIG. 4

BEGIN = 7
END = 19
TMAX = 21
TMIN1 = 1
TMIN2 = 12 and, therefore, MOTOP = 2*21 − (1+12) = 29. The value of the open top feature is saved and the program proceeds to step 3.6 of FIG. 3.

The primary purpose of the MOTOP feature is to discriminate open-top fours from nines. The left and right contours of open-top fours are often identical to those of nines and so the only distinction between them is related to the "openness" at the top of the character. The MOTOP computation directly measures the openness property.

In step 3.6, three additional special features are measured, all of which pertain to the average width of the character. The first of these measures is the average width across a segment located near the bottom of the character and is designated BOTAVE. The second measure is the average width across a segment located near the middle of the character and is designated MIDAVE. The last measure is the average width over a large central region of the character and is designated OVRAVE. The width of the $I^{th}$ row is given by RHIST(I) − LHIST(I) + 1, where RHIST and LHIST refer to the break-corrected histograms. Using this notation, the three average width features are given by:

$$BOTAVE = \left[\frac{1}{6}\sum_{I=16}^{21}(RHIST(I) - LHIST(I) + 1)\right]$$

$$MIDAVE = \left[\frac{1}{6}\sum_{I=10}^{15}(RHIST(I) - LHIST(I) + 1)\right]$$

$$OVRAVE = \left[\frac{1}{16}\sum_{I=5}^{20}(RHIST(I) - LHIST(I) + 1)\right]$$

Using the left and right histogram values listed in Table 2 corresponding to the two of FIG. 2, the following values are computed:

BOTAVE = [43/6] = 7
MIDAVE = [27/6] = 4
OVRAVE = [95/16] = 5

In each case, the lower integer value is used as the feature value. The three values are saved and the program advances to step 3.7

The remaining two of the eight special features are computed during this step. These features are related to the number of line segments which are crossed when scanning across a specified group of rows. For the purpose of this computation, a line segment is defined by the presence of one or more consecutive one bits which are bordered on the left and right by zeros when scanning a row of the character. The first of these features, designated TOPLIN, is simply a count of the total number of line segments determined by scanning rows 5 through 9 inclusive. The second, designated BOTLIN, is a count of the total number of line segments for rows 16 through 20 inclusive. Following this procedure on the two of FIG. 4, it is determined that:

TOPLIN = 8
BOTLIN = 7

The TOPLIN and BOTLIN values are stored along with the previously computed special features and the program advances to step 3.8.

It should be evident that the TOPLIN and BOTLIN features are highly related to the discrimination of eights. Eights are sometimes malformed in the sense that the shape information derived from the left and right contours is unreliable. In these instances, the presence of two line segments in each of several rows at the top and the bottom, resulting in large TOPLIN and BOTLIN values, are very useful features.

It should be noted that the eight special feature values are dependent upon the raster size used. Their formulas can easily be modified to accommodate any desired raster simply by scaling the row or column numbers discussed above by MAXROW/24 or MAXCOL/24 respectively where MAXROW and MAXCOL represent the numbers of rows and columns in the raster.

The operation of step 3.8 initiates the procedure which leads to the fitting of the left and right contours with straight line segments and eventually to convexity decomposition and measurement. In step 3.8, the "difference strings" for the left and right contours are computed using the left and right break-corrected histograms. The difference strings are known as the AI strings and are designated LAI and RAI for the left and right sides of the character respectively. The Ith element of the LAI string is designated LAI(I) and is computed as follows:

$LAI(I) = LHIST(I+1) - LHIST(I)$, for $1 \leq I \leq MAXROW-1$. RAI(I) is similarly defined as:

$RAI(I) = RHIST(I+1) - RHIST(I)$, for $1 \leq I \leq MAXROW-1$. Consider, for example, the break-corrected left and right histograms of the character two listed in Table 2. The corresponding AI strings for these histograms are listed in FIG. 15. It should be noted that the AI strings define the left and right contours of the characters as well as do the LHIST and RHIST histograms. What is lost by converting the histograms to respective difference strings is the exact positional information of the character, and this information is not needed. That is to say, LAI and RAI are left and right translational-invariant since they are unaltered by horizontal translation of the character.

A second operation is performed in step 3.8 to effect smoothing of the character contours. This operation is accomplished by combining adjacent AI elements which differ in sign using the following rule:

If $AI(I) * AI(I+1) < 0$ then $$\left.\begin{array}{l} AI(I) = AI(I) + AI(I+1) \\ AI(I+1) = 0 \end{array}\right\} \text{ if } |A(I)| \geq A(I+1)|$$

$$\left.\begin{array}{l} A(I+1) = A(I) + AI(I+1) \\ A(I) = 0 \end{array}\right\} \text{ if } |A(I+1)| > |AI(I)|$$

This rule simply states that under the condition that two adjacent elements of an AI string have different signs, then the element with the larger magnitude is replaced by the sum of the two elements and the element with the smaller magnitude is set to zero. The operation is conducted sequentially from top to bottom. Each resulting AI string is referred to as an EDIT AI string.

Upon applying the smoothing rule to the LAI and RAI strings associated with the two of FIG. 4 the EDIT LAI and EDIT RAI strings listed in FIG. 15 are generated. The purpose of the smoothing is to remove some of the effects of "noise" bits. It should be noted how the effect of the noise bit located in row 12, column 19 of FIG. 4 is minimized by setting EDIT RAI(11) = 0 and EDIT RAI(12) = −1

The EDIT AI strings are used in steps 3.9 through 3.12 in preparation for the straight line fitting conducted in steps 3.13 through 3.15. Before proceeding with a discussion of these operations, a brief discussion of the methodology which is used is appropriate. The EDIT AI strings are examined for three special conditions. The first is related to sign changes in the string when scanning from top to bottom. This operation is conducted in step 3.9. The remaining two conditions are checked in step 3.10; one is a search of the string for elements with magnitude greater than or equal to 4 units, and the other is a search of the string for three or more consecutive zeros. An array, designated MARK(I) is maintained in steps 3.9 and 3.10 for the purpose of marking the location along each EDIT AI string where any of the three special conditions occurs. The presence of a mark at position I is recorded by MARK(I) = 1. The eventual purpose of the MARK array is to subdivide the AI string into segments, where a segment is defined as the consecutive elements between marks. A mark in the Jth position (i.e., MARK(J) = 1) is interpreted as a divider between EDIT AI(J-1) and EDIT AI(J). Once the segments have been determined, they are "fitted" with straight line segments restricted to the horizontal, vertical and slant directions.

In step 3.9, each EDIT AI string is processed to detect sign changes in the string. This operation is accomplished by scanning the EDIT AI string from top to bottom (i.e., I = 2, . . . 23), but ignoring zeros. Sign changes are recorded in the MARK array as follows:

$$MARK(I) = \begin{cases} 1 \text{ if } SGN\,[EDIT\ AI(I)] \neq SGN\,[EDIT\ AI(I-1)] \\ 0 \quad \text{Otherwise} \end{cases}$$

where SGN [EDIT AI(I−1)] is the sign associated with the preceding segment. The sign associated with the preceding segment is the sign of the last non-zero element in the string as it is scanned from top to bottom. Upon completing step 3.9, the MARK arrays for the sample two of FIG. 4 appear as listed in FIG. 15 under the columns designated LMARK(I)— String 1 and RMARK(I)—String 1. The preceding letters L and R correspond to the left and right strings and the post-modifier, String 1, corresponds to the fact that the strings are derived with the use of the first criterion (sign changes).

In step 3.10, each EDIT AI string is scanned and the associated MARK array modified to account either for elements with magnitudes greater than or equal to four units or for sequences of three or more consecutive zeros. Specifically, consider the cases in which | EDIT AI(J)| ≥ 4 or EDIT AI(K)=0 for P ≤ K ≤ Q. Q −*P* ≥ 2. That is, the magnitude of the Jth element of EDIT AI is greater than or equal to four or there exists a string of Q−P+1 ≥ 3 zeros beginning with element P. Then $$\left.\begin{matrix} MARK(J) = 1 \\ MARK(J+1) = 1 \end{matrix}\right\} \text{since } |EDIT\ A(J)| \geq 4$$

or $$\left.\begin{matrix} MARK(P) = 1 \\ MARK(Q+1) = 1 \end{matrix}\right\} \text{since } AI(K) = 0 \text{ for } P \leq K \leq Q \text{ and } Q - P \geq 2$$

In addition to any marks recorded using these two criteria, the following marks are always set:

MARK(1) = 1
MARK(MAXROW) = 1
MARK(MAXROW+1) = 0
EDIT AI(MAXROW)= α

Upon completing step 3.10, the mark arrays for the sample two of FIG. 4 would appear as listed in FIG. 15 under the columns LMARK–String 23 and RMARK – String 23. The post-modifier, String 23, corresponds to the second and third criteria used to generate marks of value 1.

In step 3.11, each String—23 MARK array is scanned from top to bottom for the purpose of locating adjacent segments of length one. A segment of length one is called a "singleton" and is easily found by observing two consecutive 1's in the MARK array. If two adjacent singletons (three consecutive 1's) are detected, the signs of the EDIT AI elements are compared. If the signs match, the singletons are combined by summing the corresponding EDIT AI singleton elements. In this case the EDIT AI string and MARK array are reduced by one in length reflecting the combination of the singletons and the scan continued. In the case where the singletons are of opposite sign, no modification takes place. For example, consider the following sequence which appears in the EDIT RAI(I) string listed in FIG. 15:

| I= | 18 | 19 | 20 | 21 | 22 | 23 | 24 | 25 |
|---|---|---|---|---|---|---|---|---|
| EDIT RAI(I) | 4 | 0 | 4 | 0 | 0 | 0 | α | |
| RMARK-String 23 | 1 | 1 | 1 | 1 | 0 | 0 | 1 | 0 |

Here is a case of three adjacent singletons of the same sign. The combination procedure begins at the left where the first two singletons (i.e., 4 and 0) are combined and the strings reduced by one as follows:

| I= | 18 | 19 | 20 | 21 | 22 | 23 | 24 |
|---|---|---|---|---|---|---|---|
| EDIT RAI(I) | 4 | 4 | 0 | 0 | 0 | α | |
| RMARK-String 23 | 1 | 1 | 1 | 0 | 0 | 1 | 0 |

The combination procedure is repeated, producing the final strings below.

| I= | 18 | 19 | 20 | 21 | 22 | 23 |
|---|---|---|---|---|---|---|
| EDIT RAI(I) | 8 | 0 | 0 | 0 | α | |
| RMARK-String 23 | 1 | 1 | 0 | 0 | 1 | 0 |

The results of applying these procedures to the EDIT AI strings associated with the sample two of FIG. 4 are listed in the columns EDIT LAI – String 4, EDIT RAI – String 4, LMARK – String 4 and RMARK – String 4 in FIG. 15. The post-modifier, string 4, indicates that the strings are generated by utilizing the fourth criterion. The reason for combining adjacent singletons of the same sign is that if the second segment is so short that it consists of only a single element and there is no change in direction (sign), then the segment is not treated as a separate segment and is instead combined with the previous segment.

In step 3.12, as a final preliminary to the fitting of straight lines to each segment of the EDIT AI strings, three measurements are derived for each segment. First, the length of each segment is computed. The length, designated LN1 is defined as the number of elements comprising the segment. Second, the reduced length, designated LN2, is computed. It is equal to LN1 minus the sum of the number of leading and trailing zeros. A segment containing all zeros is defined to have a reduced length equal to zero (LN2 = 0). Third, the sum of each segment is computed by summing the elements and is designated LSM. In addition to these three measurements on each segment, the total number of segments comprising the left and right EDIT AI strings are computed and designated LNOSEG and RNOSEG respectively.

These measurements for the sample two of FIG. 4 are computed using the EDIT AI – String 4 and MARK – String 4 strings listed in FIG. 15. The results of these computations are listed in Table 4. This data is saved and the program advances to step 3.13.

TABLE 4

| Left | | | | Right | | | |
|---|---|---|---|---|---|---|---|
| Segment Number | Length (LN1) | Reduced length (LN2) | Sum (LSM) | Segment Number | Length (LN1) | Reduced length (LN2) | Sum (LSM) |
| 1 | 3 | 2 | –3 | 1 | 5 | 4 | 3 |
| 2 | 4 | 0 | 0 | 2 | 3 | 0 | 0 |
| 3 | 3 | 1 | 5 | 3 | 9 | 7 | –4 |
| 4 | 4 | 0 | 0 | 4 | 2 | 1 | 8 |
| 5 | 10 | 8 | –5 | 5 | 3 | 0 | 0 |
| 6 | 3 | 1 | 1 | | | | |
| LNOSEG=6 | | | | RNOSEG=5 | | | |

Figure 5:
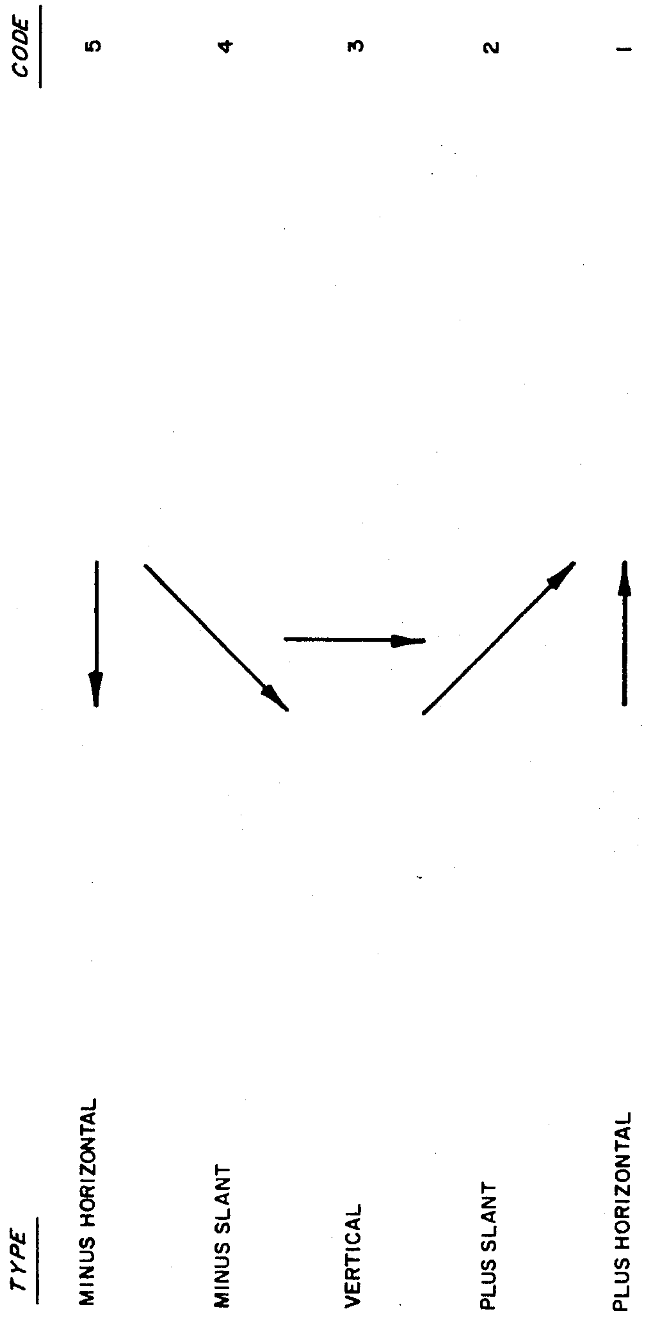
FIG. 5 illustrates the five directions for line segments fitted to character contours in the illustrative embodiments of the invention.

In step 3.13, a straight line is fitted to each segment of each EDIT AI string beginning with the topmost segment. The straight lines are restricted to only a few directions, for example, the five shown in FIG. 5. The CODE description is a numeric between 1 and 5 corresponding to each of the five directions (plus horizontal, plus slant, vertical, minus slant, minus horizontal). The criterion used to determine the line direction for a specific segment is the slope associated with that segment. The slope of a segment is defined as the lower integer of the following function:

$$SLOPE = [10 * LSM/LN2].$$

In addition to the direction (i.e., CODE), a length is also associated with this direction and is designated VALUE. In the formula for SLOPE, LN2 is used rather than LN1 so that leading and trailing vertical segments are effectively ignored in the computation.

The fitting procedure functions as follows. If the magnitude of the sum is less than or equal to one, the segment is fitted with a vertical line (i.e., CODE = 3) of length LN1 (i.e., VALUE = LN1). In addition, any segment with SLOPE less than or equal to 5 is fitted with a vertical line (CODE = 3) of length LN1 (VALUE = LN1). A segment with the magnitude of SLOPE greater than 5 but less than 40 is coded as a slant. The sign of the SLOPE determines the CODE; a negative sign results in CODE = 4, a positive sign results in CODE = 2. In either case the assigned length is LN1 (VALUE = LN1). Finally, a segment with a magnitude of SLOPE greater than or equal to 40 is fitted with a horizontal line. The sign of SLOPE determines the CODE; a negative sign results in CODE = 5, a positive sign results in CODE =1. In either case the assigned length is equal to the magnitude of [SLOPE/10]. A summary of these rules are listed below:

| Condition | CODE | VALUE |
|---|---|---|
| $\lvert LSM\rvert \leq 1$ | 3 | LN1 |
| $\lvert SLOPE\rvert \leq 5$ | 3 | LN1 |
| $5 < \lvert SLOPE\rvert < 40$ and $SLOPE < 0$ | 4 | LN1 |
| $5 < \lvert SLOPE\rvert < 40$ and $SLOPE > 0$ | 2 | LN1 |
| $\lvert SLOPE\rvert \geq 40$ and $SLOPE < 0$ | 5 | $[SLOPE/10] \geq$ |
| $\lvert SLOPE\rvert \geq 40$ and $SLOPE < 0$ | 1 | $\geq [SLOPE/10]$ |

While performing the fitting procedure, the program checks for two special conditions which may arise. The first condition occurs when two vertical segments are adjacent to one another. In this case the program combines the two, creating a new vertical with a length equal to the sum of the two original lengths. For example, suppose CODE(J) = CODE(J+1) = 3. The combination procedure would combine J and J + 1 as follows:

CODE(J) = 3

VALUE(J) = VALUE(J) + VALUE(J+1). The second special condition arises when two adjacent horizontals of opposite sign occur. In this case, the program will insert a vertical segment of length two between the horizontals. For example, suppose CODE(J) = 1, VALUE(J) = X, CODE(J+1) = 5, and VALUE(J+1) = Y. The correction procedure would produce new CODE and VALUE arrays as follows:

| | |
|---|---|
| CODE(J) = 1 | VALUE(J) = X |
| CODE(J+1) = 3 | VALUE(J+1) = 2 |
| CODE(J+2) = 5 | VALUE(J+2) = Y |

In addition to the above procedures, the left and right string lengths are determined and designated LSTRLEN and RSTRLEN respectively. They are simply the number of segments associated with their respective sides. The results of applying this fitting procedure to the sample two of FIG. 4 are listed in Table 5. It might be noted that the special condition of adjacent verticals occurred in the second and third segments of the right string and were combined in accordance with the above rule.

TABLE 5

| Segment Number | Left | | Right | |
|---|---|---|---|---|
| | LCODE(I) | LVALUE(I) | RCODE(I) | RVALUE(I) |
| 1 | 4 | 3 | 2 | 5 |
| 2 | 3 | 4 | 3 | 12 |
| 3 | 1 | 5 | 1 | 8 |
| 4 | 3 | 2 | 3 | 3 |

TABLE 5 – Continued

| Segment Number | Left: LCODE(I) | Left: LVALUE(I) | Right: RCODE(I) | Right: RVALUE(I) |
|---|---|---|---|---|
| 5 | 4 | 10 | | |
| 6 | 3 | 3 | | |
| | LSTRLEN=6 | | RSTRLEN=4 | |

In step 3.14, a measurement of width of the character at the top is computed and designated T. A minus horizontal (CODE = 5) of length T (VALUE = T) is then inserted at the beginning of the left string and similarly a plus horizontal (CODE = 1) of length T (VALUE = T) is inserted at the beginning of the right string. Several factors contribute to the computation of T. Basically, T is equal to the sum of two numbers. The first is a direct measure of the width of the character in row 1 and is given by RHIST(1) − LHIST(1) + 1. The second number, designated as X, depends upon the CODE of the first line segment on the left and the right. Table 6 defines the value of X for the nine possibilities which are of interest.

TABLE 6.—VALUE OF X

| LCODE(1) | RCODE(1): 1 | RCODE(1): 5 | RCODE(1): Other |
|---|---|---|---|
| 1 | RVALUE(1)L* | 0L*,R* | 0L* |
| 5 | LVALUE(1)+ RVALUE(1) | LVALUE(1)R* | LVALUE(1) |
| Other | RVALUE(1) | 0R* | 0 |

TABLE 7.—VALUE OF Y

| LCODE(LSTRLEN) | RCODE(RSTRLEN): 1 | RCODE(RSTRLEN): 5 | RCODE(RSTRLEN): Other |
|---|---|---|---|
| 1 | LVALUE(LSTRLEN)(R*) | LVALUE(LSTRLEN) plus RVALUE(RSTRLEN) | LVALUE(LSTRLEN). |
| 5 | 0(L* R*) | RVALUE(RSTRLEN)(L*) | 0(L*). |
| Other | 0(R*) | RVALUE(RSTRLEN) | 0. |

If LCODE(1) = 5 or if RCODE(1) = 1, these horizontal elements are deleted from the arrays computed in step 3.13 as their contributions are reflected in the value of T. Thus T is defined as:

$$T = RHIST(1) - LHIST(1) + 1 + X.$$

The L* or R* symbols in Table 6 indicate where a special condition of adjacent horizontals of opposite sign will occur once the top horizontal is inserted. For example, the symbol L* indicates that it occurs on the left side. Whenever adjacent horizontals of opposite signs appear, they are separated by a vertical segment (CODE = 3) of length 2 (VALUE =2), just as they are when the arrays are initially formed. Suppose, for example, that the LCODE and RCODE arrays computed in step 3.13 are as follows:

| I | LCODE(I) | LVALUE(I) | RCODE(I) | RVALUE(I) |
|---|---|---|---|---|
| 1 | 1 | 5 | 1 | 4 |
| 2 | 3 | 3 | 2 | 3 |
| 3 | 4 | 10 | 3 | 8 |

and RHIST − LHIST + 1 = 3. In such a case, X would be set equal to RVALUE(1) = 4 and T would be 3 + 4 = 7. A special condition is noted since LCODE begins with a plus horizontal and therefore a vertical line of length 2 must be inserted. The resulting arrays would appear as follows:

| I | LCODE(I) | LVALUE(I) | RCODE(I) | RVALUE(I) |
|---|---|---|---|---|
| 1 | 5 | 7 | 1 | 7 |
| 2 | 3 | 2 | 2 | 3 |
| 3 | 1 | 5 | 3 | 8 |
| 4 | 3 | 3 | | |
| 5 | 4 | 10 | | |

It should be noted that the original plus horizontal on the right (RCODE(1) = 1, RVALUE(1) = 4) is deleted and replaced by RCODE(1) = 1, RVALUE(1) = 7, and further that a vertical segment is inserted on the left to separate the horizontals of opposite sign. Once the top measurement has been inserted into the CODE strings the program is directed to step 3.15.

At this time a measurement reflecting the width of the character at the bottom is computed and designated B. The procedure followed in step 3.15 exactly parallels that of step 3.14. A plus horizontal (CODE = 1) of length B (VALUE = B) is inserted at the end of the left string and similarly a minus horizontal (CODE = 5) of length B (VALUE = B) is inserted at the end of the right string. B is derined as follows:

B = RHIST(MAXROW = 24) − LHIST(MAXROW = 24) + 1 + Y where Y is computed as set forth in Table 7:

If LCODE(LSTRLEN) = 1 or if RCODE(RSTRLEN) = 5, then these horizontal elements are deleted from the arrays as their contribution is reflected in the value of B.

The L* and R* symbols in the Y TABLE indicate those cases which give rise to a special condition of adjacent horizontals of opposite sign after the bottom horizontal is inserted. A situation of this type is corrected by separating the two horizontals with a vertical segment (CODE = 3) of length 2 (VALUE = 2). Applying the top and bottom procedures to the sample two of FIG. 4 produces the results listed in Table 8. These results are, of course, derived using the data listed in Table 5. At the end of each CODE(I) column in the array, a zero is inserted.

TABLE 8

| I | LCODE(I) | LVALUE(I) | RCODE(I) | RVALUE(I) |
|---|---|---|---|---|
| 1 | 5 | 3 | 1 | 3 |
| 2 | 4 | 3 | 2 | 5 |
| 3 | 3 | 4 | 3 | 12 |
| 4 | 1 | 5 | 1 | 8 |
| 5 | 3 | 2 | 3 | 3 |
| 6 | 4 | 10 | 5 | 12 |
| 7 | 3 | 3 | 0 | |
| 8 | 1 | 12 | | |
| 9 | 0 | | | |
| | LSTRLEN=8 | | RSTRLEN=6 | |

Figure 6:
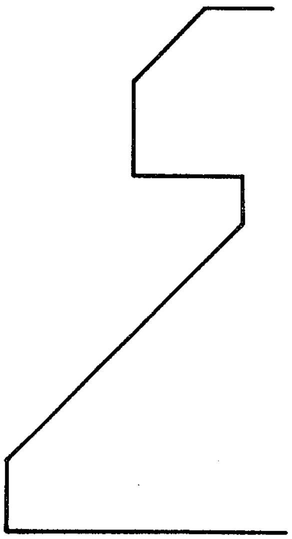
FIG. 6 illustrates the results of fitting the left contour of the two of FIG. 4 with the line segments shown in FIG. 5.
Figure 7:
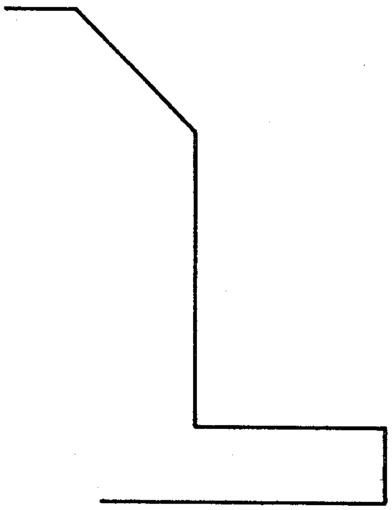
FIG. 7 illustrates the results of fitting the right contour of the two of FIG. 4 with the line segments shown in FIG. 5.

At this point, the algorithms described above have converted the normalized character into a "stick figure" composed of straight line segments. The stick figure for the sample character two is shown in FIGS. 6 and 7. These figures were constructed directly from the data listed in Table 8. The two-like shape of these stick figures is readily apparent. While the stick figures themselves are not actually used, they do facilitate an understanding of the processing.

Figure 8A:
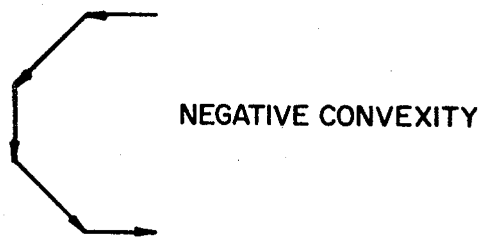
FIGS. 8A and 8B illustrate general negative and positive convexities respectively.
Figure 8B:

The next step of the processing, which is performed in step 3.16, involves the decomposition of the stick figures, or equivalently the CODE arrays, into sequences of positive and negative convexities (i.e., convex and concave). The most general positive convexity has the CODE sequence 1, 2, 3, 4, 5, and is shown in FIG. 8B. The most general negative convexity has the CODE sequence 5, 4, 3, 2, 1, and is shown in FIG. 8A. The actual convexities derived from the stick figures can have between two and five elements, but a convexity with less than five elements is considered to have all five elements present with a length of zero (i.e., VALUE = 0) assigned to non-existent elements. Consider the negative convexity consisting of only two elements, a first horizontal line to the left, and a second slant line sloping downward and to the right, defined as follows:

| I | CODE(I) | VALUE(I) |
|---|---|---|
| 1 | 5 | 2 |
| 2 | 2 | 3 |

This convexity would be viewed as a five element string with a CODE/VALUE table as follows:

| I | CODE(I) | VALUE(I) |
|---|---|---|
| 1 | 5 | 2 |
| 2 | 4 | 0 |
| 3 | 3 | 0 |
| 4 | 2 | 3 |
| 5 | 1 | 0 |

But the final feature vector, which contains information descriptive of the convexities, does not include these values. These values, referred to as "$\alpha$" values, are transformed into "M" values, the M values being those incorporated in the final feature vector. The relationships between the $\alpha$ and M values are as follows:

For the negative convexity:

| I | CODE(I) | VALUE(I) |
|---|---|---|
| 1 | 5 | $\alpha_5$ |
| 2 | 4 | $\alpha_4$ |
| 3 | 3 | $\alpha_3$ |
| 4 | 2 | $\alpha_2$ |
| 5 | 1 | $\alpha_1$ |

$M_1 = -\alpha_5$
$M_2 = -\alpha_5 - \alpha_4$
$M_3 = \alpha_4 + \alpha_3 + \alpha_2$
$M_4 = -\alpha_2 - \alpha_1$
$M_5 = -\alpha_1$ For the positive convexity:

| I | CODE(I) | VALUE(I) |
|---|---|---|
| 1 | 1 | $\alpha_1$ |
| 2 | 2 | $\alpha_2$ |
| 3 | 3 | $\alpha_3$ |
| 4 | 4 | $\alpha_4$ |
| 5 | 5 | $\alpha_5$ |

$M_1 = \alpha_1$
$M_2 = \alpha_1 + \alpha_2$
$M_3 = \alpha_2 + \alpha_3 + \alpha_4$
$M_4 = \alpha_4 + \alpha_5$
$M_5 = \alpha_5$ The five shape measurements corresponding to the negative two-element convexity above are:

$M_1 = -2$
$M_2 = -2$
$M_3 = 3$
$M_4 = -3$
$M_5 = 0$

Thus five numbers are derived for each convexity of the CODE string. A character with A left convexities and B right convexities would produce 5(A+B) shape measurements. A subset of these measurements are used directly as features.

The sign conventions in the above equations are arbitrary. Of the various $\alpha$ values, $\alpha_1$, and $\alpha_5$ are very important because they are direct measures of the top and bottom flat portions of each convexity; for this reason the $M_1$ and $M_5$ values are derived directly from respective ones of the $\alpha_1$ and $\alpha_5$ values. $M_3$ in each case is derived from the sum of $\alpha_2$, $\alpha_3$ and $\alpha_4$, and is a measure of the total length in the vertical direction of the respective convexity. The $M_2$ and $M_4$ values for each convexity represent a measure of the depth of a convexity.

Only odd numbers of convexities can occur on the left or on the right. This is due to the fact that, on the left, the top element is a minus horizontal and the bottom element is a plus horizontal; similarly, on the right, the top element is always a plus horizontal and the bottom is always a minus horizontal. Thus the convexity string on the left must start and end with a negative convexity just as the string on the right must start and end with a positive convexity. In addition, the convexities in a string must alternate in sign since a negative convexity cannot follow a negative convexity nor can a positive convexity follow a positive convexity. Therefore, only odd numbers of convexities can occur in either the left or right strings.

The algorithm for decomposing the CODE array into the alternating convexities just described operates as follows. The program begins on the left side using the LCODE array. Since the left string must begin with a negative convexity, the program will scan the LCODE array from the top searching for a break in the ordered sequence 5, 4, 3, 2, 1. A break is defined to occur with either CODE(J+1)>CODE(J) or CODE(J+1) = 0. A code (J+1) = 0 indicates the termination of the string since the last element of the CODE array was set to zero prior to executing step 3.16. If CODE(J+1)>CODE(J) and CODE(J+1) $\neq$ 0, then the last element of the negative convexity is CODE(J). Since a positive convexity must follow a negative convexity, the program will continue scanning down the CODE array, searching for breaks in the ordered sequence 1, 2, 3, 4, 5. The first element of the positive convexity is the last element of the preceding negative convexity, that is, CODE(J). A break is defined to occur when either CODE(J+1) < CODE(J) or CODE(J+1) = 0. This procedure is continued until an LCODE = 0 is encountered, which signals the completion of the left string. The five measurements described above are computed for each convexity and stored in an array designated LMV(I); where the first five elements of LMV are associated with the first convexity, the next five elements are associated with the second convexity, etc.

Upon completing the left string, the program operates on the right side using the RCODE array. Since the right string must begin with a positive convexity, the program scans the RCODE array searching for a break in the ordered sequence 1, 2, 3, 4, 5. Upon noting a break, the five measurements associated with the convexity are stored in an array designated RMV. The procedure is continued as described above, alternating between positive and negative convexities until an RCODE = 0 is encountered which signals the termination of the decomposition procedure. The number of convexities found on the left and right are stored and designated LCONVEX and RCONVEX respectively.

As an example of this procedure, consider the LCODE array listed in Table 8. The first break in the first negative convexity occurs at I = 4, since LCODE(5) = 3 and LCODE(4) = 1. Thus, the first convexity has elements 5, 4, 3, 1. The scan of the next positive convexity begins at I = 4 and ends with the break at I = 6 since LCODE(7) = 3<LCODE(6) = 4. The second convexity has elements 1, 3, 4. The scan is continued with I = 6 and terminates at I = 9 since LCODE(9) = 0. The last negative convexity has elements 4, 3, 1. The end results of the procedures outlined above for the sample two of FIG. 4 are listed in Tables 9 and 10 for the left and right sides respectively:

TABLE 9

(Left Side)

| Lcode(I) | Lvalue(I) | $\alpha$ | LMV(I) | CONVEXITY |
|---|---|---|---|---|
| 5 | 3 | $\alpha 5 = 3$ | $M_1 = -3$ | |
| 4 | 3 | $\alpha 4 = 3$ | $M_2 = -6$ | |
| 3 | 4 | $\alpha 3 = 4$ | $M_3 = 7$ | negative |
| 1 | 5 | $\alpha 2 = 0$ | $M_4 = -5$ | |
| | | $\alpha 1 = 5$ | $M_5 = -5$ | |
| 1 | 5 | $\alpha 1 = 5$ | $M_1 = 5$ | |
| 3 | 2 | $\alpha 2 = 0$ | $M_2 = 5$ | |
| 4 | 10 | $\alpha 3 = 2$ | $M_3 = 12$ | positive |
| | | $\alpha 4 = 10$ | $M_4 = 10$ | |
| | | $\alpha 5 = 0$ | $M_5 = 0$ | |
| 4 | 10 | $\alpha 5 = 0$ | $M_1 = -0$ | |
| 3 | 3 | $\alpha 4 = 10$ | $M_2 = -10$ | |
| 1 | 12 | $\alpha 3 = 3$ | $M_3 = 13$ | negative |
| | | $\alpha 2 = 0$ | $M_4 = -12$ | |
| | | $\alpha 1 = 12$ | $M_5 = -12$ | |

LCONVEX = 3

TABLE 10

(Right Side)

| Rcode(I) | Rvalue(I) | $\alpha$ | RMV(I) | CONVEXITY |
|---|---|---|---|---|
| 1 | 3 | $\alpha 1 = 3$ | $M_1 = 3$ | |
| 2 | 5 | $\alpha 2 = 5$ | $M_2 = 8$ | |
| 3 | 12 | $\alpha 3 = 12$ | $M_3 = 17$ | positive |
| | | $\alpha 4 = 0$ | $M_4 = 0$ | |
| | | $\alpha 5 = 0$ | $M_5 = 0$ | |
| 3 | 12 | $\alpha 5 = 0$ | $M_1 = -0$ | |
| 1 | 8 | $\alpha 4 = 0$ | $M_2 = -0$ | |
| | | $\alpha 3 = 12$ | $M_3 = 12$ | negative |
| | | $\alpha 2 = 0$ | $M_4 = -8$ | |
| | | $\alpha 1 = 8$ | $M_5 = -8$ | |
| 1 | 8 | $\alpha 1 = 8$ | $M_1 = 8$ | |
| 3 | 3 | $\alpha 2 = 0$ | $M_2 = 8$ | |
| 5 | 12 | $\alpha 3 = 3$ | $M_3 = 3$ | positive |
| | | $\alpha 4 = 0$ | $M_4 = 12$ | |
| | | $\alpha 5 = 12$ | $M_5 = 12$ | |

RCONVEX = 3

In step 3.17, prior to finalizing the feature vector in step 3.18, the program checks the numbers of convexities found in the left and right strings (i.e., LCONVEX and RCONVEX) to see if either exceeds five convexities. In the event that more than five convexities do exist in a string, the CODE array for that string is modified by deleting certain elements such that the resulting string has no more than five convexities. The rule used for selecting an element to be deleted is as follows: the CODE array formed in step 3.15 (Table 8) is scanned to identify that element with the smallest VALUE subject to the constraint that the element selected is not between horizontals of opposite sign nor the top or bottom elements. If two original elements have the same smallest value, it is the one closest to the top which is deleted. After the selected element is removed, the program combines the newly adjacent elements if they are of the same CODE type. For example, suppose that a sub-sequence of a CODE string is

| I | CODE(I) | VALUE(I) |
|---|---|---|
| J − 1 | 2 | 7 |
| J | 3 | 2 |
| J + 1 | 2 | 6 |

and the vertical element is removed because its value is the smallest in the array. In this case the two adjacent elements are both positive slants and therefore combined such that CODE(J−1) = 2, VALUE(J−1) = 13. New Tables equivalent to Tables 9 and 10 are constructed, and once again the number of convexities in each array is counted. If the number of convexities on either the left or the right side exceeds five, the procedure is repeated for the respective string until the final number of convexities is no greater than five.

In step 3.18, the final feature vector is constructed using the previously computed eight special measurements and the shape measurements stored in the LMV and RMV arrays. The principal operation performed in step 3.18 is the elimination of redundant measurements from MV arrays. Since the first measurement of one convexity is equal to minus the last measurement of the preceding convexity and therefore provides no additional information regarding the identity of the character, one of the measurements can be omitted. If the character in question possesses A convexities on the left (i.e., LCONVEX = A) and B convexities on the right (i.e., RCONVEX = B), then A + B − 2 of the shape measurements will be redundant and will not be used in the final feature vector. In addition, the first and last shape measurements on the right are equal to the negative of the first and last on the left since both strings share common top and bottom measurements. These two measurements are also redundant and are not used. Thus, if the character has A and B convexities on the left and right respectively, the result of removing redundant measurements is to produce $$5(A + B) - (A + B - 2) - 2 = 4(A + B)$$

shape measurements.

The algorithm for constructing the final feature vector is as follows: the LMV array is copied into the final feature vector array, designated X, shipping over LMV(J) where J = 5*N + 1 for N = 1, 2, . . . and N < LCONVEX. Next, copying into X is continued, now using the RMV array skipping over RMV(P) where P = 5*M + 1 for M = 0, 1, 2, . . . and M < RCONVEX. In addition, the last element of RMV (i.e., RMV (5 * RCONVEX)) is skipped over. Finally, the eight special measurements are copied into the array in the following order:

X(4 * (LCONVEX + RCONVEX) + 1) = MOTOP
X(4 * (LCONVEX + RCONVEX) + 2) = MIDUP
= MIDUP2
= MIDAVE
= BOTAVE
= OVRAVE
= TOPLIN
X(4 * (LCONVEX + RCONVEX) + 8) = BOTLIN

The final feature vector corresponding to the sample two of FIG. 4 is listed in Table 11. The first 24 features are derived directly from the data in Tables 9 and 10 using the copying algorithm described above. The remaining eight features are simply copied from their respective storage locations.

TABLE 11

| | Final Feature Vector |
|---|---|
| I : | X(I) |
| 1 : | −3 |
| 2 : | −6 |
| 3 : | 7 |
| 4 : | −5 |
| 5 : | −5 |
| 6 : | 5 |
| 7 : | 12 |
| 8 : | 10 |
| 9 : | 0 |
| 10 : | −10 |
| 11 : | 13 |
| 12 : | −12 |
| 13 : | −12 |
| 14 : | 8 |
| 15 : | 17 |
| 16 : | 0 |
| 17 : | 0 |
| 18 : | −0 |
| 19 : | 12 |
| 20 : | −8 |
| 21 : | −8 |
| 22 : | 8 |
| 23 : | 3 |
| 24 : | 12 |
| 25 : | 29 |
| 26 : | 12 |
| 27 : | 8 |
| 28 : | 4 |
| 29 : | 7 |
| 30 : | 5 |
| 31 : | 8 |
| 32 : | 7 |

The importance of the feature vector computation is that each character type produces a feature vector which can be distinguished from the feature vectors produced by the other characters. For example, the two's written by different persons are all different and therefore result in many different two feature vectors. But as a class the vast majority of all of these vectors can be distinguished from all of the vectors in the "one" class, the "three" class, etc. The classification logic is designed to discriminate between classes of feature vectors. The principles of feature extraction described above enable feature vectors to be constructed which fall into separate classes, so that they can then be discriminated.

At this point, the program has computed the feature vector and the sort group of the character. The sort group is designated by the ordered pair (LCONVEX, RCONVEX). Since the number of convexities must be odd and less than or equal to five for each string, there exists only nine possible sort groups, that is, (1,1), (1,3), (1,5), (3,1), (3,3) (3,5), (5,1), (5,3), (5,5). The sort group is used by the illustrative program of the invention to retrieve the classification logic which will operate on the feature vector to eventually produce a decision. In step 3.19, the sort group may be used to look up in a stored table the address (i.e., a pointer) of the first logic test for that sort group. Control is then given to the classification program which orders the pairwise logic tests required to achieve a decision.

Figure 9:
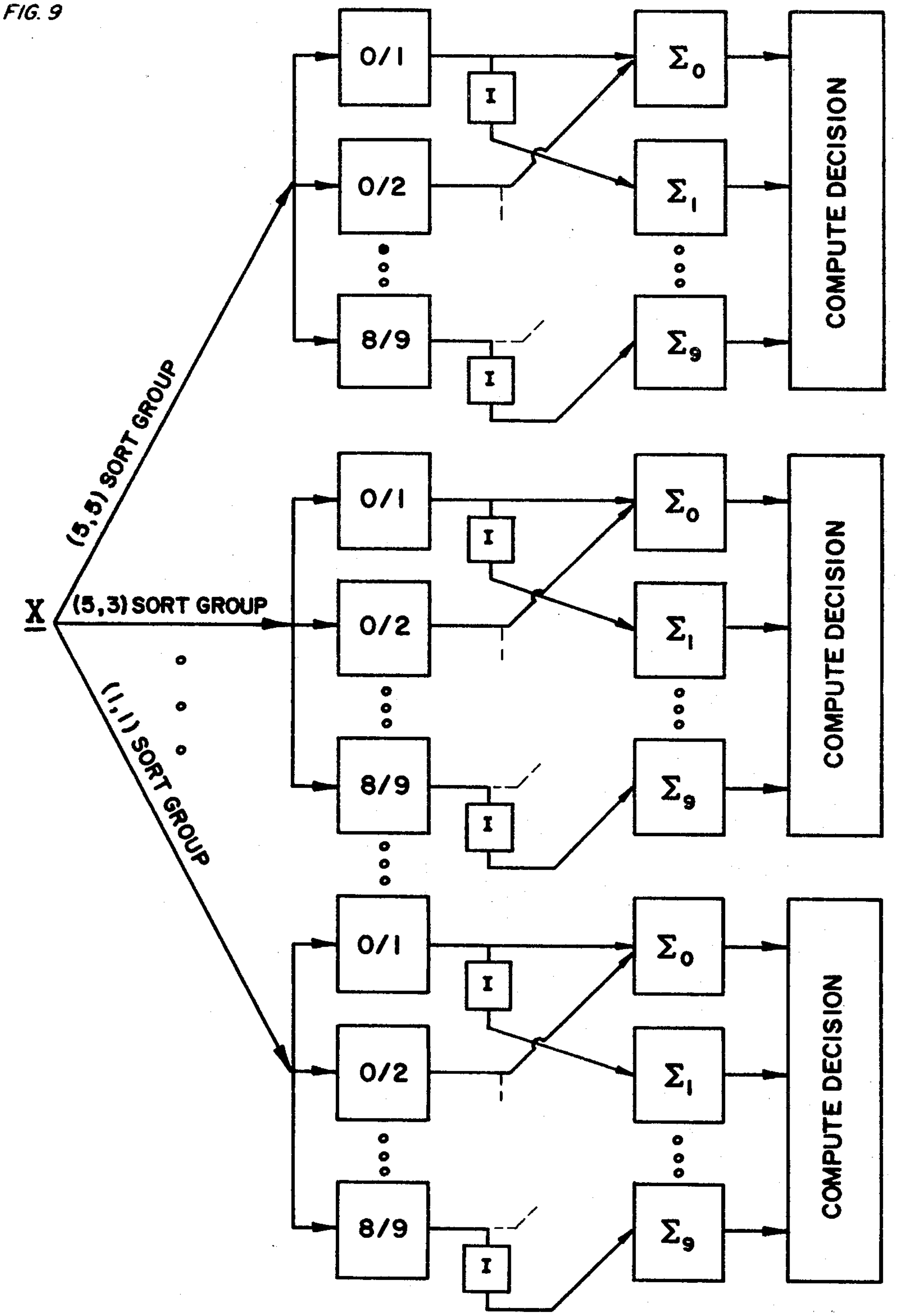
FIG. 9 is a function block diagram of the classification logic for the illustrative numeric reader of the invention.

FIG. 9 illustrates a functional description of the numeric classification logic. The feature vector, designated X, is directed to one of nine separate logics (one for each sort group), depending upon the sort group associated with the feature vector. The sort group logic is composed of a number of character class pairwise tests, designated by the I/J boxes, where I and J are used symbolically to represent different numerics. The operation within each such box is the computation of an optimal linear discriminant specifically designed to distinguish I's from J's. Each I/J computation produces a decision reflecting whether the character looks more like an I than a J or vice versa, or that it does not resemble either I or J. The I/J box outputs one of three possible decisions. First, it may output a one which is interpreted as a vote for character class I. Second, the output may be a "zero" which is interpreted as a vote for character class J. Finally, it may output a reject signal indicating that the character does not resemble either I or J. The I boxes are inverters which produce one outputs for zero inputs, or zero outputs for one inputs. The votes for each class are summed in their respective Σ boxes. A reject signal from an I/J box does not increment the vote count for either class I or class J.

If the logic for a particular sort group must discriminate K character classes, then that logic is comprised of (K) (K −1)/2 pairwise discriminant tests. For this case, the maximum number of votes possible for any character class is (K−1) votes. If no character class achieves all (K−1) votes, the final decision is a rejection of the character which terminates the recognition procedure. In the event that a particular character class, say class P, receives (K−1) votes, a final decision is made that the unknown character is a P. In such a case, no other character class can have (K−1) votes since each class had to lose a potential vote to P in order that P achieve the maximum number (K−1) of votes.

The functional logic diagram shown in FIG. 9 provides for the possibility that the logic for each sort group must discriminate between all the numeric classes. In reality, every numeral has a preferred set of sort groups where it will normally be found. For example; zeros and ones are normally found in the (1,1) sort group; twos, fives and eights in the (3,3) sort group; threes in the (5,3) sort group; fours in the (3,5) sort group; sixes in the (1,3) sort group and finally, sevens and nines distributed across the (3,3) and (3,1) sort groups. The statistical distribution of over 60,000 illustrative numeric handprinted characters are listed in Table 12.

TABLE 12

| | 0 | 1 | 2 | 3 | 4 | 5 | 6 | 7 | 8 | 9 | Total |
|---|---|---|---|---|---|---|---|---|---|---|---|
| 5,5 | 27 | 58 | 86 | 400 | 703 | 94 | 10 | 190 | 32 | 28 | 1,628 |
| 5,3 | 52 | 34 | 1,036 | 6,586 | 181 | 740 | 165 | 218 | 184 | 65 | 9,261 |
| 5,1 | 76 | 56 | 4 | 792 | 182 | 0 | 2 | 340 | 7 | 86 | 1,545 |
| 3,5 | 92 | 29 | 494 | 4 | 2,986 | 441 | 77 | 393 | 505 | 310 | 5,331 |
| 3,3 | 424 | 91 | 7,781 | 21 | 673 | 5,824 | 1,019 | 1,243 | 4,404 | 1,612 | 23,092 |
| 3,1 | 1,108 | 400 | 10 | 2 | 1,351 | 1 | 2 | 2,456 | 216 | 2,866 | 8,412 |
| 1,5 | 214 | 62 | 1 | 1 | 52 | 0 | 443 | 0 | 46 | 1 | 820 |
| 1,3 | 1,180 | 254 | 1 | 7 | 10 | 9 | 5,513 | 1 | 260 | 1 | 7,236 |
| 1,1 | 5,317 | 6,691 | 0 | 2 | 3 | 0 | 3 | 0 | 8 | 1 | 12,045 |

An inspection of Table 12 clearly indicates that the logic for each sort group need not discriminate between all 10 numeric classes. The actual classes discriminated by each sort group logic, in one embodiment of the present invention, are listed in Table 13.

TABLE 13

| Sort Group : | Character Classes Discriminated |
|---|---|
| (1,1) : | 0 1 |
| (1,3) : | 0 1 6 8 |
| (1,5) : | 0 1 4 6 |
| (3,1) : | 0 1 4 7 8 9 |
| (3,3) : | 0 1 2 4 5 6 7 8 9 |
| (3,5) : | 0 2 4 5 6 7 8 9 |
| (5,1) : | 0 3 4 7 9 |
| (5,3) : | 2 3 4 5 6 7 8 9 |
| (5,5) : | 1 2 3 4 5 7 |

The proper interpretation of Table 13 is as follows; for the (1,1) sort group, only one pairwise logic test is used to discriminate between 0 and 1. The logic for the (1,3) sort group is comprised of six pairwise logic tests, that is, 0 vs 1, 0 vs 6, 0 vs 8, 1 vs 6, 1 vs 8, and 6 vs 8, etc.

The character class pairwise tests indicated by the I/J boxes in FIG. 9 are implemented using optimal linear discriminants. The feature extraction algorithms operate to transform the binary raster representation of a character into its feature vector form designated by the L-dimensional vector X; that is, $$X = \begin{bmatrix} X_1 \\ X_2 \\ \cdot \\ \cdot \\ \cdot \\ X_L \end{bmatrix}$$

where the $X_i$ elements correspond to the actual features. A linear discriminant is computed by taking the inner product of the discriminant vector, designated $d$ (there being a separate discriminant vector for every pairwise test), with the character feature vector X, where $$d = \begin{bmatrix} d_1 \\ d_2 \\ \cdot \\ \cdot \\ \cdot \\ d_L \end{bmatrix}$$

The inner product generates a scalar Z (i.e., a number) which is used to make a decision between the two classes. Specifically, the inner product is given by $$Z = \langle \underline{d}, \underline{X} \rangle = \underline{d}^T \underline{X} = \sum_{i=1}^{L} d_i X_i$$

where $d^T$ is the transpose of vector $d$.

Thus, the inner product is nothing more than a weighted linear combination of the $X_i$ features. The decision output from each I/J box is arrived at by comparing Z against four thresholds designated $\theta_1$, $\theta_2$, $\theta_3$, and $\theta_4$. Specifically, the output from an I/J box is determined as follows:

| Condition | Decision |
|---|---|
| $Z \le \theta_1$ | No vote |
| $\theta_1 \ge Z \ge \theta_2$ | Vote for Class I |
| $\theta_2 \le Z \le \theta_3$ | No vote |
| $\theta_3 \ge Z \ge \theta_4$ | Vote for class J |
| $\theta_4 \le Z$ | No vote |

A geometrical interpretation of this pairwise decision procedure can be obtained by envisioning that the discriminant computation produces a numerical value for Z which can be plotted along the Z axis as shown below. The four thresholds subdivide the Z axis into five disjoint regions labeled I, II, III, IV and V. A feature vector which produces a value of Z that falls in regions I, III or V causes a rejection signal to be output from an I/J box, which is regarded as a No Vote condition for both classes I and J. A value of Z falling in region II produces a vote for I and similarly a value of Z lying in region IV produces a vote for class J.

| | I | II | III | IV | V | |
|---|---|---|---|---|---|---|
| Decision: | rejection | I | rejection | J | rejection | Z axis |
| | $\theta_1$ | $\theta_2$ | | $\theta_3$ | $\theta_4$ | |

The discriminant vectors utilized in the illustrative embodiment of the invention were computed using a well-known method devised by R.A. Fisher and described in his article "The Use of Multiple Measurements in Taxonomic Problems", Ann. Eugen, Vol. 7, pp. 179–188, Sept. 1936. The method is a statistical procedure for computing the optimal discriminant

TABLE 14

SORT CLASS 1,1
16 DIMENSIONS

DISCRIMINANT PAIR 1/0

THRESHOLD 1=-INF THRESHOLD 2=THRESHOLD 3= -860 THRESHOLD 4=+INF

WEIGHTS

| | | | | | | | |
|---|---|---|---|---|---|---|---|
| -5 | -2 | 16 | 0 | -2 | 0 | 5 | 0 |
| -0 | -5 | 0 | -16 | 6 | -3 | -46 | -115 |

SORT CLASS 1,3
24 DIMENSIONS

DISCRIMINANT PAIR 1/0

THRESHOLD 1=-INF THRESHOLD 2=THRESHOLD 3= 344 THRESHOLD 4=+INF

WEIGHTS

| | | | | | | | |
|---|---|---|---|---|---|---|---|
| -3 | 1 | 47 | 0 | -3 | 2 | 17 | 16 |
| -10 | 11 | 4 | 9 | -17 | 4 | 19 | -0 |
| -2 | -4 | 0 | -26 | 11 | 2 | -39 | -98 |

DISCRIMINANT PAIR 6/0

THRESHOLD 1=-INF THRESHOLD 2=THRESHOLD 3= -691 THRESHOLD 4=+INF

WEIGHTS

| | | | | | | | |
|---|---|---|---|---|---|---|---|
| -2 | 4 | 9 | 1 | -1 | -8 | -0 | 6 |
| -3 | -3 | 0 | 11 | -10 | 10 | 5 | -1 |
| -0 | -6 | 0 | 14 | 3 | -23 | -120 | 7 |

DISCRIMINANT PAIR 8/0

THRESHOLD 1=-INF THRESHOLD 2=THRESHOLD 3= 978 THRESHOLD 4=+INF

WEIGHTS

| | | | | | | | |
|---|---|---|---|---|---|---|---|
| -13 | 0 | 15 | 1 | 5 | 4 | 9 | -9 |
| 4 | -25 | 10 | 14 | 9 | 4 | 15 | 2 |
| -13 | -29 | 2 | -84 | 36 | 45 | 32 | 38 |

DISCRIMINANT PAIR 6/1

THRESHOLD 1=-INF THRESHOLD 2=THRESHOLD 3= -440 THRESHOLD 4=+INF

WEIGHTS

| | | | | | | | |
|---|---|---|---|---|---|---|---|
| -26 | -0 | -11 | -5 | 16 | -59 | -10 | 20 |
| 9 | 22 | -38 | -36 | 34 | 3 | -7 | 10 |
| 2 | 0 | 0 | -10 | 47 | -29 | 1 | 52 |

DISCRIMINANT PAIR 8/1

THRESHOLD 1=-INF THRESHOLD 2=THRESHOLD 3= 1463 THRESHOLD 4=+INF

WEIGHTS

| | | | | | | | |
|---|---|---|---|---|---|---|---|
| 1 | 0 | 6 | -4 | 6 | 7 | 0 | -7 |
| -3 | -8 | 0 | 6 | 4 | 4 | 1 | 4 |
| 0 | 1 | 1 | -30 | -4 | 38 | 68 | 93 |

DISCRIMINANT PAIR 8/6

THRESHOLD 1=-INF THRESHOLD 2=THRESHOLD 3= 848 THRESHOLD 4=+INF

WEIGHTS

| | | | | | | | |
|---|---|---|---|---|---|---|---|
| 1 | 2 | -6 | 3 | -0 | 40 | 3 | -12 |
| -20 | -13 | 10 | 3 | 1 | -4 | -13 | -1 |
| -3 | -1 | 0 | 0 | -6 | 8 | 114 | 11 |

SORT CLASS 1,5
32 DIMENSIONS

DISCRIMINANT PAIR 1/0

THRESHOLD 1=-INF THRESHOLD 2=THRESHOLD 3= -1070 THRESHOLD 4=+INF

WEIGHTS

| | | | | | | | |
|---|---|---|---|---|---|---|---|
| -3 | -0 | 0 | 1 | -5 | 4 | -3 | 1 |
| 44 | 0 | -2 | 0 | -27 | 0 | 0 | -9 |
| 0 | 1 | -1 | -4 | 88 | 0 | -1 | -10 |
| -2 | -1 | -1 | -28 | 1 | -14 | -55 | -32 |

DISCRIMINANT PAIR 4/0

THRESHOLD 1=-INF THRESHOLD 2=THRESHOLD 3= -1070 THRESHOLD 4=+INF

WEIGHTS

| | | | | | | | |
|---|---|---|---|---|---|---|---|
| 10 | -4 | -12 | 22 | -23 | -10 | 5 | -8 |
| 18 | 7 | -16 | -2 | 3 | 3 | -36 | 16 |
| -0 | 7 | 0 | 1 | -14 | 11 | -49 | 24 |
| -31 | -12 | -32 | -36 | 37 | 13 | -14 | -11 |

DISCRIMINANT PAIR 6/0

THRESHOLD 1=-INF THRESHOLD 2=THRESHOLD 3= -810 THRESHOLD 4=+INF

WEIGHTS

| | | | | | | | |
|---|---|---|---|---|---|---|---|
| -8 | 12 | -12 | 5 | -12 | -11 | -5 | 14 |
| -13 | 0 | -2 | 9 | -16 | 12 | 12 | -30 |
| 8 | -18 | 18 | 46 | -27 | 36 | 12 | -14 |
| -6 | -13 | -0 | 11 | 15 | -22 | -80 | 16 |

DISCRIMINANT PAIR 4/1

THRESHOLD 1=-INF THRESHOLD 2=THRESHOLD 3= -810 THRESHOLD 4=+INF

WEIGHTS

| | | | | | | | |
|---|---|---|---|---|---|---|---|
| 10 | -4 | -12 | 22 | -23 | -10 | 5 | -8 |
| 18 | 7 | -16 | -2 | 3 | 3 | -36 | 16 |
| -0 | 7 | 0 | 1 | -14 | 11 | -49 | 24 |
| -31 | -12 | -32 | -36 | 37 | 13 | -14 | -11 |

DISCRIMINANT PAIR 6/1

THRESHOLD 1=-INF THRESHOLD 2=THRESHOLD 3= 390 THRESHOLD 4=+INF

WEIGHTS

| | | | | | | | |
|---|---|---|---|---|---|---|---|
| 81 | -1 | -7 | -6 | 12 | 18 | -6 | -12 |
| 44 | 0 | 22 | 12 | -11 | 18 | -5 | 12 |
| -30 | 5 | -12 | 10 | -3 | 21 | -9 | 4 |
| -0 | 3 | -0 | 19 | 30 | -12 | 32 | 31 |

DISCRIMINANT PAIR 6/4

THRESHOLD 1=-INF THRESHOLD 2=THRESHOLD 3= 390 THRESHOLD 4=+INF

WEIGHTS

| | | | | | | | |
|---|---|---|---|---|---|---|---|
| 10 | -4 | -12 | 22 | -23 | -10 | 5 | -8 |
| 18 | 7 | -16 | -2 | 3 | 3 | -36 | 16 |
| -0 | 7 | 0 | 1 | -14 | 11 | -49 | 24 |
| -31 | -12 | -32 | -36 | 37 | 13 | -14 | -11 |

SORT CLASS 3,1
24 DIMENSIONS

DISCRIMINANT PAIR 1/0

THRESHOLD 1=-INF THRESHOLD 2=THRESHOLD 3= -743 THRESHOLD 4=+INF

WEIGHTS

| | | | | | | | |
|---|---|---|---|---|---|---|---|
| -6 | 2 | 0 | 37 | 8 | 23 | 0 | 13 |
| 16 | 13 | -0 | 2 | -3 | 3 | 7 | -2 |
| 0 | -2 | -1 | -64 | 7 | 46 | -24 | -79 |

DISCRIMINANT PAIR 4/0

THRESHOLD 1=-INF THRESHOLD 2=THRESHOLD 3= -999 THRESHOLD 4=+INF

WEIGHTS

| | | | | | | | |
|---|---|---|---|---|---|---|---|
| -28 | 10 | -2 | -17 | -60 | -32 | -12 | 5 |
| -32 | 5 | -12 | 7 | -16 | 3 | -8 | -12 |
| 5 | -10 | 0 | -31 | -3 | 14 | 9 | -81 |

DISCRIMINANT PAIR 7/0

THRESHOLD 1=-INF THRESHOLD 2=THRESHOLD 3= -1122 THRESHOLD 4=+INF

WEIGHTS

| | | | | | | | |
|---|---|---|---|---|---|---|---|
| -1 | 2 | -5 | 0 | -7 | -6 | 0 | 8 |
| 5 | 8 | -1 | 1 | -1 | 3 | -2 | 0 |
| 0 | 0 | -1 | -43 | 5 | 26 | -13 | -113 |

DISCRIMINANT PAIR 8/0

THRESHOLD 1=-INF THRESHOLD 2=THRESHOLD 3= 688 THRESHOLD 4=+INF

WEIGHTS

| | | | | | | | |
|---|---|---|---|---|---|---|---|
| -9 | 0 | 5 | -22 | 6 | -17 | 4 | 7 |
| -0 | 5 | 3 | 0 | 0 | 1 | 18 | 0 |
| -10 | -18 | 2 | -92 | 19 | 63 | 20 | 27 |

DISCRIMINANT PAIR 9/0

THRESHOLD 1=-INF THRESHOLD 2=THRESHOLD 3= -632 THRESHOLD 4=+INF

WEIGHTS

| | | | | | | | |
|---|---|---|---|---|---|---|---|
| 0 | 0 | 9 | -8 | -15 | -10 | -4 | 0 |
| 2 | -7 | 1 | 2 | -11 | 2 | 4 | -5 |
| -1 | -4 | 4 | -23 | -13 | 22 | 12 | -117 |

DISCRIMINANT PAIR 4/1

THRESHOLD 1=-INF THRESHOLD 2=THRESHOLD 3= 284 THRESHOLD 4=+INF

WEIGHTS

| | | | | | | | |
|---|---|---|---|---|---|---|---|
| 0 | -2 | -1 | -6 | -2 | 0 | -2 | 82 |
| 4 | 84 | -3 | 7 | -3 | 3 | -2 | 1 |
| 0 | 0 | 0 | -5 | -2 | 4 | 43 | 3 |

DISCRIMINANT PAIR 7/1

THRESHOLD 1=-INF THRESHOLD 2=THRESHOLD 3= 92 THRESHOLD 4=+INF

WEIGHTS

| | | | | | | | |
|---|---|---|---|---|---|---|---|
| 0 | 0 | -16 | -7 | 0 | -4 | 0 | 85 |
| 5 | 85 | -1 | 2 | 2 | 5 | -3 | 1 |
| -0 | 8 | 10 | -5 | -11 | 0 | 14 | 23 |

DISCRIMINANT PAIR 8/1

THRESHOLD 1=-INF THRESHOLD 2=THRESHOLD 3= 387 THRESHOLD 4=+INF

WEIGHTS

| | | | | | | | |
|---|---|---|---|---|---|---|---|
| 1 | 0 | -6 | -14 | 13 | -6 | 0 | 61 |
| 5 | 60 | -7 | 5 | 6 | 5 | -18 | 2 |
| 0 | -2 | 2 | -7 | 18 | 2 | 66 | 53 |

DISCRIMINANT PAIR 9/1

THRESHOLD 1=-INF THRESHOLD 2=THRESHOLD 3= 740 THRESHOLD 4=+INF

WEIGHTS

| | | | | | | | |
|---|---|---|---|---|---|---|---|
| 7 | -4 | 2 | -14 | 4 | 13 | -8 | -6 |
| 0 | -1 | -6 | 31 | -15 | 5 | -4 | 2 |
| -3 | 11 | 32 | -39 | -4 | 35 | 100 | -8 |

DISCRIMINANT PAIR 7/4

THRESHOLD 1=-INF THRESHOLD 2=THRESHOLD 3= -1400 THRESHOLD 4=+INF

WEIGHTS

| | | | | | | | |
|---|---|---|---|---|---|---|---|
| 19 | -13 | -53 | -12 | 16 | -13 | -1 | 2 |
| -8 | 0 | 1 | -4 | 14 | 14 | -19 | 5 |
| -13 | 28 | -15 | -40 | 5 | 58 | -69 | 4 |

DISCRIMINANT PAIR 8/4

THRESHOLD 1=-INF THRESHOLD 2=THRESHOLD 3= 451 THRESHOLD 4=+INF

WEIGHTS

| | | | | | | | |
|---|---|---|---|---|---|---|---|
| 0 | 2 | -2 | -0 | 15 | 8 | 3 | -78 |
| -30 | -85 | 5 | -7 | 2 | 0 | 3 | 2 |
| -2 | -1 | 0 | 5 | 0 | -1 | 5 | 33 |

DISCRIMINANT PAIR 9/4

THRESHOLD 1=-INF THRESHOLD 2=THRESHOLD 3= -233 THRESHOLD 4=+INF

WEIGHTS

| | | | | | | | |
|---|---|---|---|---|---|---|---|
| 45 | -20 | -8 | -19 | 28 | -0 | -5 | 5 |
| -7 | -0 | 0 | 0 | -28 | 7 | -6 | -1 |
| -40 | 6 | -2 | -34 | -24 | 80 | 32 | 20 |

DISCRIMINANT PAIR 8/7

THRESHOLD 1=-INF THRESHOLD 2=THRESHOLD 3= 1135 THRESHOLD 4=+INF

WEIGHTS

| | | | | | | | |
|---|---|---|---|---|---|---|---|
| -2 | 0 | 9 | 0 | 10 | 9 | 0 | 0 |
| 4 | 0 | 0 | -3 | 0 | -3 | 3 | -0 |
| 0 | -3 | 0 | 11 | 15 | -23 | 13 | 121 |

DISCRIMINANT PAIR 9/7

THRESHOLD 1=-INF THRESHOLD 2=THRESHOLD 3= 1425 THRESHOLD 4=+INF

WEIGHTS

| | | | | | | | |
|---|---|---|---|---|---|---|---|
| 13 | 0 | 57 | -2 | -21 | -6 | 4 | 3 |
| 13 | 3 | -4 | -7 | -0 | -5 | 31 | -2 |
| -3 | -12 | 25 | -37 | -26 | 53 | 60 | -36 |

DISCRIMINANT PAIR 9/8

THRESHOLD 1=-INF THRESHOLD 2=THRESHOLD 3= -738 THRESHOLD 4=+INF

WEIGHTS

| | | | | | | | |
|---|---|---|---|---|---|---|---|
| 1 | -1 | 14 | 0 | -16 | -10 | -2 | -17 |
| 16 | -17 | -2 | 14 | 1 | 1 | 2 | 0 |
| 0 | 1 | 3 | -13 | 5 | 10 | -5 | -118 |

SORT CLASS 3,3
32 DIMENSIONS

DISCRIMINANT PAIR 1/0

THRESHOLD 1=-INF THRESHOLD 2=THRESHOLD 3= -247 THRESHOLD 4=+INF

WEIGHTS

| | | | | | | | |
|---|---|---|---|---|---|---|---|
| -0 | -6 | -9 | 11 | 6 | 0 | 9 | -7 |
| -4 | 0 | -4 | -6 | 1 | 0 | 10 | 3 |
| 20 | 11 | 14 | 65 | -14 | 41 | 14 | -7 |
| 1 | -2 | -2 | -64 | -2 | 50 | -36 | -15 |

DISCRIMINANT PAIR 2/0

THRESHOLD 1=-INF THRESHOLD 2=THRESHOLD 3= -953 THRESHOLD 4=+INF

WEIGHTS

| | | | | | | | |
|---|---|---|---|---|---|---|---|
| 4 | -5 | 2 | -8 | -15 | 5 | 1 | -11 |
| 13 | -11 | -2 | 10 | -28 | 0 | -4 | -5 |
| -8 | -7 | 1 | -12 | 16 | 20 | -20 | -22 |
| 0 | -5 | -0 | -100 | 16 | 23 | -10 | -37 |

DISCRIMINANT PAIR 4/0

THRESHOLD 1=-INF THRESHOLD 2=THRESHOLD 3= -571 THRESHOLD 4=+INF

WEIGHTS

| | | | | | | | |
|---|---|---|---|---|---|---|---|
| -25 | -9 | -16 | -48 | -29 | -1 | -11 | -23 |
| -33 | -9 | -5 | 0 | 15 | -15 | -13 | -23 |
| 1 | -9 | 8 | 60 | -50 | 30 | -8 | -12 |
| 14 | -9 | 2 | -27 | -7 | 0 | -2 | -7 |

DISCRIMINANT PAIR 5/0

THRESHOLD 1=-INF THRESHOLD 2=THRESHOLD 3= -1202 THRESHOLD 4=+INF

WEIGHTS

| | | | | | | | |
|---|---|---|---|---|---|---|---|
| -12 | 3 | 18 | -10 | -24 | -0 | -20 | 13 |
| -8 | -0 | -20 | -8 | 7 | 2 | -40 | 32 |
| -36 | -18 | -14 | -17 | 18 | -3 | -2 | -3 |
| 2 | -3 | 5 | -49 | 15 | -24 | -71 | -1 |

DISCRIMINANT PAIR 6/0

THRESHOLD 1=-INF THRESHOLD 2=THRESHOLD 3= -305 THRESHOLD 4=+INF

WEIGHTS

| | | | | | | | |
|---|---|---|---|---|---|---|---|
| -14 | 9 | -3 | -59 | -26 | -66 | 1 | -12 |
| -48 | -8 | -4 | 0 | 3 | -9 | -4 | 14 |
| -2 | 8 | 6 | 9 | -10 | 11 | 0 | -5 |
| -1 | -7 | 0 | 1 | 8 | -7 | -49 | 31 |

DISCRIMINANT PAIR 7/0

THRESHOLD 1=-INF THRESHOLD 2=THRESHOLD 3= -954 THRESHOLD 4=+INF

WEIGHTS

| | | | | | | | |
|---|---|---|---|---|---|---|---|
| -0 | -3 | -14 | -14 | 11 | 6 | 0 | -23 |
| -15 | -23 | -2 | 0 | 6 | -0 | -2 | 7 |
| 0 | 5 | 1 | -15 | -15 | -23 | -1 | -4 |
| -0 | 3 | -0 | -74 | 5 | 38 | -18 | -74 |

DISCRIMINANT PAIR 8/0

THRESHOLD 1=-INF THRESHOLD 2=THRESHOLD 3= 89 THRESHOLD 4=+INF

WEIGHTS

| | | | | | | | |
|---|---|---|---|---|---|---|---|
| -0 | -5 | 9 | -10 | -13 | -13 | 4 | 30 |
| -6 | 35 | -7 | -8 | 4 | 7 | -3 | -10 |
| 0 | -16 | 4 | -11 | 4 | -10 | 6 | 1 |
| -1 | -23 | 0 | -68 | 19 | 35 | -33 | 43 |

DISCRIMINANT PAIR 9/0

THRESHOLD 1=-INF THRESHOLD 2=THRESHOLD 3= -225 THRESHOLD 4=+INF

WEIGHTS

| | | | | | | | |
|---|---|---|---|---|---|---|---|
| 0 | 0 | 12 | -25 | -18 | -3 | -7 | 0 |
| 1 | -6 | 3 | 2 | -11 | 0 | -4 | -23 |
| -6 | -18 | 4 | 68 | -21 | 59 | -1 | -8 |
| -2 | -5 | 13 | -38 | -26 | 26 | 13 | -40 |

DISCRIMINANT PAIR 2/1

THRESHOLD 1=-INF THRESHOLD 2=THRESHOLD 3= 61 THRESHOLD 4=+INF

WEIGHTS

| | | | | | | | |
|---|---|---|---|---|---|---|---|
| 10 | 0 | -56 | -51 | 29 | 2 | -1 | -5 |
| -4 | -3 | -0 | -5 | 10 | -3 | 1 | -8 |
| 0 | -7 | -1 | -8 | 18 | 18 | -33 | 8 |
| 0 | 1 | 1 | 4 | 11 | -28 | 75 | 20 |

DISCRIMINANT PAIR 4/1

THRESHOLD 1=-INF THRESHOLD 2=THRESHOLD 3= 733 THRESHOLD 4=+INF

WEIGHTS

| | | | | | | | |
|---|---|---|---|---|---|---|---|
| 11 | -11 | 12 | -32 | 43 | 38 | -11 | -35 |
| 43 | -27 | 4 | 17 | 15 | 18 | -4 | -2 |
| 8 | -7 | 0 | 2 | -20 | 5 | -3 | 1 |
| 5 | 1 | 5 | -14 | -14 | 20 | 69 | 0 |

DISCRIMINANT PAIR 5/1

THRESHOLD 1=-INF THRESHOLD 2=THRESHOLD 3= -814 THRESHOLD 4=+INF

WEIGHTS

| | | | | | | | |
|---|---|---|---|---|---|---|---|
| 9 | -1 | 9 | -6 | 5 | 9 | -31 | -7 |
| -4 | 0 | -36 | -12 | 12 | 16 | -81 | 34 |
| -47 | -11 | -18 | -21 | 12 | -4 | 9 | 7 |
| 1 | 1 | 7 | -16 | 1 | -11 | 15 | 25 |

DISCRIMINANT PAIR 6/1

THRESHOLD 1=-INF THRESHOLD 2=THRESHOLD 3= 583 THRESHOLD 4=+INF

WEIGHTS

| | | | | | | | |
|---|---|---|---|---|---|---|---|
| 40 | 1 | 9 | -68 | -21 | -64 | -0 | 0 |
| -5 | 0 | 8 | -5 | 13 | 8 | -6 | -24 |
| -7 | -20 | -3 | -5 | 5 | 4 | -4 | 6 |
| -2 | 0 | 1 | 0 | 25 | -10 | 32 | 41 |

DISCRIMINANT PAIR 7/1

THRESHOLD 1=-INF THRESHOLD 2=THRESHOLD 3= -552 THRESHOLD 4=+INF

WEIGHTS

| | | | | | | | |
|---|---|---|---|---|---|---|---|
| -14 | 15 | -23 | -17 | 13 | 3 | -1 | -0 |
| -36 | 0 | -2 | 0 | 8 | 4 | -6 | -3 |
| 5 | -7 | 1 | -14 | -28 | -34 | -4 | 0 |
| -1 | 13 | 9 | -3 | -24 | 11 | 19 | -97 |

DISCRIMINANT PAIR 8/1

THRESHOLD 1=-INF THRESHOLD 2=THRESHOLD 3= 1191 THRESHOLD 4=+INF

WEIGHTS

| | | | | | | | |
|---|---|---|---|---|---|---|---|
| 3 | -1 | 3 | 7 | 2 | 9 | 0 | -25 |
| 17 | -25 | -1 | -1 | 2 | 4 | -6 | -1 |
| -11 | -7 | -0 | -16 | 4 | -16 | 3 | 1 |
| -1 | 3 | 0 | 7 | -6 | 3 | 49 | 104 |

DISCRIMINANT PAIR 9/1

THRESHOLD 1=-INF THRESHOLD 2=THRESHOLD 3= 692 THRESHOLD 4=+INF

WEIGHTS

| | | | | | | | |
|---|---|---|---|---|---|---|---|
| 2 | -1 | 6 | -9 | 16 | 32 | -22 | -31 |
| 16 | -16 | 3 | 20 | 9 | 5 | -5 | -19 |
| 14 | -21 | 2 | 26 | -9 | 12 | -3 | 9 |
| -5 | 14 | 33 | -40 | -9 | 35 | 67 | 31 |

DISCRIMINANT PAIR 4/2

THRESHOLD 1=-INF THRESHOLD 2=THRESHOLD 3= 722 THRESHOLD 4=+INF

WEIGHTS

| | | | | | | | |
|---|---|---|---|---|---|---|---|
| -29 | 10 | 68 | 36 | -18 | 22 | 5 | 8 |
| 2 | 7 | -0 | 23 | -26 | 5 | -2 | 4 |
| -13 | 5 | 1 | 9 | -15 | -19 | 30 | -27 |
| 1 | -4 | 5 | 52 | -12 | -2 | -33 | -5 |

DISCRIMINANT PAIR 5/2

THRESHOLD 1=-INF THRESHOLD 2=THRESHOLD 3= 467 THRESHOLD 4=+INF

WEIGHTS

| | | | | | | | |
|---|---|---|---|---|---|---|---|
| -5 | -5 | 60 | 39 | -29 | 2 | -2 | 6 |
| 20 | 5 | -0 | -1 | 12 | 2 | -21 | 1 |
| 3 | 1 | 0 | -0 | -17 | -7 | 59 | 3 |
| 0 | 0 | 4 | -4 | -14 | -1 | -67 | 2 |

DISCRIMINANT PAIR 6/2

THRESHOLD 1=-INF THRESHOLD 2=THRESHOLD 3= 629 THRESHOLD 4=+INF

WEIGHTS

| | | | | | | | |
|---|---|---|---|---|---|---|---|
| -8 | 8 | 26 | 36 | -10 | -5 | -4 | 10 |
| -6 | 9 | 3 | -28 | 47 | -5 | -6 | 7 |
| -18 | 9 | 0 | 18 | -22 | 2 | 53 | 25 |
| -1 | 4 | -2 | 26 | -16 | 11 | -51 | 41 |

DISCRIMINANT PAIR 7/2

THRESHOLD 1=-INF THRESHOLD 2=THRESHOLD 3= 84 THRESHOLD 4=+INF

WEIGHTS

| | | | | | | | |
|---|---|---|---|---|---|---|---|
| -11 | -9 | -7 | -36 | 45 | 25 | -6 | 0 |
| 1 | 3 | 2 | 46 | -18 | 2 | 7 | 17 |
| 2 | 10 | 2 | 18 | -22 | -37 | 47 | -11 |
| 1 | -3 | 0 | -8 | -9 | 44 | -25 | -37 |

DISCRIMINANT PAIR 8/2

THRESHOLD 1=-INF THRESHOLD 2=THRESHOLD 3= 1117 THRESHOLD 4=+INF

WEIGHTS

| | | | | | | | |
|---|---|---|---|---|---|---|---|
| -12 | 1 | 30 | 17 | 31 | 15 | 1 | 11 |
| -18 | 10 | -1 | -7 | 19 | 7 | -1 | 5 |
| -7 | 4 | 0 | -15 | 10 | -15 | 41 | 4 |
| -1 | -1 | 1 | 33 | -23 | -3 | 6 | 90 |

DISCRIMINANT PAIR 9/2

THRESHOLD 1=-INF THRESHOLD 2=THRESHOLD 3= 528 THRESHOLD 4=+INF

WEIGHTS

| | | | | | | | |
|---|---|---|---|---|---|---|---|
| -14 | 1 | 65 | 6 | 5 | 16 | 4 | 8 |
| 5 | 9 | 0 | 34 | -15 | 10 | 2 | 8 |
| 12 | 6 | 3 | 13 | -15 | -29 | 46 | -23 |
| 0 | -6 | 9 | 7 | -20 | 46 | -38 | -31 |

DISCRIMINANT PAIR 5/4

THRESHOLD 1=-INF THRESHOLD 2=THRESHOLD 3= -1364 THRESHOLD 4=+INF

WEIGHTS

| | | | | | | | |
|---|---|---|---|---|---|---|---|
| 3 | 7 | -11 | -6 | 6 | -12 | -20 | 27 |
| -28 | -25 | -21 | -27 | 20 | 6 | -38 | 32 |
| -27 | -14 | -13 | -14 | 18 | 0 | -4 | 7 |
| -2 | 4 | -1 | -3 | 5 | -48 | -66 | 14 |

DISCRIMINANT PAIR 6/4

THRESHOLD 1=-INF THRESHOLD 2=THRESHOLD 3= -96 THRESHOLD 4=+INF

WEIGHTS

| | | | | | | | |
|---|---|---|---|---|---|---|---|
| 13 | 15 | 11 | 40 | 29 | 27 | -3 | 4 |
| 10 | 3 | 10 | -16 | 10 | 15 | 4 | -43 |
| -31 | -43 | -5 | 0 | 6 | 1 | 1 | 11 |
| -3 | 3 | 0 | 12 | 18 | -38 | -52 | 42 |

DISCRIMINANT PAIR 7/4

THRESHOLD 1=-INF THRESHOLD 2=THRESHOLD 3= -641 THRESHOLD 4=+INF

WEIGHTS

| | | | | | | | |
|---|---|---|---|---|---|---|---|
| 2 | 4 | -45 | -15 | 7 | -9 | -2 | 0 |
| -97 | 0 | -0 | 6 | -17 | 7 | 0 | -7 |
| 14 | -12 | 0 | -34 | 0 | -25 | 0 | 2 |
| -6 | 7 | -9 | -18 | 1 | 14 | -27 | -1 |

DISCRIMINANT PAIR 8/4

THRESHOLD 1=-INF THRESHOLD 2=THRESHOLD 3= 614 THRESHOLD 4=+INF

WEIGHTS

| | | | | | | | |
|---|---|---|---|---|---|---|---|
| 7 | -2 | -11 | 14 | 40 | 9 | 2 | 16 |
| 33 | 9 | 4 | -5 | 0 | 1 | 0 | -3 |
| -3 | -12 | 2 | -6 | 10 | -7 | 0 | 6 |
| -7 | 0 | 2 | -17 | 0 | 22 | 1 | 105 |

DISCRIMINANT PAIR 9/4

THRESHOLD 1=-INF THRESHOLD 2=THRESHOLD 3= 314 THRESHOLD 4=+INF

WEIGHTS

| | | | | | | | |
|---|---|---|---|---|---|---|---|
| 16 | -3 | -4 | -15 | 6 | -10 | 0 | 72 |
| -17 | 59 | 4 | -24 | 11 | 5 | 2 | 5 |
| 12 | 2 | 3 | -20 | -6 | -19 | 3 | -8 |
| -23 | 2 | -0 | -14 | -27 | 41 | 26 | 23 |

DISCRIMINANT PAIR 6/5

THRESHOLD 1=-INF THRESHOLD 2=THRESHOLD 3= 889 THRESHOLD 4=+INF

WEIGHTS

| | | | | | | | |
|---|---|---|---|---|---|---|---|
| -20 | 11 | -13 | 14 | 14 | -0 | 27 | -15 |
| 0 | 14 | 13 | -1 | -8 | -35 | 68 | -23 |
| 24 | 1 | 8 | 6 | -14 | 11 | 0 | 1 |
| -1 | 1 | -8 | 60 | 13 | -25 | -5 | 36 |

DISCRIMINANT PAIR 7/5

THRESHOLD 1=-INF THRESHOLD 2=THRESHOLD 3= 187 THRESHOLD 4=+INF

WEIGHTS

| | | | | | | | |
|---|---|---|---|---|---|---|---|
| 10 | 2 | -55 | -40 | 35 | 4 | 3 | -14 |
| -21 | -20 | 20 | 11 | -10 | 6 | 32 | -20 |
| 20 | 9 | 32 | 30 | -34 | -3 | 6 | -5 |
| -0 | 3 | -6 | 2 | -2 | 29 | 10 | -43 |

DISCRIMINANT PAIR 8/5

THRESHOLD 1=-INF THRESHOLD 2=THRESHOLD 3= 895 THRESHOLD 4=+INF

WEIGHTS

| | | | | | | | |
|---|---|---|---|---|---|---|---|
| -1 | 3 | -21 | -7 | 26 | 5 | 6 | -4 |
| -26 | -8 | 23 | -2 | -5 | -2 | 11 | -3 |
| -12 | -3 | 7 | 7 | -3 | 3 | -12 | 2 |
| -3 | -1 | -2 | 18 | -23 | 17 | 94 | 49 |

DISCRIMINANT PAIR 9/5

THRESHOLD 1=-INF THRESHOLD 2=THRESHOLD 3= 992 THRESHOLD 4=+INF

WEIGHTS

| | | | | | | | |
|---|---|---|---|---|---|---|---|
| 12 | -3 | -7 | -9 | 12 | 5 | 6 | -8 |
| -4 | -0 | 33 | 19 | -18 | 0 | 17 | -14 |
| 14 | 3 | 14 | 12 | -21 | -1 | 8 | -9 |
| 0 | -2 | 2 | -8 | -20 | 66 | 76 | -31 |

DISCRIMINANT PAIR 7/6

THRESHOLD 1=-INF THRESHOLD 2=THRESHOLD 3= -763 THRESHOLD 4=+INF

WEIGHTS

| | | | | | | | |
|---|---|---|---|---|---|---|---|
| 1 | 1 | -5 | -6 | -8 | -5 | 0 | -11 |
| -41 | -12 | -3 | 7 | -17 | 14 | 5 | -7 |
| 8 | -11 | -1 | -9 | -6 | -7 | 10 | -5 |
| 0 | 6 | -1 | -28 | -44 | 26 | -7 | -95 |

DISCRIMINANT PAIR 8/6

THRESHOLD 1=-INF THRESHOLD 2=THRESHOLD 3= 568 THRESHOLD 4=+INF

WEIGHTS

| | | | | | | | |
|---|---|---|---|---|---|---|---|
| 8 | -12 | 0 | -4 | -2 | 2 | 0 | 18 |
| 8 | 20 | -3 | -4 | 1 | 14 | -6 | 0 |
| -15 | -5 | -3 | -31 | 37 | -35 | 8 | 0 |
| -3 | 1 | -2 | -27 | -8 | 19 | 97 | -0 |

DISCRIMINANT PAIR 9/6

THRESHOLD 1=-INF THRESHOLD 2=THRESHOLD 3= -473 THRESHOLD 4=+INF

WEIGHTS

| | | | | | | | |
|---|---|---|---|---|---|---|---|
| 9 | -8 | -3 | -14 | -4 | 2 | -3 | -9 |
| 7 | -4 | -6 | 8 | -11 | 6 | -3 | -3 |
| 31 | -2 | 3 | 6 | -2 | -11 | -3 | -4 |
| -4 | -0 | 4 | -20 | -25 | 25 | 64 | -89 |

DISCRIMINANT PAIR 8/7

THRESHOLD 1=-INF THRESHOLD 2=THRESHOLD 3= 974 THRESHOLD 4=+INF

WEIGHTS

| | | | | | | | |
|---|---|---|---|---|---|---|---|
| 0 | -1 | 13 | 11 | 10 | 7 | 0 | 28 |
| 24 | 28 | 0 | -1 | 1 | 0 | -1 | 1 |
| -0 | 0 | -0 | 7 | 5 | 6 | -1 | 2 |
| 0 | -1 | 0 | 8 | -1 | -2 | 16 | 113 |

DISCRIMINANT PAIR 9/7

THRESHOLD 1=-INF THRESHOLD 2=THRESHOLD 3= 719 THRESHOLD 4=+INF

WEIGHTS

| | | | | | | | |
|---|---|---|---|---|---|---|---|
| 6 | -3 | 50 | 12 | -29 | -11 | 2 | 26 |
| -2 | 24 | 0 | -12 | 9 | -2 | 0 | 2 |
| 24 | 3 | 0 | 45 | 17 | 50 | 2 | -3 |
| -2 | -3 | 12 | -36 | -14 | 45 | 37 | -2 |

DISCRIMINANT PAIR 9/8

THRESHOLD 1=-INF THRESHOLD 2=THRESHOLD 3= -733 THRESHOLD 4=+INF

WEIGHTS

| | | | | | | | |
|---|---|---|---|---|---|---|---|
| 1 | 0 | 1 | -16 | -15 | -14 | -1 | 3 |
| -9 | 4 | 1 | 3 | -1 | 0 | -1 | 1 |
| 1 | 4 | 0 | 39 | 0 | 39 | 1 | -3 |
| 0 | 0 | -0 | 3 | -1 | -2 | 4 | -109 |

SORT CLASS 3,5
40 DIMENSIONS

DISCRIMINANT PAIR 2/0

THRESHOLD 1=-INF THRESHOLD 2=THRESHOLD 3= -575 THRESHOLD 4=+INF

WEIGHTS

| | | | | | | | |
|---|---|---|---|---|---|---|---|
| 6 | -5 | -13 | -22 | 21 | 14 | -1 | -4 |
| -5 | -5 | 0 | 6 | 0 | 0 | -5 | -7 |
| 15 | -0 | -1 | -13 | -4 | -16 | -0 | -13 |
| 17 | -13 | -6 | -66 | 61 | 9 | -29 | 12 |
| -0 | -4 | -2 | -58 | 0 | 15 | 0 | -8 |

DISCRIMINANT PAIR 4/0

THRESHOLD 1=-INF THRESHOLD 2=THRESHOLD 3= -141 THRESHOLD 4=+INF

WEIGHTS

| | | | | | | | |
|---|---|---|---|---|---|---|---|
| -27 | -3 | 0 | -3 | -39 | -21 | 21 | -49 |
| 55 | -37 | -36 | -7 | -10 | -26 | 0 | 8 |
| 0 | 0 | 5 | 13 | -15 | 12 | -19 | -24 |
| 5 | -10 | 17 | 9 | -12 | 21 | -3 | -9 |
| 3 | -9 | 2 | -15 | -6 | 6 | 19 | -0 |

DISCRIMINANT PAIR 5/0

THRESHOLD 1=-INF THRESHOLD 2=THRESHOLD 3= -915 THRESHOLD 4=+INF

WEIGHTS

| | | | | | | | |
|---|---|---|---|---|---|---|---|
| -16 | 4 | -4 | -10 | -12 | 10 | -41 | 15 |
| -25 | -22 | -33 | -5 | 0 | -5 | -9 | 14 |
| -17 | -7 | -37 | -41 | 31 | 6 | -3 | 22 |
| 6 | 26 | 0 | 10 | 22 | 22 | 5 | -4 |
| 5 | 0 | 5 | -52 | -5 | -25 | -7 | 17 |

DISCRIMINANT PAIR 6/0

THRESHOLD 1=-INF THRESHOLD 2=THRESHOLD 3= -24 THRESHOLD 4=+INF

WEIGHTS

| | | | | | | | |
|---|---|---|---|---|---|---|---|
| -11 | 1 | -4 | 9 | -17 | 0 | 2 | -3 |
| 4 | 0 | -5 | 1 | -6 | -7 | -1 | -1 |
| 0 | 0 | -3 | -4 | 2 | 2 | -4 | 1 |
| -0 | -0 | 1 | 78 | -91 | -11 | 3 | -3 |
| -2 | -3 | 0 | 8 | 8 | -13 | -1 | 15 |

DISCRIMINANT PAIR 7/0

THRESHOLD 1=-INF THRESHOLD 2=THRESHOLD 3= 108 THRESHOLD 4=+INF

WEIGHTS

| | | | | | | | |
|---|---|---|---|---|---|---|---|
| -9 | 2 | -6 | -14 | 29 | 25 | 0 | -6 |
| 8 | -8 | -0 | 6 | -5 | -1 | 7 | -0 |
| 18 | 0 | 0 | -9 | -18 | -20 | 15 | -12 |
| 29 | -11 | 0 | -75 | 18 | -56 | 13 | -2 |
| -5 | -1 | -1 | -37 | -15 | 5 | 5 | 11 |

DISCRIMINANT PAIR 8/0

THRESHOLD 1=-INF THRESHOLD 2=THRESHOLD 3= -55 THRESHOLD 4=+INF

WEIGHTS

| | | | | | | | |
|---|---|---|---|---|---|---|---|
| -8 | 1 | 3 | -12 | -5 | -16 | 1 | -11 |
| 9 | -14 | -12 | -6 | 7 | 3 | -3 | 8 |
| -15 | -5 | -11 | -12 | 12 | 6 | -25 | 12 |
| -16 | 0 | 2 | 67 | -4 | 63 | -0 | 4 |
| -1 | -15 | 0 | -37 | 4 | 16 | 9 | 48 |

DISCRIMINANT PAIR 9/0

THRESHOLD 1=-INF THRESHOLD 2=THRESHOLD 3= 121 THRESHOLD 4=+INF

WEIGHTS

| | | | | | | | |
|---|---|---|---|---|---|---|---|
| 14 | -5 | -5 | -27 | -6 | 4 | 4 | -16 |
| 39 | -19 | -14 | 17 | -19 | 19 | -7 | 31 |
| 11 | 22 | 0 | 33 | -5 | 20 | -12 | -14 |
| -11 | -11 | 0 | -37 | 0 | 0 | 1 | -23 |
| -12 | -5 | 4 | -23 | -33 | 14 | 49 | 34 |

DISCRIMINANT PAIR 4/2

THRESHOLD 1=-INF THRESHOLD 2=THRESHOLD 3= 367 THRESHOLD 4=+INF

WEIGHTS

| | | | | | | | |
|---|---|---|---|---|---|---|---|
| -43 | -1 | 54 | 45 | -31 | -14 | 1 | -2 |
| 16 | 5 | 7 | -5 | 12 | -38 | -6 | 15 |
| -54 | 12 | 9 | 1 | -5 | 5 | -14 | 5 |
| -6 | 24 | 19 | -1 | 4 | -6 | 9 | -10 |
| -1 | 0 | 6 | 16 | -11 | 19 | -3 | -2 |

DISCRIMINANT PAIR 5/2

THRESHOLD 1=-INF THRESHOLD 2=THRESHOLD 3= 455 THRESHOLD 4=+INF

WEIGHTS

| | | | | | | | |
|---|---|---|---|---|---|---|---|
| -19 | 3 | 55 | 37 | -36 | -5 | -2 | 0 |
| 28 | 1 | -4 | -23 | 17 | -4 | -17 | -0 |
| 2 | -8 | -7 | -11 | 1 | 15 | 19 | 8 |
| 17 | 25 | -13 | 6 | 7 | -1 | 42 | -0 |
| 0 | -2 | 9 | 2 | -26 | 4 | -53 | 16 |

DISCRIMINANT PAIR 6/2

THRESHOLD 1=-INF THRESHOLD 2=THRESHOLD 3= 442 THRESHOLD 4=+INF

WEIGHTS

| | | | | | | | |
|---|---|---|---|---|---|---|---|
| -13 | 9 | 13 | 29 | -30 | -18 | -1 | 7 |
| 3 | 8 | 1 | -17 | 11 | -7 | -3 | -9 |
| -28 | -14 | 0 | 12 | 0 | 20 | 1 | 11 |
| -12 | 13 | -8 | 50 | -46 | -4 | 38 | -8 |
| 0 | 4 | 2 | 59 | -5 | -9 | -12 | 21 |

DISCRIMINANT PAIR 7/2

THRESHOLD 1=-INF THRESHOLD 2=THRESHOLD 3= 236 THRESHOLD 4=+INF

WEIGHTS

| | | | | | | | |
|---|---|---|---|---|---|---|---|
| -35 | 13 | 8 | -34 | 25 | 5 | -1 | -1 |
| 6 | 1 | -4 | 5 | -5 | -8 | 1 | -26 |
| 0 | -35 | 0 | -2 | -4 | 2 | 4 | 33 |
| -36 | 21 | 9 | -26 | 14 | -51 | 36 | -20 |
| 0 | -3 | 0 | 13 | -32 | 27 | -9 | 5 |

DISCRIMINANT PAIR 8/2

THRESHOLD 1=-INF THRESHOLD 2=THRESHOLD 3= 770 THRESHOLD 4=+INF

WEIGHTS

| | | | | | | | |
|---|---|---|---|---|---|---|---|
| -9 | -5 | 31 | -7 | 35 | -22 | 1 | 12 |
| -14 | 15 | -4 | -9 | 6 | 5 | -10 | 21 |
| -17 | 3 | -3 | -10 | 39 | 27 | -5 | 20 |
| -20 | 19 | -2 | 1 | 19 | -1 | 41 | -9 |
| 0 | 2 | 0 | 24 | -21 | 9 | 9 | 66 |

DISCRIMINANT PAIR 9/2

THRESHOLD 1=-INF THRESHOLD 2=THRESHOLD 3= -35 THRESHOLD 4=+INF

WEIGHTS

| | | | | | | | |
|---|---|---|---|---|---|---|---|
| -10 | 3 | 39 | 17 | -12 | 3 | -4 | 6 |
| 0 | 10 | -3 | 11 | -23 | 7 | -1 | 8 |
| -7 | 1 | -4 | 12 | -5 | 2 | 10 | 10 |
| -18 | 15 | 0 | -57 | 54 | -35 | 18 | -41 |
| 0 | -5 | 6 | -4 | -28 | 30 | -16 | 0 |

DISCRIMINANT PAIR 5/4

THRESHOLD 1=-INF THRESHOLD 2=THRESHOLD 3= -314 THRESHOLD 4=+INF

WEIGHTS

| | | | | | | | |
|---|---|---|---|---|---|---|---|
| -9 | 0 | -20 | -12 | -6 | -12 | 1 | 27 |
| 67 | 11 | -47 | -26 | 22 | -3 | -12 | 3 |
| 49 | 13 | -11 | -3 | 12 | 10 | -0 | 25 |
| -12 | 11 | -19 | 17 | 20 | 13 | 8 | 7 |
| -3 | 3 | 2 | -7 | -5 | -15 | -17 | 4 |

DISCRIMINANT PAIR 6/4

THRESHOLD 1=-INF THRESHOLD 2=THRESHOLD 3= 125 THRESHOLD 4=+INF

WEIGHTS

| | | | | | | | |
|---|---|---|---|---|---|---|---|
| -4 | 2 | -10 | -5 | 26 | 7 | -20 | 42 |
| -73 | 52 | 33 | -5 | 2 | -4 | 2 | -6 |
| 0 | 0 | -6 | 3 | 9 | 9 | 2 | 2 |
| -13 | -6 | -18 | 16 | 5 | -1 | 4 | 5 |
| -1 | 2 | -1 | 15 | 1 | -15 | -17 | 40 |

DISCRIMINANT PAIR 7/4

THRESHOLD 1=-INF THRESHOLD 2=THRESHOLD 3= -570 THRESHOLD 4=+INF

WEIGHTS

| | | | | | | | |
|---|---|---|---|---|---|---|---|
| 18 | 5 | -46 | -44 | 49 | 23 | -9 | 34 |
| -31 | 26 | -2 | 20 | -7 | 33 | -6 | -4 |
| -8 | 0 | 0 | -5 | -12 | -22 | 13 | 7 |
| 0 | 1 | 1 | -14 | 1 | -24 | -5 | 8 |
| -3 | 4 | -7 | 5 | 10 | -27 | -32 | 2 |

DISCRIMINANT PAIR 8/4

THRESHOLD 1=-INF THRESHOLD 2=THRESHOLD 3= 550 THRESHOLD 4=+INF

WEIGHTS

| | | | | | | | |
|---|---|---|---|---|---|---|---|
| 4 | 0 | -8 | -15 | 34 | 6 | -4 | 39 |
| -55 | 39 | 9 | -20 | 9 | 2 | 0 | -20 |
| 10 | -27 | -6 | -4 | 13 | 2 | -1 | 22 |
| -22 | -1 | -16 | -6 | 12 | -2 | 16 | 7 |
| -4 | -0 | -0 | -12 | -7 | 19 | 11 | 59 |

DISCRIMINANT PAIR 9/4

THRESHOLD 1=-INF THRESHOLD 2=THRESHOLD 3= -92 THRESHOLD 4=+INF

WEIGHTS

| | | | | | | | |
|---|---|---|---|---|---|---|---|
| 59 | 3 | 0 | -13 | 14 | 1 | -8 | 10 |
| 8 | 6 | -8 | -0 | -6 | 57 | 1 | 25 |
| 40 | 12 | -1 | 35 | -8 | 11 | 14 | -9 |
| -3 | -3 | 2 | 6 | 0 | 5 | 4 | -4 |
| -12 | 1 | -1 | -33 | -20 | 47 | 7 | -0 |

DISCRIMINANT PAIR 6/5

THRESHOLD 1=-INF THRESHOLD 2=THRESHOLD 3= 709 THRESHOLD 4=+INF

WEIGHTS

| | | | | | | | |
|---|---|---|---|---|---|---|---|
| 0 | 5 | 15 | 16 | 5 | -4 | 43 | -12 |
| 17 | 37 | 32 | 11 | -3 | -5 | 28 | -10 |
| 3 | -7 | 22 | 25 | -18 | -1 | -10 | -35 |
| -32 | -44 | -1 | -5 | -7 | 13 | -22 | 1 |
| -0 | -6 | -8 | 45 | 24 | 11 | -3 | -0 |

DISCRIMINANT PAIR 7/5

THRESHOLD 1=-INF THRESHOLD 2=THRESHOLD 3= -162 THRESHOLD 4=+INF

WEIGHTS

| | | | | | | | |
|---|---|---|---|---|---|---|---|
| 9 | 1 | -45 | -43 | 42 | 1 | 2 | -16 |
| -28 | -24 | 4 | 18 | -11 | 10 | 13 | -10 |
| 11 | 13 | 24 | 25 | -27 | -8 | -3 | -11 |
| -6 | -14 | 14 | -13 | -33 | -30 | -1 | -5 |
| -0 | 5 | -2 | -6 | 5 | 30 | 17 | -33 |

DISCRIMINANT PAIR 8/5

THRESHOLD 1=-INF THRESHOLD 2=THRESHOLD 3= 830 THRESHOLD 4=+INF

WEIGHTS

| | | | | | | | |
|---|---|---|---|---|---|---|---|
| 8 | -6 | -5 | -3 | 39 | 0 | 8 | -4 |
| -63 | -5 | 31 | 6 | 3 | -2 | 4 | 4 |
| 1 | -3 | 17 | 19 | -28 | -8 | -0 | -23 |
| -12 | -22 | 8 | -15 | -22 | -9 | -2 | 7 |
| -1 | -9 | -3 | 15 | 3 | 13 | 58 | 36 |

DISCRIMINANT PAIR 9/5

THRESHOLD 1=-INF THRESHOLD 2=THRESHOLD 3= 592 THRESHOLD 4=+INF

WEIGHTS

| | | | | | | | |
|---|---|---|---|---|---|---|---|
| 14 | -3 | 6 | -9 | 8 | 1 | 2 | -13 |
| -23 | -15 | 23 | 35 | -21 | 4 | 15 | -9 |
| 14 | 3 | 11 | 8 | -20 | -10 | 4 | -47 |
| -6 | -38 | 12 | -3 | -19 | 9 | -4 | -15 |
| 0 | -4 | 3 | -14 | 1 | 43 | 56 | -34 |

DISCRIMINANT PAIR 7/6

THRESHOLD 1=-INF THRESHOLD 2=THRESHOLD 3= -89 THRESHOLD 4=+INF

WEIGHTS

| | | | | | | | |
|---|---|---|---|---|---|---|---|
| -0 | -2 | -4 | -9 | 27 | 21 | 0 | 2 |
| 0 | 0 | 0 | 0 | -9 | 5 | 11 | -1 |
| 13 | 0 | 0 | -0 | -19 | -13 | 18 | -28 |
| -19 | -25 | -2 | -68 | 44 | -36 | 15 | -2 |
| -4 | 0 | -0 | -43 | -12 | 6 | 11 | -33 |

DISCRIMINANT PAIR 8/6

THRESHOLD 1=-INF THRESHOLD 2=THRESHOLD 3= -401 THRESHOLD 4=+INF

WEIGHTS

| | | | | | | | |
|---|---|---|---|---|---|---|---|
| 9 | -14 | -23 | 0 | 18 | 5 | 3 | 0 |
| 13 | 0 | -31 | -6 | 5 | 9 | -11 | -10 |
| -19 | -44 | -10 | -40 | 19 | -25 | -22 | 16 |
| -1 | 9 | 2 | -18 | 12 | -22 | 6 | 6 |
| -4 | -5 | -2 | -25 | -18 | 29 | 65 | -8 |

DISCRIMINANT PAIR 9/6

THRESHOLD 1=-INF THRESHOLD 2=THRESHOLD 3= -320 THRESHOLD 4=+INF

WEIGHTS

| | | | | | | | |
|---|---|---|---|---|---|---|---|
| 13 | -7 | -8 | -4 | 0 | 0 | 0 | -4 |
| 0 | 0 | -7 | 3 | -15 | 9 | -5 | 22 |
| 16 | 25 | 0 | 11 | -0 | 1 | -5 | 7 |
| 1 | 2 | -4 | -85 | 24 | -66 | 3 | -9 |
| -7 | 3 | 4 | -4 | -14 | 12 | 16 | -24 |

DISCRIMINANT PAIR 8/7

THRESHOLD 1=-INF THRESHOLD 2=THRESHOLD 3= 449 THRESHOLD 4=+INF

WEIGHTS

| | | | | | | | |
|---|---|---|---|---|---|---|---|
| 0 | -2 | 10 | 7 | 8 | 4 | 0 | -1 |
| 4 | 0 | 0 | -1 | 4 | 0 | 0 | 0 |
| 0 | 0 | -3 | 1 | 11 | 13 | -4 | 3 |
| -4 | 1 | 0 | 60 | 1 | 79 | 0 | 4 |
| 0 | -1 | 0 | 9 | 2 | -10 | 15 | 46 |

DISCRIMINANT PAIR 9/7

THRESHOLD 1=-INF THRESHOLD 2=THRESHOLD 3= 64 THRESHOLD 4=+INF

WEIGHTS

| | | | | | | | |
|---|---|---|---|---|---|---|---|
| 2 | 0 | 15 | 5 | -10 | -2 | 0 | -0 |
| 0 | 0 | 0 | -0 | -2 | 0 | -2 | -3 |
| 13 | -3 | 0 | 8 | 6 | 4 | -1 | 84 |
| 0 | 84 | -1 | 7 | -3 | 4 | -1 | 0 |
| -0 | 0 | 6 | -10 | 1 | 13 | 11 | -22 |

DISCRIMINANT PAIR 9/8

THRESHOLD 1=-INF THRESHOLD 2=THRESHOLD 3= -692 THRESHOLD 4=+INF

WEIGHTS

| | | | | | | | |
|---|---|---|---|---|---|---|---|
| 14 | -2 | 1 | -14 | -26 | -19 | 0 | 0 |
| 12 | 0 | 4 | 12 | -17 | 12 | 0 | -9 |
| 9 | 0 | 4 | 1 | -9 | -7 | 0 | -7 |
| 10 | 1 | -1 | -7 | 6 | -6 | 3 | -17 |
| -1 | -1 | 0 | 0 | -12 | 5 | 10 | -112 |

SORT CLASS 5,1
32 DIMENSIONS

DISCRIMINANT PAIR 3/0

THRESHOLD 1=-INF THRESHOLD 2=THRESHOLD 3= -975 THRESHOLD 4=+INF

WEIGHTS

| | | | | | | | |
|---|---|---|---|---|---|---|---|
| 4 | -0 | -5 | -22 | 23 | 34 | -14 | -5 |
| -16 | 7 | -19 | -22 | 7 | -1 | -33 | 18 |
| -25 | -14 | -22 | 4 | -14 | 5 | 18 | -8 |
| 0 | -14 | 8 | -60 | 4 | 10 | -68 | 6 |

DISCRIMINANT PAIR 4/0

THRESHOLD 1=-INF THRESHOLD 2=THRESHOLD 3= -174 THRESHOLD 4=+INF

WEIGHTS

| | | | | | | | |
|---|---|---|---|---|---|---|---|
| -16 | -9 | 8 | 39 | -43 | 21 | -1 | 10 |
| 12 | 5 | 8 | 4 | -55 | -25 | -22 | -4 |
| -61 | 0 | 1 | 14 | -9 | -10 | 15 | -1 |
| 2 | -4 | 0 | -17 | 1 | -37 | 5 | -30 |

DISCRIMINANT PAIR 7/0

THRESHOLD 1=-INF THRESHOLD 2=THRESHOLD 3= -614 THRESHOLD 4=+INF

WEIGHTS

| | | | | | | | |
|---|---|---|---|---|---|---|---|
| -4 | 5 | 0 | -9 | -18 | -24 | 2 | 0 |
| -1 | 9 | 6 | -58 | -26 | -68 | -7 | 7 |
| -10 | 0 | -2 | -5 | 11 | 1 | -3 | 0 |
| 0 | 0 | -2 | -41 | 9 | 8 | 12 | -60 |

DISCRIMINANT PAIR 9/0

THRESHOLD 1=-INF THRESHOLD 2=THRESHOLD 3= -602 THRESHOLD 4=+INF

WEIGHTS

| | | | | | | | |
|---|---|---|---|---|---|---|---|
| -0 | 1 | -1 | -1 | -11 | -7 | 7 | 25 |
| 10 | 37 | -5 | 0 | -59 | -55 | 12 | 16 |
| -28 | 0 | -29 | -27 | 31 | 5 | 5 | -11 |
| -4 | -9 | -5 | -11 | -7 | 35 | -31 | -16 |

DISCRIMINANT PAIR 4/3

THRESHOLD 1=-INF THRESHOLD 2=THRESHOLD 3= 551 THRESHOLD 4=+INF

WEIGHTS

| | | | | | | | |
|---|---|---|---|---|---|---|---|
| -24 | 8 | 17 | 10 | -4 | -21 | 15 | -1 |
| 18 | 0 | 17 | 29 | -28 | -2 | 23 | -17 |
| 0 | -8 | 19 | 16 | -1 | -10 | -14 | -8 |
| 0 | 4 | -2 | 34 | 11 | 8 | 77 | -51 |

DISCRIMINANT PAIR 7/3

THRESHOLD 1=-INF THRESHOLD 2=THRESHOLD 3= 180 THRESHOLD 4=+INF

WEIGHTS

| | | | | | | | |
|---|---|---|---|---|---|---|---|
| -1 | -2 | 12 | 14 | -18 | -8 | 15 | 3 |
| 24 | 6 | 34 | 64 | -51 | -1 | 10 | -9 |
| -12 | -9 | 35 | 3 | 2 | 10 | -5 | -2 |
| 0 | 1 | -9 | -14 | 8 | 6 | 16 | -61 |

DISCRIMINANT PAIR 9/3

THRESHOLD 1=-INF THRESHOLD 2=THRESHOLD 3= 769 THRESHOLD 4=+INF

WEIGHTS

| | | | | | | | |
|---|---|---|---|---|---|---|---|
| 5 | -2 | -18 | -17 | -8 | -29 | 8 | -4 |
| 5 | 2 | 10 | 0 | -16 | -15 | 33 | -10 |
| 20 | 9 | 41 | 7 | 1 | 2 | -15 | -5 |
| 0 | 0 | -1 | 21 | -14 | 24 | 89 | -26 |

DISCRIMINANT PAIR 7/4

THRESHOLD 1=-INF THRESHOLD 2=THRESHOLD 3= -921 THRESHOLD 4=+INF

WEIGHTS

| | | | | | | | |
|---|---|---|---|---|---|---|---|
| -6 | 23 | -5 | -19 | 1 | -6 | -8 | 20 |
| -21 | 3 | -8 | -5 | -39 | -34 | 0 | 6 |
| 0 | 0 | -8 | -4 | -3 | 11 | -4 | 3 |
| -4 | 8 | -3 | -68 | -8 | 50 | -52 | -27 |

DISCRIMINANT PAIR 9/4

THRESHOLD 1=-INF THRESHOLD 2=THRESHOLD 3= 106 THRESHOLD 4=+INF

WEIGHTS

| | | | | | | | |
|---|---|---|---|---|---|---|---|
| 32 | -4 | -15 | -3 | -11 | -10 | -1 | -11 |
| -9 | 0 | -14 | -23 | 6 | -5 | -7 | 6 |
| 0 | 0 | -1 | 28 | -48 | 13 | 24 | -4 |
| -12 | 1 | 0 | -35 | -19 | 81 | -29 | 7 |

DISCRIMINANT PAIR 9/7

THRESHOLD 1=-INF THRESHOLD 2=THRESHOLD 3= 74 THRESHOLD 4=+INF

WEIGHTS

| | | | | | | | |
|---|---|---|---|---|---|---|---|
| 4 | -3 | -6 | -0 | -10 | -8 | 0 | 7 |
| -2 | 9 | 0 | -1 | 85 | 90 | -2 | 1 |
| 0 | 0 | -1 | 0 | 0 | 0 | 2 | -0 |
| 0 | 0 | 5 | -1 | 0 | 0 | 7 | -8 |

SORT CLASS 5,3

40 DIMENSIONS

DISCRIMINANT PAIR 3/2

THRESHOLD 1=-INF THRESHOLD 2=THRESHOLD 3= -443 THRESHOLD 4=+INF

WEIGHTS

| | | | | | | | |
|---|---|---|---|---|---|---|---|
| -4 | 1 | -19 | -12 | 19 | 5 | -18 | 2 |
| -27 | -13 | -34 | -43 | 52 | 0 | -27 | 11 |
| 19 | 4 | 3 | 5 | 1 | -2 | -11 | 13 |
| -0 | 13 | -6 | 2 | 39 | -2 | 43 | -1 |
| 0 | 0 | 23 | 21 | -29 | 12 | -22 | 7 |

DISCRIMINANT PAIR 4/2

THRESHOLD 1=-INF THRESHOLD 2=THRESHOLD 3= 602 THRESHOLD 4=+INF

WEIGHTS

| | | | | | | | |
|---|---|---|---|---|---|---|---|
| -4 | 2 | 5 | 27 | -9 | -1 | 9 | 5 |
| 14 | 5 | 1 | 3 | 17 | 13 | 18 | 14 |
| 29 | 37 | 19 | 43 | -39 | -1 | -2 | 9 |
| -12 | 8 | 1 | 11 | -13 | -10 | 14 | -16 |
| 0 | 0 | 2 | 75 | -8 | -17 | 22 | -7 |

DISCRIMINANT PAIR 5/2

THRESHOLD 1=-INF THRESHOLD 2=THRESHOLD 3= -123 THRESHOLD 4=+INF

WEIGHTS

| | | | | | | | |
|---|---|---|---|---|---|---|---|
| -2 | -5 | 17 | 33 | 6 | -5 | -10 | 4 |
| 33 | 15 | 9 | 8 | 9 | 4 | -37 | 24 |
| -11 | -10 | -5 | -0 | 4 | 2 | -33 | 7 |
| 4 | 3 | 4 | 10 | -30 | -3 | 76 | -3 |
| -1 | 3 | 8 | -5 | -19 | -1 | -40 | -12 |

DISCRIMINANT PAIR 6/2

THRESHOLD 1=-INF THRESHOLD 2=THRESHOLD 3= 1010 THRESHOLD 4=+INF

WEIGHTS

| | | | | | | | |
|---|---|---|---|---|---|---|---|
| -9 | 16 | 31 | 26 | -22 | -11 | 21 | 4 |
| 38 | 27 | 28 | 2 | 14 | -2 | 1 | 38 |
| 17 | 53 | 39 | -14 | 22 | -5 | -6 | 15 |
| 5 | 16 | -0 | 7 | -8 | 14 | 33 | 2 |
| -1 | 2 | -0 | 12 | 6 | 4 | -16 | 11 |

DISCRIMINANT PAIR 7/2

THRESHOLD 1=-INF THRESHOLD 2=THRESHOLD 3= 216 THRESHOLD 4=+INF

WEIGHTS

| | | | | | | | |
|---|---|---|---|---|---|---|---|
| -12 | -2 | -4 | -11 | 23 | 15 | -0 | 13 |
| 3 | 3 | -0 | 22 | -16 | -13 | 8 | 27 |
| 17 | 35 | 23 | 48 | -25 | -4 | 4 | 38 |
| 8 | 32 | 2 | 4 | -13 | -38 | 35 | -13 |
| 0 | -2 | 1 | 6 | -15 | 32 | 0 | -28 |

DISCRIMINANT PAIR 8/2

THRESHOLD 1=-INF THRESHOLD 2=THRESHOLD 3= 1015 THRESHOLD 4=+INF

WEIGHTS

| | | | | | | | |
|---|---|---|---|---|---|---|---|
| -7 | 3 | 33 | 14 | 0 | 0 | 25 | -6 |
| 36 | 5 | 10 | -22 | 39 | -8 | 8 | 36 |
| 24 | 39 | 24 | 2 | 1 | 4 | -7 | 26 |
| 0 | 25 | 1 | -12 | 3 | -6 | 41 | -5 |
| -1 | -1 | 3 | 13 | -25 | 32 | -4 | 28 |

DISCRIMINANT PAIR 9/2

THRESHOLD 1=-INF THRESHOLD 2=THRESHOLD 3= 585 THRESHOLD 4=+INF

WEIGHTS

| | | | | | | | |
|---|---|---|---|---|---|---|---|
| -6 | 3 | 23 | 1 | -2 | -13 | 10 | 11 |
| -11 | -8 | -20 | -36 | 19 | -11 | 39 | -15 |
| 44 | 20 | 14 | 33 | -39 | 1 | 1 | 20 |
| 0 | 15 | 5 | 17 | -24 | -25 | 18 | -23 |
| 0 | -1 | 2 | 38 | -22 | 16 | -0 | -10 |

DISCRIMINANT PAIR 4/3

THRESHOLD 1=-INF THRESHOLD 2=THRESHOLD 3= 1198 THRESHOLD 4=+INF

WEIGHTS

| | | | | | | | |
|---|---|---|---|---|---|---|---|
| -9 | 7 | 5 | 21 | -24 | -14 | 12 | -3 |
| 21 | 6 | 25 | 25 | -30 | -1 | 36 | -16 |
| 37 | 30 | 24 | 9 | -7 | -2 | 0 | -2 |
| 2 | -3 | 0 | 0 | 2 | -2 | -7 | -3 |
| 0 | 0 | -1 | 30 | 2 | -5 | 77 | 5 |

DISCRIMINANT PAIR 5/3

THRESHOLD 1=-INF THRESHOLD 2=THRESHOLD 3= 537 THRESHOLD 4=+INF

WEIGHTS

| | | | | | | | |
|---|---|---|---|---|---|---|---|
| -11 | 7 | 49 | 52 | -40 | -21 | 26 | -3 |
| 37 | 11 | 25 | 27 | -24 | 0 | 0 | -1 |
| 0 | -5 | -4 | 0 | -0 | 0 | -15 | -5 |
| 55 | -10 | -0 | 14 | -10 | 17 | 1 | -1 |
| -1 | 4 | 0 | -1 | 1 | -5 | -12 | 6 |

DISCRIMINANT PAIR 6/3

THRESHOLD 1=-INF THRESHOLD 2=THRESHOLD 3= 1011 THRESHOLD 4=+INF

WEIGHTS

| | | | | | | | |
|---|---|---|---|---|---|---|---|
| -18 | 21 | 47 | 39 | -44 | -9 | 21 | -5 |
| 22 | 5 | 12 | 26 | -21 | -8 | 35 | -13 |
| 21 | 21 | 14 | -7 | -1 | -5 | -4 | -0 |
| 0 | -1 | 0 | 15 | -18 | 22 | -2 | 3 |
| -0 | 0 | -3 | 32 | -1 | -12 | -13 | 42 |

DISCRIMINANT PAIR 7/3

THRESHOLD 1=-INF THRESHOLD 2=THRESHOLD 3= 511 THRESHOLD 4=+INF

WEIGHTS

| | | | | | | | |
|---|---|---|---|---|---|---|---|
| -3 | 1 | 16 | -2 | -4 | 0 | 18 | 0 |
| 34 | 16 | 44 | 62 | -51 | -2 | 16 | 3 |
| -18 | -19 | 29 | 20 | -19 | 4 | 6 | 1 |
| 4 | -0 | 10 | 16 | -19 | 8 | -5 | -14 |
| -0 | 0 | -22 | -10 | -2 | 13 | -0 | -29 |

DISCRIMINANT PAIR 8/3

THRESHOLD 1=-INF THRESHOLD 2=THRESHOLD 3= 1406 THRESHOLD 4=+INF

WEIGHTS

| | | | | | | | |
|---|---|---|---|---|---|---|---|
| -4 | 3 | 16 | 0 | 8 | 1 | 13 | -0 |
| 15 | 1 | 13 | 21 | -24 | -7 | 38 | -7 |
| 4 | 7 | 1 | 2 | -7 | 1 | -1 | -6 |
| 9 | -11 | 1 | 1 | 3 | 3 | -9 | 0 |
| -0 | -0 | -4 | 26 | -11 | -4 | 72 | 75 |

DISCRIMINANT PAIR 9/3

THRESHOLD 1=-INF THRESHOLD 2=THRESHOLD 3= 1250 THRESHOLD 4=+INF

WEIGHTS

| | | | | | | | |
|---|---|---|---|---|---|---|---|
| -2 | 2 | -5 | 3 | -10 | -17 | 7 | -0 |
| 6 | 3 | 15 | 12 | -24 | -7 | 43 | -13 |
| 43 | 33 | 39 | 13 | -12 | 0 | 4 | -5 |
| 12 | -6 | 3 | 3 | 1 | -0 | -12 | -5 |
| 0 | 0 | 0 | 19 | -6 | 8 | 80 | 1 |

DISCRIMINANT PAIR 5/4

THRESHOLD 1=-INF THRESHOLD 2=THRESHOLD 3= -1600 THRESHOLD 4=+INF

WEIGHTS

| | | | | | | | |
|---|---|---|---|---|---|---|---|
| -10 | 2 | -9 | 17 | -8 | -0 | 5 | 0 |
| 9 | 6 | -12 | 2 | -6 | -13 | -28 | 24 |
| -16 | -14 | -30 | -10 | 3 | -2 | -26 | 29 |
| -22 | -7 | -22 | -30 | 29 | 17 | -9 | -9 |
| -2 | 3 | -0 | -32 | 4 | -10 | -77 | -0 |

DISCRIMINANT PAIR 6/4

THRESHOLD 1=-INF THRESHOLD 2=THRESHOLD 3= 147 THRESHOLD 4=+INF

WEIGHTS

| | | | | | | | |
|---|---|---|---|---|---|---|---|
| -11 | 11 | 9 | -4 | 5 | 0 | -4 | -0 |
| -2 | 5 | 4 | -4 | 2 | -14 | 4 | -5 |
| -89 | 0 | 5 | -7 | 2 | -2 | 11 | -2 |
| -15 | 0 | -3 | -2 | -3 | 1 | 11 | 2 |
| -4 | 3 | 1 | -11 | -5 | 13 | -61 | 50 |

DISCRIMINANT PAIR 7/4

THRESHOLD 1=-INF THRESHOLD 2=THRESHOLD 3= -591 THRESHOLD 4=+INF

WEIGHTS

| | | | | | | | |
|---|---|---|---|---|---|---|---|
| 1 | 4 | -8 | -6 | -4 | -6 | -0 | 0 |
| -11 | 1 | 5 | 8 | -5 | -2 | -4 | 13 |
| -107 | 0 | -4 | 9 | -6 | 4 | 0 | 0 |
| -18 | 0 | -1 | 11 | -4 | 9 | -1 | -3 |
| -1 | 6 | 0 | -20 | 7 | 11 | -41 | -26 |

DISCRIMINANT PAIR 8/4

THRESHOLD 1=-INF THRESHOLD 2=THRESHOLD 3= 674 THRESHOLD 4=+INF

WEIGHTS

| | | | | | | | |
|---|---|---|---|---|---|---|---|
| 0 | -6 | 11 | 11 | 2 | 12 | 0 | -3 |
| 6 | -1 | 6 | 1 | 10 | 4 | 0 | 44 |
| 12 | 44 | 9 | -15 | 8 | 0 | 9 | -51 |
| -1 | -57 | -2 | 5 | -2 | 4 | 8 | 2 |
| -2 | -0 | 2 | -19 | -9 | 21 | -19 | 58 |

DISCRIMINANT PAIR 9/4

THRESHOLD 1=-INF THRESHOLD 2=THRESHOLD 3= -251 THRESHOLD 4=+INF

WEIGHTS

| | | | | | | | |
|---|---|---|---|---|---|---|---|
| 24 | -6 | 12 | 14 | 13 | 13 | -1 | -0 |
| -11 | 6 | 9 | -20 | 13 | 9 | -7 | 6 |
| -49 | 0 | -1 | 27 | -43 | 6 | 5 | -8 |
| 11 | 0 | -1 | 18 | -17 | 0 | -2 | 0 |
| -13 | 6 | -1 | -40 | -35 | 64 | -21 | 0 |

DISCRIMINANT PAIR 6/5

THRESHOLD 1=-INF THRESHOLD 2=THRESHOLD 3= 1264 THRESHOLD 4=+INF

WEIGHTS

| | | | | | | | |
|---|---|---|---|---|---|---|---|
| -34 | 25 | 7 | 3 | 10 | 22 | 1 | -5 |
| -14 | -0 | 5 | 12 | -4 | -4 | 36 | -23 |
| 9 | 10 | 20 | -22 | 10 | -30 | 47 | -16 |
| 23 | 3 | 11 | 10 | -14 | 5 | 0 | 9 |
| 1 | 1 | -4 | 44 | -4 | -16 | -2 | 55 |

DISCRIMINANT PAIR 7/5

THRESHOLD 1=-INF THRESHOLD 2=THRESHOLD 3= 1425 THRESHOLD 4=+INF

WEIGHTS

| | | | | | | | |
|---|---|---|---|---|---|---|---|
| 5 | 6 | 4 | -44 | -16 | -12 | 3 | 4 |
| -26 | -10 | 21 | 16 | -10 | 9 | 15 | 1 |
| -23 | -7 | 40 | 6 | -11 | 9 | 45 | -18 |
| 21 | 5 | 30 | 27 | -46 | -13 | 23 | 0 |
| 0 | 4 | -7 | -3 | 10 | -2 | 12 | -36 |

DISCRIMINANT PAIR 8/5

THRESHOLD 1=-INF THRESHOLD 2=THRESHOLD 3= 1224 THRESHOLD 4=+INF

WEIGHTS

| | | | | | | | |
|---|---|---|---|---|---|---|---|
| 3 | 3 | 5 | -42 | 9 | -17 | -3 | -1 |
| -15 | -8 | 0 | -0 | -0 | 0 | 30 | 12 |
| -0 | 23 | 1 | -11 | 8 | 8 | 49 | -19 |
| 16 | 1 | 8 | 8 | -1 | -3 | -19 | 5 |
| -1 | 0 | -6 | 16 | -13 | 7 | 53 | 67 |

DISCRIMINANT PAIR 9/5

THRESHOLD 1=-INF THRESHOLD 2=THRESHOLD 3= 1460 THRESHOLD 4=+INF

WEIGHTS

| | | | | | | | |
|---|---|---|---|---|---|---|---|
| 16 | 0 | 5 | 0 | 7 | 24 | -9 | 7 |
| -22 | -1 | -0 | -6 | -4 | -0 | 33 | -13 |
| 28 | 19 | 23 | 3 | -5 | 8 | 37 | -19 |
| 36 | 10 | 32 | 28 | -31 | -10 | -1 | -2 |
| 0 | 0 | 3 | 0 | -20 | 46 | 46 | 16 |

DISCRIMINANT PAIR 7/6

THRESHOLD 1=-INF THRESHOLD 2=THRESHOLD 3= -874 THRESHOLD 4=+INF

WEIGHTS

| | | | | | | | |
|---|---|---|---|---|---|---|---|
| 7 | -8 | -3 | 0 | -5 | -3 | -4 | 5 |
| 1 | 0 | -4 | 32 | -18 | 24 | -3 | 0 |
| 0 | 0 | -4 | 1 | 0 | 13 | 0 | 0 |
| 0 | 0 | 0 | -5 | -6 | -7 | -0 | -4 |
| 2 | 5 | -4 | -18 | -28 | 3 | 36 | -104 |

DISCRIMINANT PAIR 8/6

THRESHOLD 1=-INF THRESHOLD 2=THRESHOLD 3= -287 THRESHOLD 4=+INF

WEIGHTS

| | | | | | | | |
|---|---|---|---|---|---|---|---|
| 4 | -12 | -9 | -14 | 9 | -12 | -3 | -5 |
| 1 | -8 | -13 | 12 | -2 | 11 | 4 | 5 |
| -7 | 8 | -11 | 1 | 3 | 3 | 2 | 78 |
| 3 | 75 | -5 | -5 | 9 | -9 | -8 | 1 |
| -1 | 1 | -1 | -4 | -2 | -6 | 44 | -13 |

DISCRIMINANT PAIR 9/6

THRESHOLD 1=-INF THRESHOLD 2=THRESHOLD 3= -193 THRESHOLD 4=+INF

WEIGHTS

| | | | | | | | |
|---|---|---|---|---|---|---|---|
| 11 | -5 | -10 | -56 | -8 | -85 | 0 | 17 |
| -11 | 21 | -5 | 4 | -3 | 3 | 0 | -4 |
| 0 | 0 | -4 | 0 | -1 | 18 | 2 | -0 |
| 8 | 0 | 2 | 4 | -6 | -4 | 0 | -2 |
| 0 | 2 | -2 | -16 | -29 | 17 | 39 | -27 |

DISCRIMINANT PAIR 8/7

THRESHOLD 1=-INF THRESHOLD 2=THRESHOLD 3= 684 THRESHOLD 4=+INF

WEIGHTS

| | | | | | | | |
|---|---|---|---|---|---|---|---|
| -4 | 1 | 8 | 10 | -2 | 5 | 5 | -4 |
| 19 | 5 | 7 | 7 | 13 | 12 | -2 | 60 |
| 17 | 57 | 5 | -1 | 2 | -4 | 0 | 11 |
| -1 | 11 | 0 | 20 | -4 | 20 | 0 | 1 |
| -0 | -0 | 2 | 6 | -7 | 0 | -4 | 80 |

DISCRIMINANT PAIR 9/7

THRESHOLD 1=-INF THRESHOLD 2=THRESHOLD 3= 193 THRESHOLD 4=+INF

WEIGHTS

| | | | | | | | |
|---|---|---|---|---|---|---|---|
| 2 | -21 | -10 | -11 | 9 | -2 | -15 | 43 |
| -54 | 25 | -17 | -22 | 29 | 20 | 2 | -8 |
| 0 | 0 | -11 | -22 | 19 | 3 | 2 | -0 |
| 11 | 0 | 2 | -40 | 9 | -42 | 1 | 2 |
| -1 | 2 | 2 | -5 | -11 | 14 | 39 | 0 |

DISCRIMINANT PAIR 9/8

THRESHOLD 1=-INF THRESHOLD 2=THRESHOLD 3= -638 THRESHOLD 4=+INF

WEIGHTS

| | | | | | | | |
|---|---|---|---|---|---|---|---|
| 1 | 0 | -4 | -33 | 0 | -32 | -4 | 3 |
| -12 | 0 | -10 | -9 | -11 | -13 | 3 | -39 |
| -16 | -35 | -2 | 7 | -5 | 2 | -1 | 22 |
| 5 | 23 | 1 | -23 | 9 | -23 | -1 | -6 |
| 0 | 1 | -2 | 1 | 5 | 0 | 15 | -86 |

SORT CLASS 5,5
48 DIMENSIONS

DISCRIMINANT PAIR 2/1

THRESHOLD 1=-INF THRESHOLD 2=THRESHOLD 3= -45 THRESHOLD 4=+INF

WEIGHTS

| | | | | | | | |
|---|---|---|---|---|---|---|---|
| 7 | -5 | -10 | 51 | -31 | 43 | -3 | 0 |
| 0 | 0 | -6 | 2 | 5 | 0 | -6 | 70 |
| -3 | 63 | -9 | -0 | -9 | 0 | 3 | -2 |
| 0 | 0 | -1 | 0 | -11 | 0 | 2 | -5 |
| 6 | -3 | -1 | -1 | 6 | 13 | 6 | -2 |
| 0 | -0 | -1 | 11 | 0 | 9 | -17 | 0 |

DISCRIMINANT PAIR 3/1

THRESHOLD 1=-INF THRESHOLD 2=THRESHOLD 3= 104 THRESHOLD 4=+INF

WEIGHTS

| | | | | | | | |
|---|---|---|---|---|---|---|---|
| 4 | -3 | -36 | 10 | -50 | -21 | -3 | 0 |
| 0 | 0 | -11 | -29 | 18 | 2 | -20 | 2 |
| 1 | -7 | -25 | -5 | 13 | 4 | -2 | 2 |
| -11 | 0 | 1 | -34 | 9 | -30 | 0 | 3 |
| 11 | 20 | 5 | 1 | -2 | 0 | -0 | 7 |
| 2 | 4 | 7 | -3 | 1 | -1 | 75 | -6 |

DISCRIMINANT PAIR 4/1

THRESHOLD 1=-INF THRESHOLD 2=THRESHOLD 3= -113 THRESHOLD 4=+INF

WEIGHTS

| | | | | | | | |
|---|---|---|---|---|---|---|---|
| 20 | -7 | -26 | 42 | -49 | 0 | 1 | 0 |
| 0 | 0 | -22 | -13 | 27 | 28 | -9 | -18 |
| 0 | 0 | -7 | 43 | -34 | 14 | -3 | 2 |
| 0 | 0 | 5 | -14 | 15 | 8 | -13 | -7 |
| 0 | -8 | -1 | -4 | -7 | 2 | -3 | -7 |
| 2 | 1 | 1 | 16 | 18 | -27 | 47 | 2 |

DISCRIMINANT PAIR 5/1

THRESHOLD 1=-INF THRESHOLD 2=THRESHOLD 3= 25 THRESHOLD 4=+INF

WEIGHTS

| | | | | | | | |
|---|---|---|---|---|---|---|---|
| -2 | 5 | -11 | 67 | -16 | 67 | 2 | 0 |
| 0 | 0 | -10 | -9 | 0 | -2 | 6 | -20 |
| 6 | -10 | -9 | -14 | 15 | 4 | -7 | 8 |
| 12 | 18 | 15 | 20 | -13 | 3 | -21 | 29 |
| -11 | 10 | 0 | 6 | 7 | 0 | -2 | 6 |
| 0 | 0 | 2 | 12 | -10 | -17 | 6 | 36 |

DISCRIMINANT PAIR 7/1

THRESHOLD 1=-INF THRESHOLD 2=THRESHOLD 3= -635 THRESHOLD 4=+INF

WEIGHTS

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | -127 |

DISCRIMINANT PAIR 3/2

THRESHOLD 1=-INF THRESHOLD 2=THRESHOLD 3= 13 THRESHOLD 4=+INF

WEIGHTS

| | | | | | | | |
|---|---|---|---|---|---|---|---|
| -7 | 6 | 6 | -11 | -8 | -19 | 2 | 0 |
| 0 | 0 | -3 | -19 | 9 | -3 | -5 | 9 |
| 32 | 8 | 4 | 2 | 4 | -1 | -4 | 6 |
| 23 | 0 | 1 | -68 | 9 | -68 | 3 | -3 |
| 0 | 5 | 5 | -8 | 4 | -14 | 0 | -4 |
| 0 | 1 | 10 | 1 | -35 | 35 | -21 | 3 |

DISCRIMINANT PAIR 4/2

THRESHOLD 1=-INF THRESHOLD 2=THRESHOLD 3= 106 THRESHOLD 4=+INF

WEIGHTS

| | | | | | | | |
|---|---|---|---|---|---|---|---|
| -24 | 16 | 27 | 23 | 49 | 20 | -4 | 0 |
| 0 | 0 | 5 | 16 | -20 | 4 | 25 | -48 |
| -37 | -23 | -23 | 12 | 3 | -10 | -9 | 7 |
| 0 | 0 | 16 | 3 | 2 | 8 | -2 | 12 |
| -1 | 11 | 7 | -41 | 33 | -12 | 4 | 13 |
| 0 | -4 | 0 | 9 | 3 | -6 | 15 | -0 |

DISCRIMINANT PAIR 5/2

THRESHOLD 1=-INF THRESHOLD 2=THRESHOLD 3= -204 THRESHOLD 4=+INF

WEIGHTS

| | | | | | | | |
|---|---|---|---|---|---|---|---|
| -25 | 17 | 21 | -55 | 16 | -47 | -3 | 0 |
| 0 | 0 | -1 | -50 | -3 | -43 | 12 | -23 |
| -1 | -22 | -13 | -10 | 18 | -13 | -17 | -1 |
| 0 | -4 | 2 | 9 | -13 | 5 | -1 | 15 |
| -1 | 13 | -5 | 11 | 3 | 11 | 11 | 4 |
| -1 | -1 | 7 | 1 | -3 | 13 | -19 | -20 |

DISCRIMINANT PAIR 7/2

THRESHOLD 1=-INF THRESHOLD 2=THRESHOLD 3= -18 THRESHOLD 4=+INF

WEIGHTS

| | | | | | | | |
|---|---|---|---|---|---|---|---|
| -1 | 0 | 2 | 1 | 20 | 20 | 0 | 0 |
| 0 | 0 | 0 | 4 | -22 | -18 | 0 | 12 |
| -0 | 12 | 0 | 0 | 3 | 0 | 0 | 0 |
| 0 | 0 | 0 | -82 | 3 | -85 | 1 | -2 |
| -3 | -1 | 0 | 2 | 0 | -1 | 0 | -0 |
| 0 | 0 | 0 | 1 | -4 | 3 | -1 | 2 |

DISCRIMINANT PAIR 4/3

THRESHOLD 1=-INF THRESHOLD 2=THRESHOLD 3= 429 THRESHOLD 4=+INF

WEIGHTS

| | | | | | | | |
|---|---|---|---|---|---|---|---|
| 9 | -12 | 13 | 35 | 49 | 44 | 0 | 0 |
| 0 | 0 | 15 | 19 | -12 | 4 | 15 | -19 |
| -21 | 19 | 14 | 15 | -5 | 1 | -0 | -3 |
| 18 | 0 | 7 | 35 | -9 | 20 | -8 | -3 |
| -5 | -15 | 6 | -35 | 0 | -21 | -8 | -2 |
| 0 | -1 | 0 | 14 | 12 | -8 | 42 | 24 |

DISCRIMINANT PAIR 5/3

THRESHOLD 1=-INF THRESHOLD 2=THRESHOLD 3= 534 THRESHOLD 4=+INF

WEIGHTS

| | | | | | | | |
|---|---|---|---|---|---|---|---|
| 6 | -13 | 28 | -31 | 53 | -13 | 8 | 0 |
| 0 | 0 | 2 | -2 | -13 | -16 | 28 | -5 |
| 13 | 24 | 0 | 0 | -4 | 2 | -7 | -13 |
| 31 | -10 | -5 | 10 | -10 | 14 | -15 | 28 |
| 5 | 15 | -4 | 24 | -2 | 25 | -4 | 0 |
| -1 | -1 | 5 | 19 | 15 | -36 | 16 | 45 |

DISCRIMINANT PAIR 7/3

THRESHOLD 1=-INF THRESHOLD 2=THRESHOLD 3= 1 THRESHOLD 4=+INF

WEIGHTS

| | | | | | | | |
|---|---|---|---|---|---|---|---|
| 10 | -15 | 8 | -0 | 38 | 33 | 3 | 0 |
| 0 | 0 | 5 | 26 | -11 | 5 | 12 | -12 |
| -26 | -5 | 15 | 12 | -22 | 4 | 6 | -5 |
| -23 | 0 | 2 | 64 | -13 | 57 | 6 | -15 |
| 0 | -21 | -6 | -4 | 6 | 0 | 8 | -11 |
| 0 | 0 | -16 | -12 | -2 | 10 | -18 | 4 |

DISCRIMINANT PAIR 5/4

THRESHOLD 1=-INF THRESHOLD 2=THRESHOLD 3= 6 THRESHOLD 4=+INF

WEIGHTS

| | | | | | | | |
|---|---|---|---|---|---|---|---|
| 7 | -0 | -0 | 88 | -0 | 88 | 0 | 0 |
| 0 | 0 | 0 | -2 | -3 | -5 | 3 | 1 |
| 3 | 1 | -4 | -5 | 4 | 7 | -0 | 2 |
| 4 | 2 | 0 | 2 | -1 | 1 | 0 | 1 |
| -0 | 0 | -1 | -6 | 1 | -4 | 2 | 0 |
| 0 | 0 | 0 | -0 | -0 | 0 | 0 | 0 |

DISCRIMINANT PAIR 7/4

THRESHOLD 1=-INF THRESHOLD 2=THRESHOLD 3= -157 THRESHOLD 4=+INF

WEIGHTS

| | | | | | | | |
|---|---|---|---|---|---|---|---|
| 6 | -4 | -4 | -22 | -52 | -52 | -3 | 0 |
| 0 | 0 | 4 | -23 | -8 | -33 | -1 | 14 |
| 0 | 0 | 1 | -43 | 29 | 9 | 2 | -1 |
| 0 | 0 | -5 | 17 | -18 | -6 | 11 | -4 |
| -5 | -7 | -9 | -11 | -11 | -20 | 8 | -6 |
| -5 | 6 | -2 | -28 | -18 | 33 | -30 | -7 |

DISCRIMINANT PAIR 7/5

THRESHOLD 1=-INF THRESHOLD 2=THRESHOLD 3= -573 THRESHOLD 4=+INF

WEIGHTS

| | | | | | | | |
|---|---|---|---|---|---|---|---|
| -4 | 1 | 5 | -3 | -19 | -15 | -3 | 0 |
| 0 | 0 | 1 | -23 | -33 | -46 | -3 | -20 |
| 3 | -25 | -3 | 4 | 0 | -4 | 6 | -14 |
| -2 | -19 | -4 | 12 | -0 | -11 | 11 | -22 |
| 5 | -23 | -5 | -20 | 1 | -21 | 9 | -5 |
| -6 | 0 | -14 | -9 | 4 | 15 | -10 | -80 |

vector for distinguishing two classes. The procedure is statistical in the sense that the discriminant vector is found by optimizing a function which depends upon statistical samples of the feature vectors for the two classes. The precise mathematical definition of the discriminant vector $d$ is as follows:

$$d = W^{-1}[\mu_1 - \mu_2]$$

where $W^{-1}$ is the inverse of the matrix known as the sum of the within-class scatter matrices, and $\mu_1$ and $\mu_2$ are the sample mean vectors derived using the sample feature vectors from each class. W, $\mu_1$ and $\mu_2$ are computed from the statistical samples as follows: let $X_j^{(i)}$ symbolically represent the $j^{th}$ sample feature vector from class $i$, $j = 1, 2, \ldots, N_i$. Then $$\underline{\mu}_i = \frac{1}{N_i}\sum_{j=1}^{N_i} \underline{X}_j^{(i)}$$

$$W = S_1 + S_2$$

where $S_i = D_i D_i^T$, and $$D_i = \Big[\overbrace{(\underline{X}_1^{(i)} - \underline{\mu}_i)\,(\underline{X}_2^{(i)} - \underline{\mu}_i)\,\ldots\,(\underline{X}_{N_i}^{(i)} - \underline{\mu}_i)}^{N_i}\Big]\updownarrow L$$

The Fisher discriminant vector, $d$, is optimal in the sense that the means of the two classes along the Z axis are separated as far apart as possible relative to the scatter (or spread) of the class samples about their respective means. Basically, the Fisher criterion produces discriminant weights which cause the sample data to be maximally separated along the Z axis. The precise mathematical derivation of this optimality property is readily available in the paper by J.W. Sammon entitled "An Optimal Discriminant Plane", IEEE Transactions on Computers, Vol. C-19, No. 9, pp. 826–829, Sept. 1970.

The Fisher Discriminant technique produces optimal weights which result in the sample data from the two classes being maximally separated along the Z axis; however, it does not yield the threshold settings (i.e., $\theta_1$, $\theta_2$, $\theta_3$ and $\theta_4$) along the Z axis. A very simple and effective method for specifying the thresholds is the following:

$\theta_1 = -\text{INF}$ $\theta_2 = \theta_3 = (\nu_I + \mu_J)/2$ $\theta_4 = +\text{INF}$ where $-$INF is the smallest negative integer which can be represented by the machine used to implement the program, +INF is the largest positive integer, and $\mu_I$ and $\mu_J$ are the mean values of the two data classes along the Z axis. Thus $\theta_2$ and $\theta_3$ are both set equal to the mid-value between the two class means. In practice, this simple threshold strategy has produced recognition accuracies in excess of 99.5 percent, with a corresponding error (mistaken character recognition) rate of approximately 0.3 percent, leaving a rejection (no character decision) rate of approximately .2%. This performance is highly acceptable. However, some special applications cannot tolerate an error rate even as small as 0.3 percent. In these situations the error rate can be reduced from 0.3 percent to any prespecified acceptable value, at the expense of increasing the rejection rate, as follows. The Z values of the data resulting from the design of the discriminant weights associated with the particular pairwise test are listed in a sequence of increasing values, with each value being placed in the I column or the J column depending upon the true class of the character whose feature vector produced the Z value:

| | Class I Z Values | Class J Z Values |
|---|---|---|
| | XXXX | |
| | XXXX | |
| $\theta_2$ | XXXX | |
| | . | XXXX |
| | . | |
| $\theta_3$ | . | XXXX |
| | | XXXX |
| | | XXXX |
| | | . |
| | | . |
| | | XXXX |
| | | XXXX |

Upon inspection of such a listing the trade-off between error rates and rejection rates is immediately apparent. The values $\theta_2$ and $\theta_3$ shown above provide a 0% error rate but this is offset by a larger rejection rate (since more feature vectors result in values of Z which produce a no vote for both I and J). By moving the $\theta_2$ and $\theta_3$ levels closer together, the rejection rate decreases but the error rate increases. In practice, the thresholds can be assigned quite quickly. From Table 13, the total number of pairwise tests for the numeric system is computed by summing the K(K−1)/2 pairwise tests corresponding to each sort group; there are 145 different tests in all. Thus 145 listings of the type just described may be made and the $\theta$ values selected depending upon the desired error rate.

As an example of the procedure for obtaining the discriminant vectors, consider the case of the (1,1) sort group. As noted in Table 13, this logic is composed of a single pairwise test between zero and one. The first step in the determination of the discriminant vector is the collection of statistical sample feature vectors representing zeros and ones which had only one convexity on both the right and left sides (i.e., contained within the (1,1) sort group). These vector samples are then used to compute the sum of the within-class scatter matrix (i.e., W) and the mean vectors for class 0 and class 1. The inverse of W is computed and then multiplied by the difference vector $(\nu_1 - \mu_2)$ which produces the sought after discriminant vector.

It should be noted that in the above description the dimensionality of both the feature vector and the discriminant vector were symbolically represented by L. This dimensionality varies from one sort group to another. However, all pairwise discriminant tests within a sort group share a common dimensionality. The dimensionality associated with each sort group is computed and listed as follows:

$$L = 4(LCONVEX + RCONVEX) + 8$$

| Sort Group | Dimensionality |
|---|---|
| (1,1) | 16 |
| (1,3) | 24 |
| (1,5) | 32 |
| (3,1) | 24 |
| (3,3) | 32 |
| (3,5) | 40 |
| (5,1) | 32 |
| (5,3) | 40 |
| (5,5) | 48 |

A typical set of discriminant weights and thresholds are listed in Table 14. These discriminant weights and the features are preferably represented in a computer as eight-bit signed integers. Integer arithmetic may be used to compute the discriminant tests using 16-bit integer accuracy to represent the resultant inner products and thresholds. The fact that sufficient classification accuracy is obtained using only 8 bits for the representation of the discriminant weights is of considerable importance from an implementation point of view. This is true since the pairwise logic requires that a large number of discriminant weights be stored and obviously the total storage requirement increases as a multiple of the bits used to represent the discriminant weights. The discriminant weights of Table 14 are arranged in 145 groups (vectors) — one discriminant vector being required for each pairwise test in each sort group. The weights for any system (i.e., any group of characters to be discriminated) can be determined statistically as described above, and the weights given in Table 14 are those applicable to a numeric system. The weights for each discriminant vector are to be read row after row, from left to right in each row.

Although the basic underlying steps of the classification logic routine of the invention can be implemented in a straight-forward manner, there is a preferred sequence in which to perform the pairwise tests. An exhaustive technique would require that all K(K−1)/2 pairwise tests in each sort group be computed and the votes for each class tabulated. Upon completion, the computer could then check to see if any class received the maximum number of votes, that is, K−1 votes. If some class, say class P, does, in fact, receive K−1 votes, a positive decision for class P would be output; otherwise a rejection signal would be output. Clearly, such a procedure would be costly in the amount of time required to reach a decision, especially when the unknown vector belongs to a sort group with a large K. Referring to Table 12, it is seen that the most probable sort group is the (3,3) group, since approximately one third of all numeric characters are found there. From Table 13, it is seen that the (3,3) sort group has the largest number of character classes (i.e., K = 9) and therefore the largest number of pairwise tests (i.e., K(K−1)/2 = 36). Thus, the most probable sort group requires the largest number of pairwise discriminant tests. Since a considerable portion of the total computer time required to recognize a character is consumed in the computation of the pairwise discriminant tests, it is advantageous to minimize the number of discriminant tests which must be computed before achieving a definite decision. It is desirable, therefore, to use an optimal procedure for sequencing through the pairwise tests, such that on the average the fewest number of tests will be required.

The principal reason that it is possible to improve upon the exhaustive method is that the classification procedure can terminate before all possible K(K−1)/2 tests for any sort group are performed. The tests can terminate under two conditions: (1) a class receives K−1 votes in which case a decision is rendered for that class, or (2) if every class loses at least one vote, the testing can terminate and a rejection can be output. Still another factor is important: once a class has lost a vote, as the result of computing a pairwise test, then that class cannot achieve K−1 votes and therefore need not be considered as a potential "winner". These facts suggest that it is possible to sequentially order the tests so as to minimize the average number of tests computed. The principle concept in this regard is that the next test in a sequence of tests is determined based upon the outcome of all preceding tests.

The optimal strategy, referred to herein as the Minimal Path Method, which produces, on the average, the fewest number of tests and therefore insures the fastest throughput, operates as follows. First, all of the pairwise tests, say I vs J ($T_{IJ}$), are ordered in accordance with the class probabilities within the sort group. Let $P_K$ symbolically represent the percentage of the characters found in the sort group which belong to class K. The tests are ordered such that $T_{IJ}$ precedes $T_{RQ}$ if and only if $$P_I > P_R \quad \text{for } I \neq R$$

$$P_J > P_Q \quad \text{for } I = R$$

Suppose the ranking is as follows for a sort class with K = 4: $P_1 > P_2 > P_3 > P_4$. The pairwise tests are then 1/2, 1/3, 1/4, 2/3, 2/4, 3/4. The first test would be 1 vs 2. The next test is determined on the basis of the outcome of the preceding test. For example, suppose the vote goes to class 1. In this case, class 2 cannot receive the maximum number of votes (i.e., K−1 = 3) and thus the only classes in in contention are 1, 3, and 4. Therefore, the algorithm selects the next highest ranked test not involving class 2. In this example, 1 vs 3 would be chosen. Now suppose that class 3 receives the vote, in which case neither 1 nor 2 can win. Repeating the above procedure, the next highest ordered test not involving classes 1 and 2 which also involves class 3 is the 3 vs 4 test. Suppose the outcome of this test is a vote for class 3. At this point, it is known that classes 1, 2, and 4 cannot be winners; however, it is not yet known if class 3 is the winner without checking to see if class 3 receives the maximum number of votes. Since there does not exist an uncomputed test not involving a discarded class, the algorithm will select the highest ranked uncomputed test involving class 3. This condition occurs when all but one class have been discarded as possible winners. In this example, the 2 vs 3 test is selected as the next test. If class 3 wins, a final decision for class 3 is output; otherwise, a rejection is issued. In this example, four tests are required, whereas the exhaustive method requires 4(4−1)/2 = 6 tests. In general, the following list gives the number of tests required, assuming that eventually a positive class decision is reached (i.e., the true class receives all K−1 votes) and that $P_1 \quad P_2 \quad P_3 \ldots \quad P_K$:

| Identity of the Actual Class | Number of Tests Required by the Minimal Path Method |
|---|---|
| 1 | K − 1 |
| 2 | K − 1 |
| 3 | K |
| 4 | K + 1 |
| 5 | K + 2 |
| . | . |
| . | . |
| K | 2K − 3 |

The average number of tests required, T, assuming a positive class decision is achieved, is given by $$T=P_1[K-1]+\sum_{I=2}^{K} P_I[K+I-3]$$

which is the minimum number possible.

As an example of the above procedures, consider the case of the (1,3) sort group. Referring to Table 12, the rank ordering of the character classes within the (1,3) sort group is $P_6>P_0>P_8>P_1$. Thus, the tests are ordered 6/0, 6/8, 6/1, 0/8, 0/1, 8/1. The average number of tests, $\overline{T}$, is computed using the formula above and the statistics in Table 12.

$$\overline{T}=(5513/7207)(3)+(1180/7207)(3)+(260/7207)(4)+(254/7207)(5)=3.1$$

It is clear that a significant time savings is accomplished when one considers the six tests required by the exhaustive method (although the number of instructions which must be stored in the computer memory increases due to the additional logic functions which must be performed to properly order the tests based on the previous results).

In order to understand a computer implementation of the Minimal Path Method, it is useful to envision the test sequence as represented by a hierarchical tree structure. The first test is represented as the top node at level 1. The output from this test determines which of three possible paths the algorithm takes to level 2. The nodes at level 2 represent the tests to be computed based upon the outcome of the preceding test. Every test node has three branches, or paths, to lower order nodes corresponding to the three possible outcomes, that is, a vote for I, a vote for J, or no vote for either I or J. Thus, the tree structure can be used to represent all possible paths or sequences of tests which will produce either a positive class decision or a rejection.

Figure 10:
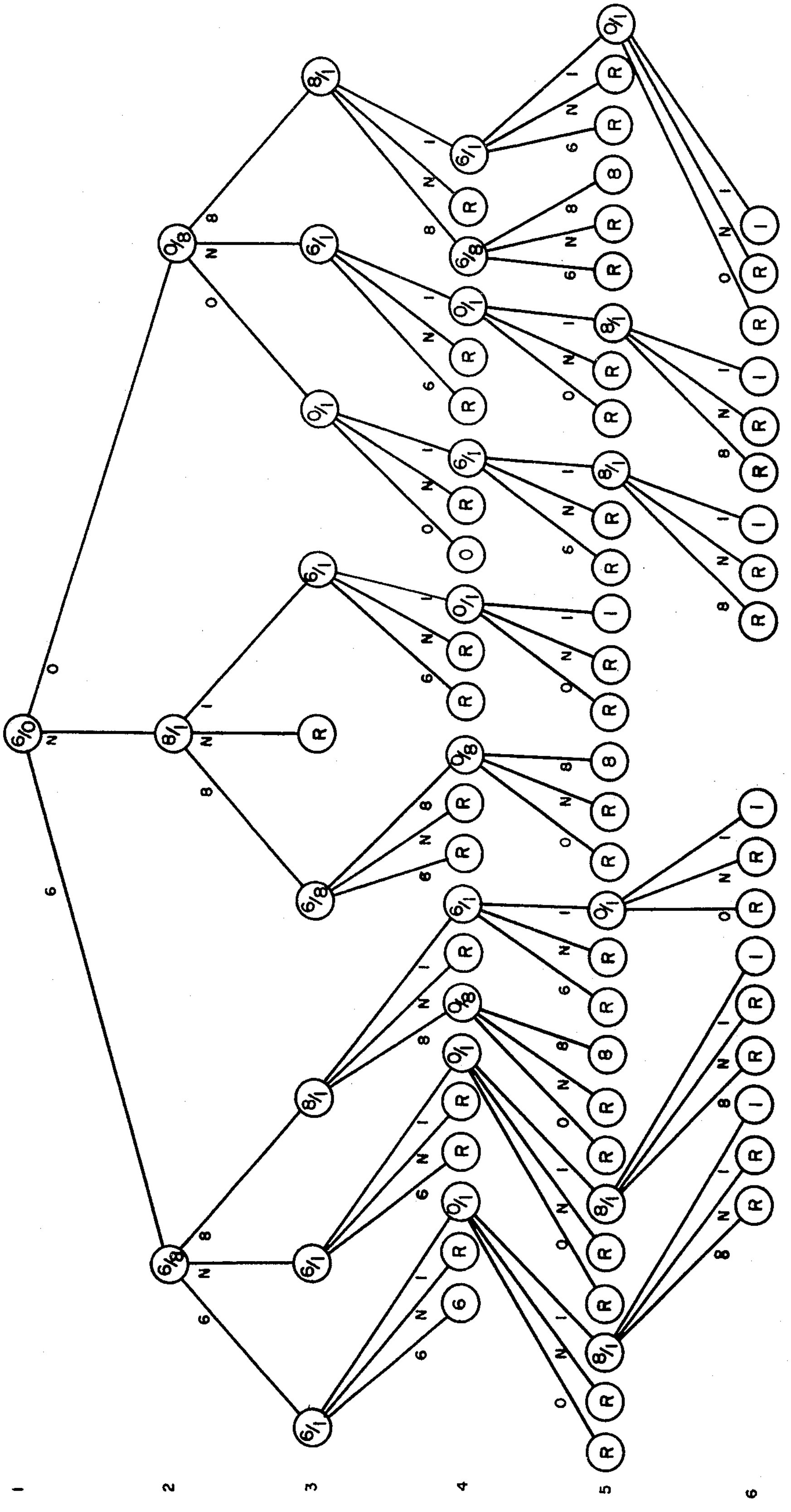
FIG. 10 shows the minimum path tree for sequencing pairwise discriminant tests within the (1,3) sort group associated with the numeric reader.

FIG. 10 illustrates the tree structure representing the optimal sequence strategy (i.e., the Minimal Path Method) for the (1,3) sort group. The node (circle) of the tree labeled I/J represents the linear discriminant test between classes I and J. The three branches from this node are labeled I, N and J to correspond to the three possible outcomes, that is, a vote for I, no vote for either class, or a vote for J. Terminal nodes are labeled either R, corresponding to a rejection decision, or with a numeral, corresponding to a positive class decision.

Figure 11:
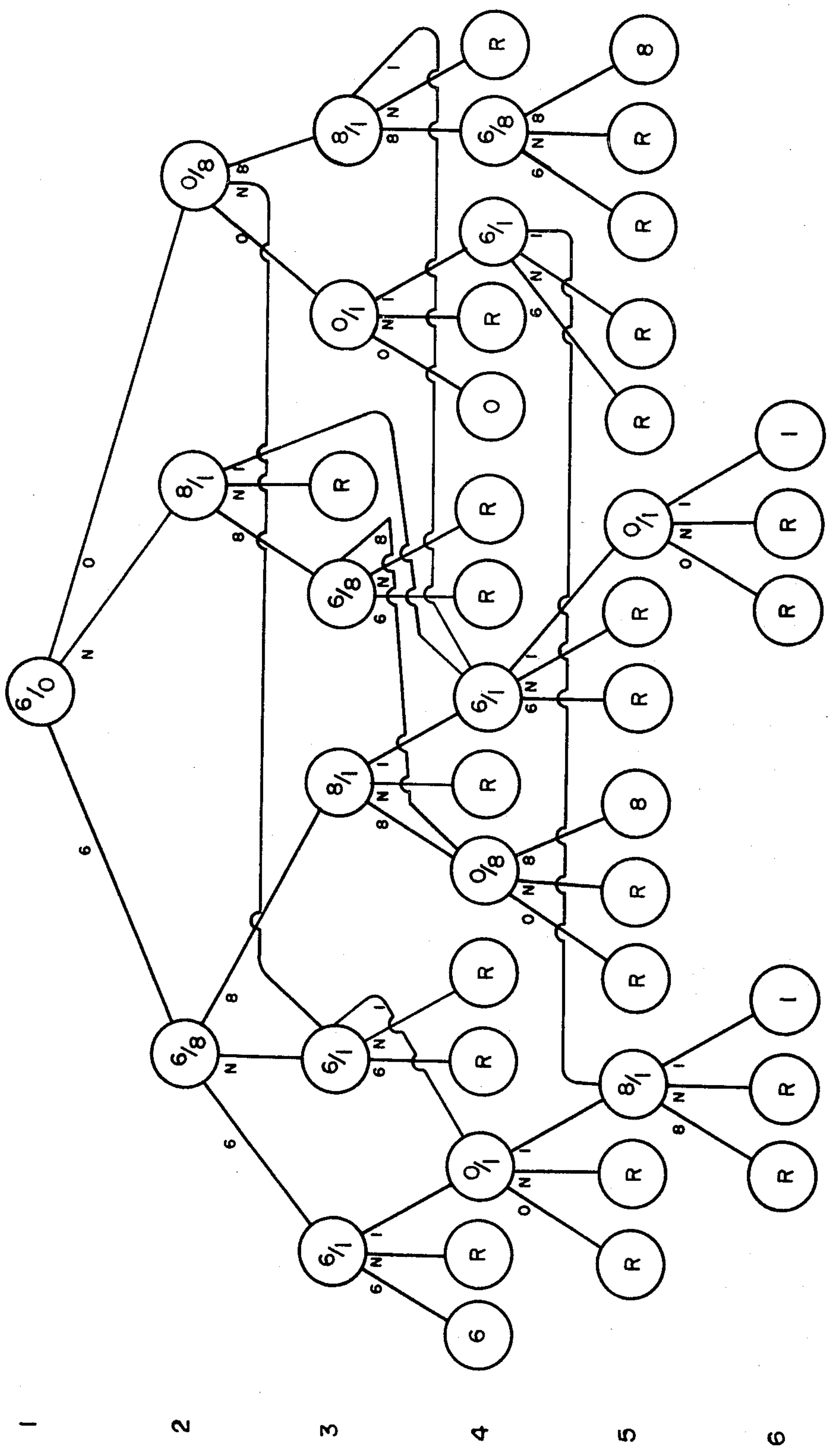
FIG. 11 shows the reduced tree corresponding to the original tree shown in FIG. 10.

The tree structure not only serves the purpose of illustrating the optimal sequencing procedure but also suggests a convenient implementation methodology. The method associates a set of pointers with the discriminant vector corresponding to a particular pairwise test. The pointers are analogous to the branches of the tree and can be used by the classification program to either retrieve the next discriminant vector or to output the appropriate decision. Basically, three pointers are stored with the I/J discriminant vector; the first pointer directs the program to take the action required by an I vote, the second pointer directs the action required by a J vote and finally, the third pointer directs the action required by a no vote (N). Referring to FIG. 10, it is seen that the pointers associated with a particular discriminant are not necessarily unique. For example, consider the four 6/1 tests found at level 3. Clearly, a vote for class 6 requires a different action in the case of the two leftmost 6/1 tests. However, the tree structure emanating from the second 6/1 test is identical to that emanating from the fourth 6/1 test. Taking note of this and similar observation allows the (1,3) tree of FIG. 10 to be highly simplified and reduced to the equivalent tree shown in FIG. 11. Observing the tree of FIG. 11, it is apparent that only one set of pointers need be stored with the 6/0 test since it appears only once; three sets of pointers are needed for the 6/8 test, four sets for the 6/1 test, two sets for the 0/8 test, three sets for the 0/1 test, and four sets for the 8/1 test. It should be appreciated that the amount of storage required to store these pointers has been greatly reduced by compressing the tree from the form shown in FIG. 10 to the form shown in FIG. 11.

With respect to the implementation of the classification logic, the discriminant vector, the thresholds and the pointers associated with a particular discriminant can be stored in a two-dimensional array designated D(ID,J). The first parameter of this array, ID, is an index which serves as a pointer to the discriminant test. The total number of pairwise discriminant tests associated with the numeric reader can be computed easily using the data of Table 13. The summation of the K (K−1)/2 pairwise tests associated with each sort group results in a total of 145 tests for all nine sort groups. Thus, the index ID runs from 1 to 145. The second parameter of each D(ID,J) array is used to retrieve the discriminant weights, thresholds, and pointers associated with the ID discriminant test. The pertinent data associated with a discriminant test can be formatted as follows:

| | | |
|---|---|---|
| J = 1<br>J = 2<br>.<br>J = NDIM | Discriminant Weights | |
| J = NDIM + 1 | Threshold No. 1, $\theta_1$ | |
| J = NDIM + 2 | Threshold No. 2, $\theta_2$ | |
| J = NDIM + 3 | Threshold No. 3, $\theta_3$ | |
| J = NDIM + 4 | Threshold No. 4, $\theta_4$ | |
| J = NDIM + 5 | I Pointer | Level 1 Pointers |
| J = NDIM + 6 | J Pointer | |
| J = NDIM + 7 | No Vote Pointer | |
| J = NDIM + 8 | I Pointer | Level 2 Pointers |
| J = NDIM + 9 | J Pointer | |
| J = NDIM + 10 | No Vote Pointer | |

The first NDIM cells store the discriminant vector. The next four cells store the four thresholds. The cells which follow are used to store the pointers associated with the test. Several levels of pointers may be associated with a particular test. Each level contains three pointers corresponding to three possible results of the test. The level of the pointer to be used is determined by the outcome of the preceding test. The specific pointer word of the set of three is determined by the outcome of the present test. The Level 1 pointers are used for the first test in a sequence.

Each pointer word can contain the following types of information:

1. Finished Bit — This is a single bit which can be used to indicate that a terminal node in the tree has been reached.

2. LEVNEW Value — This is the value of the second parameter of the D(ID,J) array (i.e., J) which determines the level to be used by the next discriminant test.

3. New ID Value — This is the index (i.e., ID value) designating the next discriminant test to be used.

4. ASCII Code of Decision — If the finished bit is set, a terminal node has been reached in which case the classification logic outputs the ASCII code (or any other desired code) contained in the pointer word. The two general formats of the pointer words are as follows:

| | | | |
|---|---|---|---|
| Finished bit=0: | 0 | LEVNEW | ID |
| Finished bit=1: | 1 | ASCII Code | |

In step 3.19, the pointer to the first discriminant test is determined. This pointer is simply the ID parameter of the first D(ID,J) array to be used. The ID pointer is determined by the sort group of the character being processed. The LCONVEX and RCONVEX numbers are used to look up the ID pointer associated with the (LCONVEX, RCONVEX) sort group, a table being stored in the computer memory associating each of the nine sort groups with a respective ID pointer. For example, the initial ID pointer for the (1,3) group would index the 6/0 test illustrated in the top node of FIG. 11.

Figure 12:
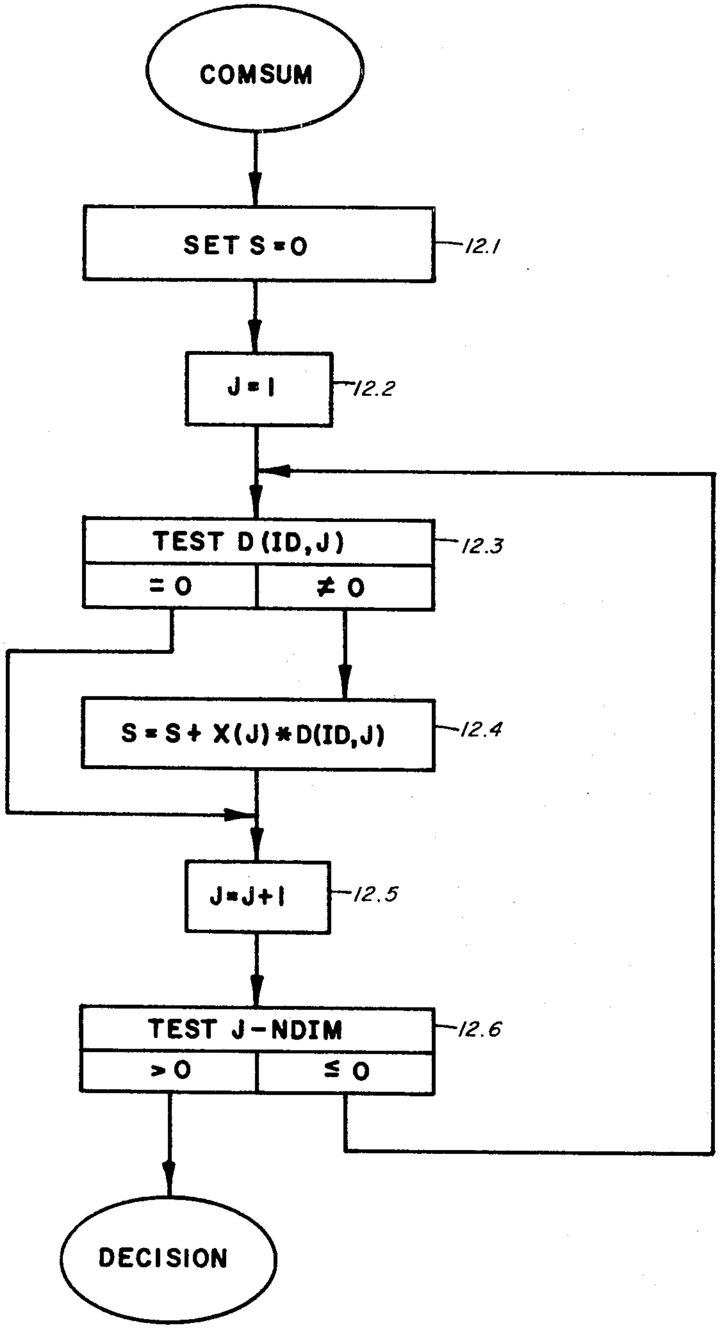
FIG. 12 depicts the flow chart of a program named COMSUM which can be used to compute pairwise discriminants.
Figure 13:
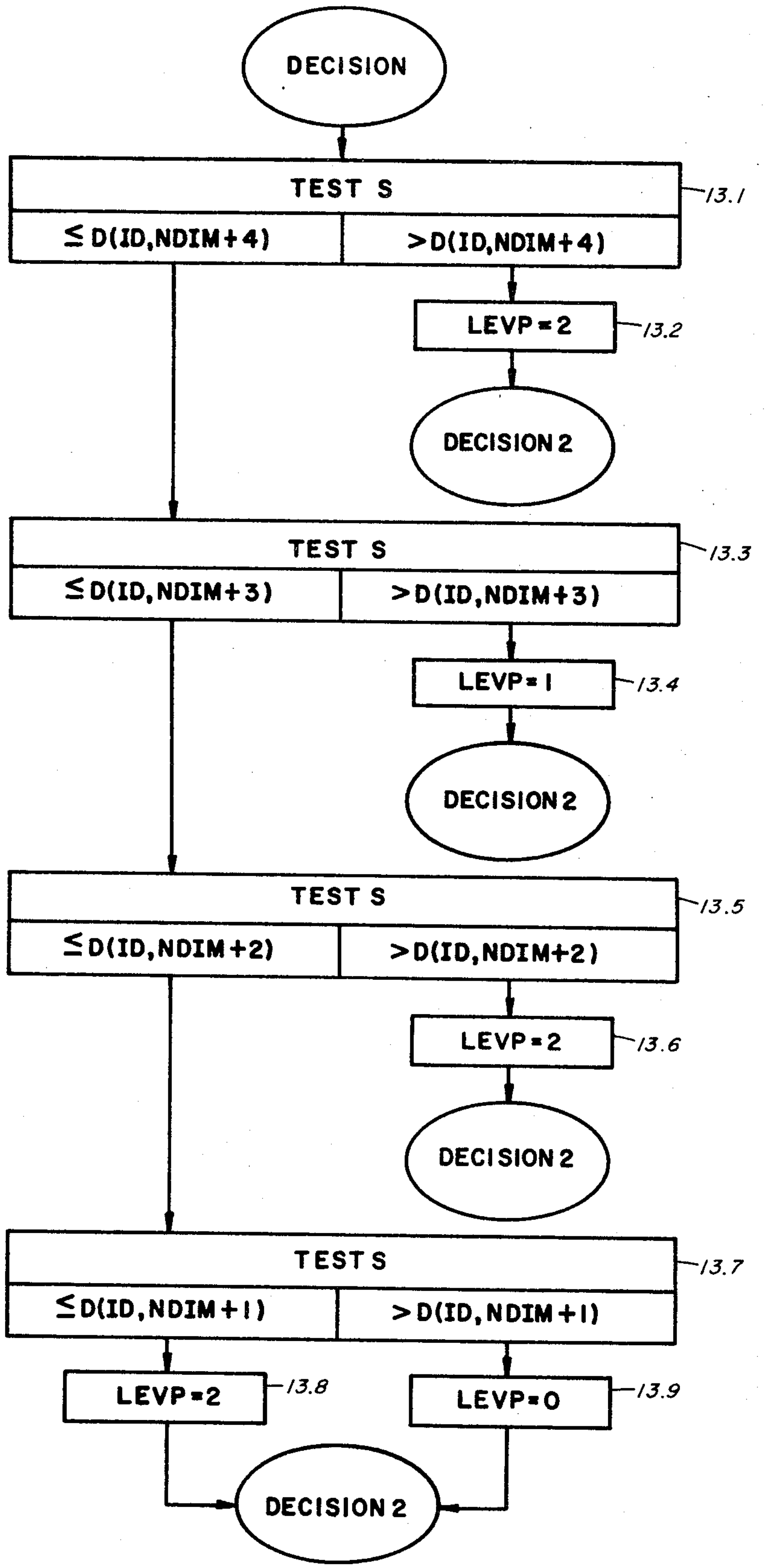
FIG. 13 depicts the flow chart of a program named DECISION which is used to "threshold" the discriminant computed by COMSUM.
Figure 14:
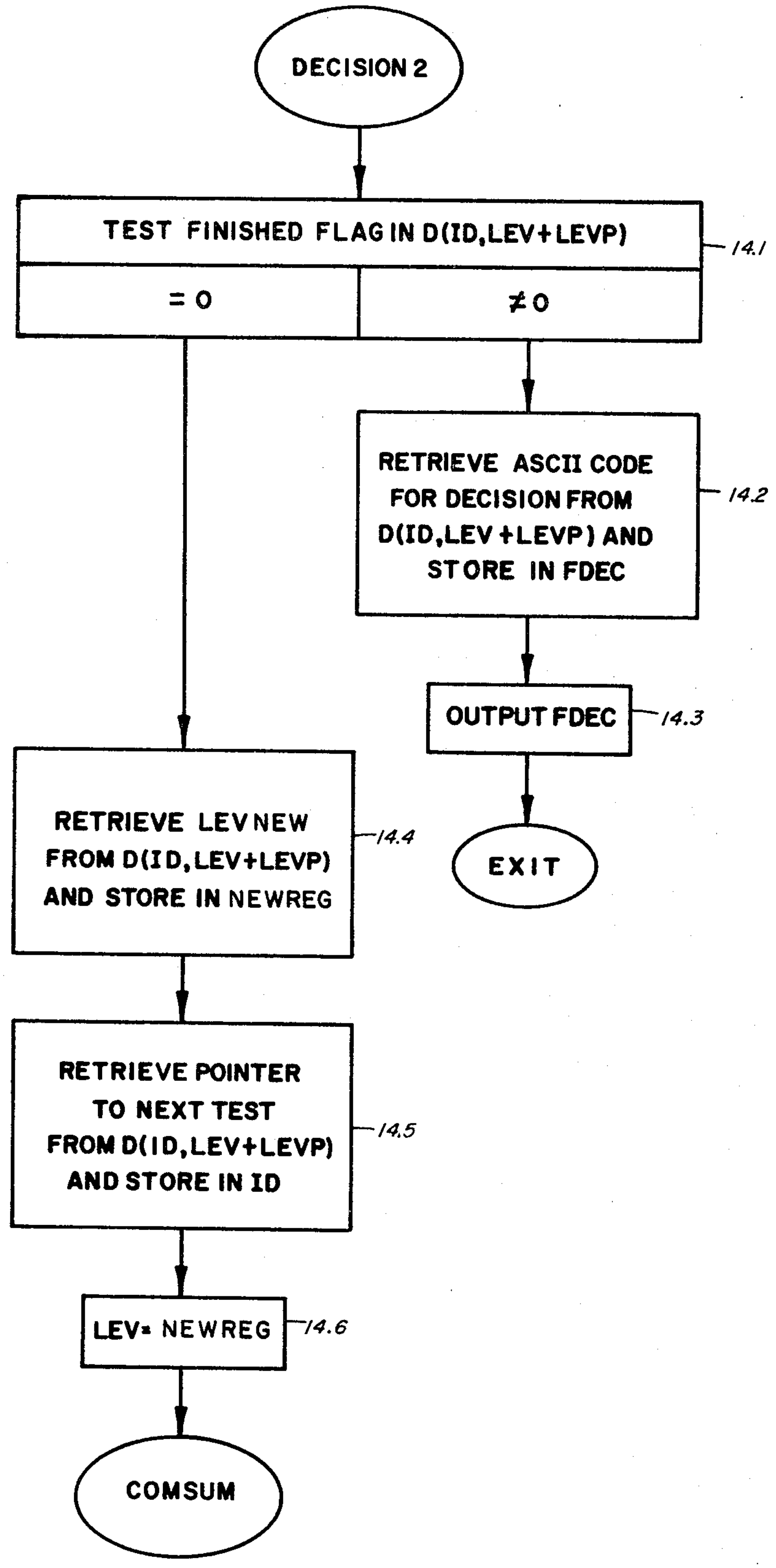
FIG. 14 depicts the flow chart of a program named DECISION2 which is used to either output a decision or retrieve the pointers to the next pairwise discriminant test.

The recognition logic can be implemented as shown in the flow charts of FIGS. 12–14. These flow charts depict the sub-steps of step 3.20 of FIG. 3. Referring to FIG. 12, the program named COMSUM is entered having completed the entire feature extraction process. The X array now contains the feature vector, NDIM has been set to the number of dimensions and ID points to the first discriminant test of the sort group (LCONVEX, RCONVEX) which contains the character to be recognized. The parameter LEV is used to designate the level to be used in retrieving pointers and is initially set equal to NDIM + 5. The function of the program COMSUM is to compute the inner product of the feature vector with the discriminant vector referenced by ID. Initially, the inner product cell is set to zero in step 12.1, that is, S= 0. The loop index J, which is used to retrieve the discriminant weights, is set to 1 in step 12.2. A test is conducted in step 12.3 to see if the discriminant weight is non-zero. If it is non-zero, the inner product cell is updated in step 12.4 by adding the product of the $J^{th}$ element of the discriminant vector D(ID,J) and the $J^{th}$ element of the feature vector X(J) to the contents of S. If the discriminant weight is zero, the product operation is skipped. The loop index is then incremented in step 12.5 and tested in step 12.6 to see if all the elements have been multiplied. If J does not exceed NDIM, the loop is repeated for the incremented J. When the computation of the inner product has been completed, the program transfers to the program DECISION, with the inner product stored in S.

The function of the DECISION program illustrated in FIG. 13 is to test S against the four thresholds. These thresholds are stored in D(ID,NDIM + 1), D(ID,NDIM + 2), D(ID,NDIM + 3) and D(ID,NDIM + 4). Depending upon the outcome of these tests on S, the program sets a pointer named LEVP to one of three values. The criterion and values for LEVP are as follows:

$$\left.\begin{array}{rl} & S > D(ID,NDIM+4) \\ D(ID,NDIM+3) \geq & S > D(ID,NDIM+2) \\ D(ID,NDIM+1) \geq & S \end{array}\right\} LEVP = 2$$

$$D(ID,NDIM+4) \geq S > D(ID,NDIM+3) \quad LEVP = 1$$

$$D(ID,NDIM+2) \geq S > D(ID,NDIM+1) \quad LEVP = 0$$

Simply stated, LEVP = 1 indicates a vote for J, LEVP = 0 indicates a vote for I and LEVP = 2 indicates a no vote condition. The testing sequence of FIG. 13 is self-explanatory. The exit from the DECISION program is set to the program named DECISION 2 illustrated in FIG. 14.

The object of the DECISION 2 program is to either terminate the recognition procedure or to adjust the parameters which direct the program to the next test. The first function is to check to see if the process has reached a terminal node. This task is accomplished by checking the finished bit in the pointer word associated with the outcome of the previous DECISION program. In step 14.1 the finished bit is checked in the pointer word found in D(ID,LEV + LEVP). In the event that the finished bit is a 1, the program terminates by outputting the ASCII code found in D(ID,LEV + LEVP).

On the other hand, if the finished bit is a 0, the program goes to step 14.4 where the pointer level (LEVNEW) to be used for the next discriminant test is retrieved from the present pointer word D(ID,LEV + LEVP). Next, the pointer to the next discriminant test is retrieved from the present pointer word and stored in ID. Finally, in step 14.6, LEV is updated by setting it equal to LEVNEW and control shifted to the program COMSUM.

The principles of the invention, described above with specific reference to numeric characters, are also applicable to much larger character sets, including intermixed alpha and numeric handprinted and machine printed characters (i.e., either an alpha or numeric can appear in the same field). For this case, it is preferable to place constraints upon the way certain characters are drawn. Specifically, it is desirable that zeros and Z's be slashed so that they may be distinguished from O's and twos respectively. But even with these constraints, the left and right contours will not always provide sufficient discriminatory information for all pairs of characters. Consider, for example, H vs N, or V vs W, or M vs N. It is true, however, that the top and bottom contours do provide the discriminatory information for these cases. In general, at most two of the four contours (left, right, top and bottom) are actually needed to discriminate any pair of alpha-numeric characters. Table 15 lists the contour pairs which can be used for every possible pair of alpha-numeric characters. The use of Table 15 will be explained below.

TABLE 15

Contour Pairs for Alpha-Numeric Characters

The right pair of numbers represent a code for the associated class pairwise discriminant. The code is:

1 = bottom contour
2 = right contour
3 = top contour
4 = left contour

| | | | | | | | |
|---|---|---|---|---|---|---|---|
| 01 | 1 3 | 14 | 3 4 | 27 | 2 4 | 3B | 2 4 |
| 02 | 2 4 | 15 | 2 4 | 28 | 2 4 | 3C | 2 4 |
| 03 | 2 4 | 16 | 2 3 | 29 | 2 4 | 3D | 2 4 |
| 04 | 3 4 | 17 | 1 4 | 2A | 1 4 | 3E | 2 4 |
| 05 | 2 4 | 18 | 2 4 | 2B | 2 4 | 3F | 2 4 |
| 06 | 2 3 | 19 | 1 4 | 2C | 2 4 | 3G | 2 4 |
| 07 | 1 4 | 1A | 1 3 | 2D | 2 4 | 3H | 3 4 |
| 08 | 2 4 | 1B | 1 3 | 2E | 2 4 | 3I | 2 4 |
| 09 | 2 4 | 1C | 1 2 | 2F | 2 4 | 3J | 2 4 |
| 0A | 1 2 | 1D | 1 3 | 2G | 2 4 | 3K | 3 4 |

| | |
|---|---|
| 0B | 1 3 |
| 0C | 2 3 |
| 0D | 1 3 |
| 0E | 2 3 |
| 0F | 1 2 |
| 0G | 2 3 |
| 0H | 1 3 |
| 0I | 2 4 |
| 0J | 2 4 |
| 0K | 1 3 |
| 0L | 2 3 |
| 0M | 1 3 |
| 0N | 1 3 |
| 0O | 2 4 |
| 0P | 3 4 |
| 0Q | 1 2 |
| 0R | 1 2 |
| 0S | 2 4 |
| 0T | 1 2 |
| 0U | 1 3 |
| 0V | 1 3 |
| 0W | 1 3 |
| 0X | 1 2 |
| 0Y | 3 4 |
| 0Z | 2 4 |
| 12 | 2 4 |
| 13 | 3 4 |
| 4G | 2 4 |
| 4H | 1 4 |
| 4I | 2 4 |
| 4J | 2 4 |
| 4K | 1 4 |
| 4L | 2 4 |
| 4M | 1 4 |
| 4N | 1 4 |
| 4O | 1 4 |
| 4P | 2 4 |
| 4Q | 2 4 |
| 4R | 1 4 |
| 4S | 2 4 |
| 4T | 2 4 |
| 4U | 1 4 |
| 4V | 1 3 |
| 4W | 3 4 |
| 4X | 1 4 |
| 4Y | 3 4 |
| 4Z | 2 4 |
| 56 | 2 4 |
| 57 | 2 4 |
| 58 | 2 4 |
| 59 | 2 4 |
| 5A | 1 2 |
| 5B | 2 4 |
| 5C | 2 4 |
| 5D | 2 4 |
| 5E | 2 4 |
| 5F | 2 4 |
| 5G | 2 4 |
| 5H | 1 2 |
| 5I | 2 4 |
| 5J | 2 4 |
| 5K | 1 4 |
| 5L | 2 4 |
| 5M | 1 2 |
| 5N | 1 2 |
| 5O | 2 4 |
| 5P | 2 4 |
| 5Q | 2 4 |
| 5R | 1 2 |
| 5S | 2 4 |
| 5T | 2 4 |
| 5U | 2 3 |
| 5V | 2 3 |
| 5W | 2 3 |
| 5X | 1 2 |
| 5Y | 2 3 |
| 5Z | 2 4 |
| 67 | 2 4 |
| 68 | 2 4 |
| BZ | 2 4 |
| CD | 2 4 |
| CE | 2 4 |
| CF | 1 2 |
| CG | 1 2 |
| CH | 1 3 |
| CI | 2 4 |
| CJ | 2 4 |
| CK | 1 3 |
| CL | 2 3 |
| CM | 1 2 |
| CN | 1 2 |
| CO | 2 3 |
| CP | 1 2 |
| CQ | 1 2 |
| CR | 1 2 |
| CS | 2 4 |

| | |
|---|---|
| 1E | 2 3 |
| 1F | 1 2 |
| 1G | 2 3 |
| 1H | 1 3 |
| 1I | 2 4 |
| 1J | 2 4 |
| 1K | 1 3 |
| 1L | 2 3 |
| 1M | 1 3 |
| 1N | 1 3 |
| 1O | 1 3 |
| 1P | 1 2 |
| 1Q | 1 3 |
| 1R | 1 2 |
| 1S | 2 4 |
| 1T | 1 2 |
| 1U | 1 3 |
| 1V | 1 3 |
| 1W | 1 3 |
| 1X | 1 3 |
| 1Y | 1 3 |
| 1Z | 2 4 |
| 23 | 2 4 |
| 24 | 2 4 |
| 25 | 2 4 |
| 26 | 2 4 |
| 69 | 2 4 |
| 6A | 1 2 |
| 6B | 2 3 |
| 6C | 2 3 |
| 6D | 2 4 |
| 6E | 2 3 |
| 6F | 2 4 |
| 6G | 1 2 |
| 6H | 1 2 |
| 6I | 2 4 |
| 6J | 2 4 |
| 6K | 1 2 |
| 6L | 2 3 |
| 6M | 1 2 |
| 6N | 1 2 |
| 6O | 2 3 |
| 6P | 2 4 |
| 6Q | 2 4 |
| 6R | 1 2 |
| 6S | 2 4 |
| 6T | 2 4 |
| 6U | 2 3 |
| 6V | 2 3 |
| 6W | 2 3 |
| 6X | 1 2 |
| 6Y | 2 3 |
| 6Z | 2 4 |
| 78 | 1 4 |
| 79 | 1 4 |
| 7A | 1 4 |
| 7B | 2 4 |
| 7C | 2 4 |
| 7D | 2 4 |
| 7E | 2 4 |
| 7F | 2 4 |
| 7G | 2 4 |
| 7H | 3 4 |
| 7I | 2 4 |
| 7J | 2 4 |
| 7K | 1 4 |
| 7L | 2 4 |
| 7M | 1 4 |
| 7N | 3 4 |
| 7O | 1 4 |
| 7P | 2 4 |
| 7Q | 2 4 |
| 7R | 1 4 |
| 7S | 2 4 |
| 7T | 2 4 |
| 7U | 3 4 |
| 7V | 3 4 |
| 7W | 3 4 |
| EL | 2 3 |
| EM | 1 2 |
| EN | 1 2 |
| EO | 1 2 |
| EP | 1 2 |
| EQ | 1 2 |
| ER | 1 2 |
| ES | 2 4 |
| ET | 2 4 |
| EU | 2 3 |
| EV | 2 3 |
| EW | 2 3 |
| EX | 1 2 |
| EY | 2 3 |
| EZ | 2 4 |
| FG | 1 2 |
| FH | 2 3 |

| | |
|---|---|
| 2H | 3 4 |
| 2I | 2 4 |
| 2J | 2 4 |
| 2K | 3 4 |
| 2L | 2 4 |
| 2M | 1 4 |
| 2N | 3 4 |
| 2O | 2 4 |
| 2P | 2 4 |
| 2Q | 2 4 |
| 2R | 1 4 |
| 2S | 2 4 |
| 2T | 2 4 |
| 2U | 3 4 |
| 2V | 3 4 |
| 2W | 3 4 |
| 2X | 1 4 |
| 2Y | 3 4 |
| 2Z | 2 4 |
| 34 | 2 4 |
| 35 | 2 4 |
| 36 | 2 4 |
| 37 | 2 4 |
| 38 | 2 4 |
| 39 | 2 4 |
| 3A | 1 4 |
| 7X | 1 4 |
| 7Y | 3 4 |
| 7Z | 2 4 |
| 89 | 1 2 |
| 8A | 1 4 |
| 8B | 2 4 |
| 8C | 2 4 |
| 8D | 2 4 |
| 8E | 2 3 |
| 8F | 1 2 |
| 8G | 2 4 |
| 8H | 1 3 |
| 8I | 2 4 |
| 8J | 2 4 |
| 8K | 1 4 |
| 8L | 2 3 |
| 8M | 1 2 |
| 8N | 1 3 |
| 8O | 2 4 |
| 8P | 2 4 |
| 8Q | 1 4 |
| 8R | 1 4 |
| 8S | 2 4 |
| 8T | 2 4 |
| 8U | 3 4 |
| 8V | 3 4 |
| 8W | 1 3 |
| 8X | 1 3 |
| 8Y | 2 3 |
| 8Z | 2 4 |
| 9A | 1 4 |
| 9B | 2 4 |
| 9C | 2 4 |
| 9D | 1 4 |
| 9E | 2 4 |
| 9F | 2 4 |
| 9G | 2 4 |
| 9H | 1 4 |
| 9I | 2 4 |
| 9J | 2 4 |
| 9K | 1 4 |
| 9L | 2 4 |
| 9M | 1 4 |
| 9N | 1 4 |
| 9O | 1 4 |
| 9P | 2 4 |
| 9Q | 1 2 |
| 9R | 1 4 |
| 9S | 2 4 |
| 9T | 2 4 |
| 9U | 3 4 |
| 9V | 3 4 |
| GY | 1 3 |
| GZ | 2 4 |
| HI | 1 3 |
| HJ | 1 3 |
| HK | 1 2 |
| HL | 1 2 |
| HM | 1 3 |
| HN | 1 3 |
| HO | 1 3 |
| HP | 1 3 |
| HQ | 1 3 |
| HR | 2 3 |
| HS | 2 4 |
| HT | 1 2 |
| HU | 1 2 |
| HV | 1 2 |
| HW | 1 3 |

| | |
|---|---|
| 3L | 2 4 |
| 3M | 1 4 |
| 3N | 3 4 |
| 3O | 2 4 |
| 3P | 2 4 |
| 3Q | 2 4 |
| 3R | 1 4 |
| 3S | 2 4 |
| 3T | 2 4 |
| 3U | 3 4 |
| 3V | 3 4 |
| 3W | 3 4 |
| 3X | 1 4 |
| 3Y | 3 4 |
| 3Z | 2 4 |
| 45 | 2 4 |
| 46 | 2 4 |
| 47 | 2 4 |
| 48 | 2 4 |
| 49 | 2 4 |
| 4A | 1 4 |
| 4B | 1 3 |
| 4C | 2 3 |
| 4D | 1 3 |
| 4E | 2 4 |
| 4F | 2 4 |
| 9W | 3 4 |
| 9X | 1 4 |
| 9Y | 2 3 |
| 9Z | 2 4 |
| AB | 1 3 |
| AC | 1 2 |
| AD | 1 2 |
| AE | 1 2 |
| AF | 1 2 |
| AG | 1 2 |
| AH | 3 4 |
| AI | 1 2 |
| AJ | 1 4 |
| AK | 2 3 |
| AL | 1 2 |
| AM | 2 3 |
| AN | 2 3 |
| AO | 1 2 |
| AP | 1 2 |
| AQ | 1 2 |
| AR | 2 3 |
| AS | 1 2 |
| AT | 1 2 |
| AU | 1 3 |
| AV | 1 3 |
| AW | 2 3 |
| AX | 2 3 |
| AY | 1 3 |
| AZ | 1 2 |
| BC | 2 4 |
| BD | 2 4 |
| BE | 2 3 |
| BF | 2 3 |
| BG | 1 2 |
| BH | 1 3 |
| BI | 2 4 |
| BJ | 2 4 |
| BK | 1 3 |
| BL | 2 3 |
| BM | 1 3 |
| BN | 1 3 |
| BO | 1 2 |
| BP | 1 2 |
| BQ | 1 2 |
| BR | 1 2 |
| BS | 2 4 |
| BT | 2 4 |
| BU | 2 3 |
| BV | 2 3 |
| BW | 1 3 |
| BX | 1 3 |
| BY | 3 4 |
| JZ | 2 4 |
| KL | 2 3 |
| KM | 1 2 |
| KN | 2 3 |
| KO | 2 3 |
| KP | 2 3 |
| KQ | 2 3 |
| KR | 2 3 |
| KS | 1 3 |
| KT | 1 3 |
| KU | 1 2 |
| KV | 1 2 |
| KW | 2 3 |
| KX | 2 4 |
| KY | 1 2 |
| KZ | 1 4 |
| LM | 1 2 |

| | |
|---|---|
| CT | 1 2 |
| CU | 2 3 |
| CV | 2 3 |
| CW | 2 3 |
| CX | 1 3 |
| CY | 1 3 |
| CZ | 2 4 |
| DE | 1 2 |
| DF | 1 2 |
| DG | 1 2 |
| DH | 1 3 |
| DI | 2 4 |
| DJ | 2 4 |
| DK | 1 3 |
| DL | 2 3 |
| DM | 1 3 |
| DN | 1 3 |
| DO | 3 4 |
| DP | 1 2 |
| DQ | 1 2 |
| DR | 1 2 |
| DS | 2 4 |
| DT | 2 4 |
| DU | 3 4 |
| DV | 3 4 |
| DW | 1 3 |
| DX | 1 3 |
| DY | 1 3 |
| DZ | 2 4 |
| EF | 1 2 |
| EG | 1 2 |
| EH | 1 2 |
| EI | 2 4 |
| EJ | 2 4 |
| EK | 1 2 |
| NX | 2 4 |
| NY | 1 2 |
| NZ | 1 2 |
| OP | 1 2 |
| OQ | 1 2 |
| OR | 1 2 |
| OS | 2 4 |
| OT | 1 2 |
| OU | 2 3 |
| OV | 1 3 |
| OW | 1 3 |
| OX | 1 3 |
| OY | 1 3 |
| OZ | 2 4 |
| PQ | 1 2 |
| PR | 1 2 |
| PS | 2 4 |
| PT | 2 4 |
| PU | 1 3 |
| PV | 1 3 |
| PW | 1 3 |
| PX | 1 3 |
| PY | 3 4 |
| PZ | 2 4 |
| QR | 1 4 |
| QS | 2 4 |
| QT | 2 4 |
| QU | 3 4 |
| QV | 3 4 |
| QW | 1 3 |
| QX | 1 3 |
| QY | 3 4 |
| QZ | 2 4 |
| RS | 1 2 |
| RT | 1 2 |
| RU | 1 3 |
| RV | 1 3 |
| RW | 2 3 |
| RX | 3 4 |
| RY | 1 3 |
| RZ | 1 4 |
| ST | 2 4 |
| SU | 3 4 |
| SV | 3 4 |
| SW | 3 4 |
| SX | 3 4 |
| SY | 3 4 |
| SZ | 2 4 |
| TU | 2 3 |
| TV | 2 3 |
| TW | 2 3 |
| TX | 1 2 |

| | |
|---|---|
| FI | 1 2 |
| FJ | 2 4 |
| FK | 2 3 |
| FL | 2 3 |
| FM | 1 2 |
| FN | 1 2 |
| FO | 1 2 |
| FP | 1 2 |
| FQ | 1 2 |
| FR | 1 2 |
| FS | 2 4 |
| FT | 2 4 |
| FU | 2 3 |
| FV | 2 3 |
| FW | 2 3 |
| FX | 1 2 |
| FY | 1 2 |
| FZ | 2 4 |
| GH | 1 2 |
| GI | 2 4 |
| GJ | 2 4 |
| GK | 1 3 |
| GL | 1 2 |
| GM | 1 2 |
| GN | 1 2 |
| GO | 1 2 |
| GP | 1 2 |
| GQ | 2 4 |
| GR | 1 2 |
| GS | 2 4 |
| GT | 2 4 |
| GU | 2 3 |
| GV | 2 3 |
| GW | 2 3 |
| GX | 1 3 |
| TY | 3 4 |
| TZ | 1 2 |
| UV | 1 3 |
| UW | 1 3 |
| UX | 1 2 |
| UY | 1 2 |
| UZ | 2 3 |
| VW | 1 3 |
| VX | 1 2 |
| VY | 2 4 |
| VZ | 2 3 |
| WX | 2 3 |
| WY | 1 3 |
| WZ | 3 4 |
| XY | 1 2 |
| XZ | 1 2 |
| YZ | 2 3 |

| | |
|---|---|
| HX | 2 4 |
| HY | 1 2 |
| HZ | 1 2 |
| IJ | 2 4 |
| IK | 1 3 |
| IL | 2 3 |
| IM | 1 3 |
| IN | 1 3 |
| IO | 2 4 |
| IP | 1 2 |
| IQ | 1 2 |
| IR | 1 2 |
| IS | 2 4 |
| IT | 1 2 |
| IU | 2 3 |
| IV | 2 3 |
| IW | 2 3 |
| TX | 1 3 |
| IY | 1 3 |
| IZ | 2 4 |
| JK | 1 3 |
| JL | 2 4 |
| JM | 1 4 |
| JN | 1 3 |
| JO | 2 4 |
| JP | 1 4 |
| JQ | 1 4 |
| JR | 1 2 |
| JS | 2 4 |
| JT | 2 4 |
| JU | 3 4 |
| JV | 3 4 |
| JW | 3 4 |
| JX | 1 3 |
| JY | 1 3 |

| | |
|---|---|
| LN | 1 2 |
| LO | 2 3 |
| LP | 2 3 |
| LQ | 2 3 |
| LR | 2 3 |
| LS | 2 4 |
| LT | 2 4 |
| LU | 2 3 |
| LV | 2 3 |
| LW | 2 3 |
| LX | 2 3 |
| LY | 2 3 |
| LZ | 3 4 |
| MN | 1 3 |
| MO | 1 3 |
| MP | 1 2 |
| MQ | 1 3 |
| MR | 2 3 |
| MS | 1 2 |
| MT | 1 2 |
| MU | 1 3 |
| MV | 1 3 |
| MW | 1 3 |
| MX | 1 4 |
| MY | 1 3 |
| MZ | 1 4 |
| NO | 1 3 |
| NP | 1 2 |
| NQ | 2 3 |
| NR | 2 3 |
| NS | 2 4 |
| NT | 3 4 |
| NU | 1 4 |
| NV | 1 4 |
| NW | 1 3 |

The procedures used for recognizing intermixed alpha and numeric handprinted and machine printed characters closely parallel those employed for the numeric characters, and for this reason the following description will concentrate on the specific differences.

The process begins with the unknown character represented in its binary raster form (Maxrow by Maxcolumn). The program performs the same steps 3.1 through 3.18 with the exception that the procedure for elimination of redundant measurements is slightly altered. Specifically, the reduction procedure operates as in the pure numeric case except that the top and bottom shape measurements on the right side are not removed. Assuming that a character has A convexities on the left and B convexities on the right, the reduction procedure removes the (A−1) elements from the left and the (B−1) elements from the right just as before, thus producing 5(A + B) − (A − 1) − (B − 1) = 4(A + B) + 2 shape measurements from the left and right contours. These measurements along with the eight special measurements are saved in an array designated as VECTOR. This procedure accomplishes the function of extracting shape information regarding the left and right views. The next operation accomplishes the same function regarding the top and bottom views.

Next, the height normalized character is rotated counter-clockwise by 90° so that the left view now corresponds to the top view and the right view now corresponds to the bottom view. The resultant character is not height normalized at this point; such a normalization of the rotated character would correspond to a width normalization of the original character. It has been determined experimentally that the normal variation in width of a character is quite small and little advantage can be derived from standardizing the width of all characters. The omission of width normalization results in a considerable time savings since normalization is a relatively lengthy procedure. In lieu of normalizing the rotated character, the beginning and ending rows of the rotated character are found the same way that they were found prior to the initial height normalization procedure. All breaks located between the start row and the end row are corrected in the same manner as previously described. At this point the functions corresponding to steps 3.4 through 3.18 are performed, with two exceptions, utilizing the start row and end row in lieu of rows 1 and Maxrow. The first exception applies to the smoothing of the difference strings corresponding to step 3.8. The previous rule was that in case two adjacent elements of AI (i.e., the difference string) have different signs, then the element with the larger magnitude is replaced by the sum of the two elements and the smaller is set to zero. This algorithm is modified by imposing the additional condition that the smoothing take place if and only if the magnitudes of both elements do not exceed two units. That is, if AI(I)*AI(I+1)<0 and | AI(I) | >2 and | AI(I+1) |>2 no smoothing is performed; AI(I) and AI(I+1) are unchanged. IF |AI(I)| and |AI(I+I)| are not both greater than two units, the smoothing is performed as before. The reason behind this modification is that sharp changes in the difference string along the top or bottom of alpha characters are considered highly significant especially since the character is not spread out as would be the case if width normalization were applied. Characters such as W, N and M when viewed from the bottom are examples where sharp variations in the difference string are considered significant.

The second exception to the operations executed during steps 3.4 through 3.18 relates to the last step during which redundant measurements are eliminated. The modification is precisely as described before for the left and right contours. Assuming that a rotated character had C convexities on the left (actually on the top of the original character) and D convexities on the right (actually on the bottom of the original character), then the convexity decomposition procedure would produce 4(C + D) + 2 shape measurements in addition to eight special measurements. These measurements can be stored along with the previous measurements in the VECTOR array in the following order:

4(A+1) shape measurements from left
4(B+1) shape measurements from right
4(C+1) shape measurements from top
4(D+1) shape measurements from bottom
8 special measurements from left and right
8 special measurements from top and bottom
Sort group information (A,B,C,D)

The sort group information is stored with the feature vector in the last position of the VECTOR array where:

A = number of convexitires on the left
B = number of convexities on the right
C = number of convexities on the top
D = number of convexities on the bottom.

Figure 16:
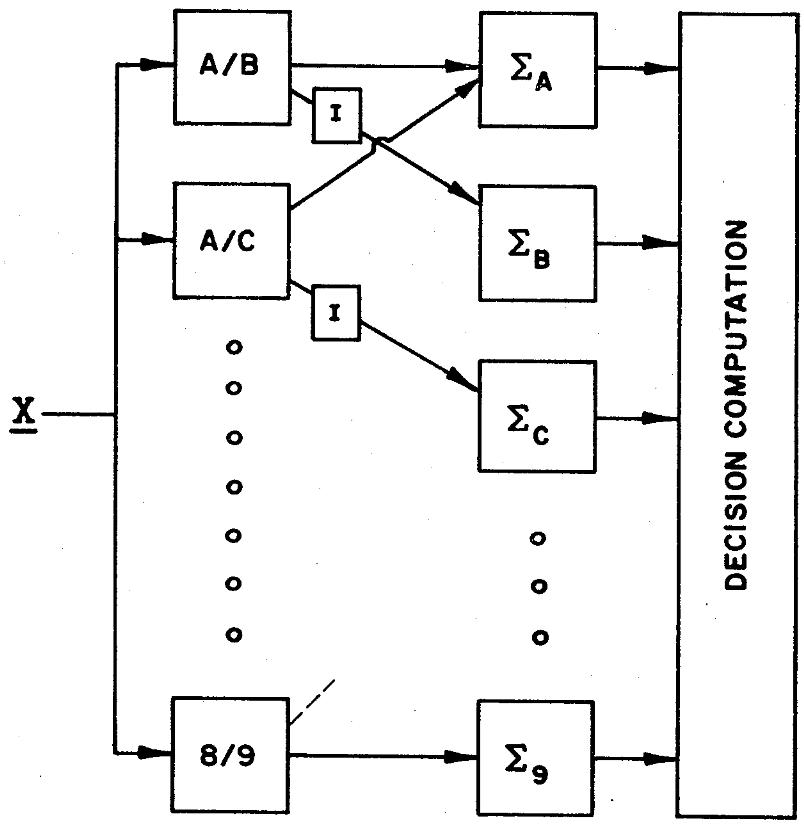
FIG. 16 is a functional block diagram of the classification logic for an alpha-numeric reader in accordance with the principles of the invention.

At this point, with the feature vector formed, the program control is transferred to the classification algorithms. The underlying principles of the classification algorithms remain the same. However, the structural form of the classification logic can be quite different as shown in FIG. 16. In FIG. 16, the feature vector X is input into the "boxes" labeled I/J. The feature vector X symbolically represents the data contained in the VECTOR array. The operation performed in each I/J box is to compute a vote for class I, or a vote for class J, or a vote for neither. The votes for each class are summed in the $\Sigma_I$ boxes and used to compute either a positive class decision or a rejection. As before, a rejection decision can be issued if no class receives the maximum number of votes (K −1). (For the case of intermixed alpha and numeric characters, K = 36.)

As described above, only two contours are required to discriminate any pair of characters. The two contours corresponding to each pair of alpha-numeric characters (630 pairs) are listed in Table 15. This table may be stored in the computer and used to extract the appropirate measurements from the VECTOR array to be utilized in the computation of the pairwise decisions. Consider the 8/Y box (not shown) of FIG. 16. The program would look up the contours used to discriminate 8 from Y. From Table 15 it is seen that the top and right contours are specified. The program would then extract 4(B+C) + 2 measurements from the VECTOR array. In addition, the 16 special measurements are always used with the contour information. Thus, a 4(B+C) + 18 dimensional vector would be input into the 8/Y box. Along with this vector, the 8/Y box would also get the sort group information, namely, (B,C).

Each I/J box represents nine separate linear discriminant tests corresponding to the nine possible sort groups derivable from the two contours used to discriminate I from J. The linear discriminant tests are of the same type described earlier with respect to the numeric reader and can be designed in precisely the same manner using the Fisher methodology. In the example of the 8 vs Y decision, the sort group (B,C) is used to retrieve the linear discriminant which discriminates between 8 and Y. The dimensionality of this discriminant vector is exactly 4(B+C)+18 and is used to compute the inner product with the feature vector. The resultant scalar is thresholded using the four thresholds associated with the discriminant vector as explained above. The result is a vote for 8, or a vote for Y, or a "no" vote for both.

Following the procedure outlined above the computer program could compute all 630 pairwise decisions involving the 36 alpha and numeric characters. In practice, all tests need not be conducted since a class decision can be made as soon as a specific class has received $K - 1 = 35$ votes, or a rejection issued when every class has received at least one "no" vote. To achieve this time savings, two tables may be kept during the classification procedure. The first is a $36 \times 2$ table, designated VOTE TABLE and is used to keep the total votes to date, both for and against a class. The second table is a 630 element binary table designated COMPLETE TABLE, indicating the pairwise tests completed to date. The test sequencing algorithm may function as follows: All 35 pairwise tests involving the first character class A are performed and the Vote and Complete Tables updated. A "no vote" condition is reflec ted by indicating a vote against both classes concerned. Upon completing these 35 tests the program checks to see if any class has $K - 1 = 35$ votes (at this time only class A could have 35 votes) or if all classes have at least one vote against them. Providing neither of these conditions exist, the program continues the testing by examining the VOTE TABLE and selecting the class that possesses the most votes for it and no votes against it. Ties are broken arbitrarily by selecting one of the tied classes. All pairwise tests involving the selected class which have not yet been completed (as indicated by the Complete Table) are then computed. Both tables are updated and the program again checks for the exit conditions, namely, a class possessing $K - 1 = 35$ votes or all classes having at least one vote against them. This procedure continues until a positive class decision is accomplished or until a rejection is issued. The first class selected to initiate this procedure is chosen arbitrarily as A since it is assumed that all classes are equally likely. If certain classes are more likely than others, the above procedure can be modified so that the most probable class is first selected and further a tie resolved by selecting the most likely class involved in the tie. In practice, the procedure almost always converges to selection of the true class within three or four iterations.

It should be noted that the alpha-numeric test sequencing procedure is less complex than that used for the numeric reader for which the minimal path method was described. The minimal path method selected the optimal pairwise test to be conducted at each point of the testing sequence whereas in the case under consideration once a class is selected all pairwise tests involving that class are conducted, provided they have not previously been computed. The reason that this simpler, non-optimal, procedure is used is related to the way the logic is stored within the reader system. The logic requires storing nine discriminant vectors for each of the 630 pairwise decisions. Unless a great amount of main frame storage is available, the logic must be stored on a peripheral storage media. Assuming that the logic is stored on a peripheral device it then becomes desirable to minimize the number of accesses to retrieve logic in order that the total computation time be minimized. The minimal path method would require access to the storage device for each pairwise discriminant, thereby causing the computation time to become excessive. In lieu of this, the procedure utilized for the alpha-numeric example retrieves all of the logic tests associated with a selected class whenever an access to the storage device is required. This procedure minimizes the number of accesses and thereby reduces the total processing time.

Although the invention has been described with reference to particular embodiments, it is to be understood that these embodiments are merely illustrative of the application of the principles of the invention. For example, instead of predicating a character class decision on a class having received a yes vote during each test in which it was one of the test pair, it is possible to base a decision on a class having received a predetermined number of yes votes (less than the maximum possible) or even on a class having received more yes votes than any other class (with a rejection being issued in case of a tie). It may be possible in some cases to perform pairwise testing in groups, for example, to discriminate between the characters B and 8 on one hand, and the characters U and V on the other, following which the two remaining characters are involved in a pairwise test. It is also possible to set some non-zero weights in the various Fisher-determined discriminants to zero for the purpose of avoiding time-consuming multiplications (see, e.g., FIG. 12), if it is found that the products of these weights by their respective feature vector elements contribute little to the final discriminant value. Similarly, piecewise linear discriminants can be employed in the testing routines instead of Fisher linear discriminants. Thus it is to be understood that numerous modifications may be made in the illustrative embodiments of the invention and other arrangements may be devised without departing from the spirit and scope of the invention.

What is claimed is:

1. A method to be practiced on a machine for identifying a character on a document as being one of a predetermined set comprising the steps of:

1. using apparatus to scan said document in the area of the charac-ter to generate electrical signals corresponding to the image of the character on the document,
2. using apparatus responsive to the electrical signals generated in step (1) to generate a sequence of signals composed of two different signal types, said sequence corresponding to a binary raster representation of said character,
3. using apparatus to convert said binary raster representation to a set of numbers representative of respective features of said binary raster representation,
4. using apparatus to perform a plurality of tests on said set of numbers, each of said tests serving to discriminate between a respective pair of characters in said predetermined set for determining if one of the characters of the pair is more likely to be the character to be identified than the other character of the pair, and
5. using apparatus to identify the character in accordance with the results of the pairwise tests performed in step (4).

2. A method in accordance with claim 1 wherein in step (5) the character is identified as a particular character only if during the performance of pairwise tests in step (4) the particular character was determined to be the more likely identity of the character to be identified in a predetermined number of the tests in each of which the particular character was one of the two in the test pair.

3. A method in accordance with claim 2 wherein said predetermined number is equal to the number of the tests in each of which the particular character was one of two in the test pair.

4. A method in accordance with claim 3 wherein the features of said binary number representation which are represented by said set of numbers include the numbers, shapes and locations of alternating bumps of opposite convexities as seen looking from at least two different directions.

5. A method in accordance with claim 1 wherein in step (2) the represented character is operated upon to stretch it in at least one direction such that the length in said one direction of the binary raster representation is of predetermined length.

6. A method in accordance with claim 5 wherein in step (2) the binary raster representation is operated upon to correct breaks in said one direction.

7. A method in accordance with claim 1 wherein the features of said binary raster representation which are represented by said set of numbers include the numbers, shapes and locations of alternating bumps of opposite convexities as seen looking from outside said binary raster representation.

8. A method in accordance with claim 7 wherein the pairwise tests are included in a plurality of groups, the groups being associated with respective numbers of alternating bumps of opposite convexities and the pairwise tests included in the respective groups being those for discriminating between characters whose features correspond to the respective numbers of alternating bumps of opposite convexities, and in step (4) the only pairwise tests which are performed are those in the group for discriminating between characters whose features correspond to the same number of alternating bumps of opposite convexities as the number corresponding to the features determined in step (3).

9. A method in accordance with claim 8 wherein each of said groups of tests includes a test for discriminating between each possible pair of characters in said predetermined set whose features correspond to the number of alternating bumps of opposite convexities associated with the group.

10. A method in accordance with claim 9 wherein in step (5) the character is identified as a particular character only if during the performance of pairwise tests in step (4) the particular character was determined to be the more likely identity of the character to be identified in a predetermined number of the tests in each of which the particular character was one of the two in the test pair, and the pairwise tests are performed in step (4) in an order determined by the probabilities of occurrence of the characters to be discriminated to reduce the average number of pairwise tests which otherwise would be performed to identify a character.

11. A method in accordance with claim 7 wherein the features of said binary raster representation which are represented by said set of numbers further include a number which is dependent upon the difference between (a) the sum of numbers proportional to lengths on the two side regions of the binary raster representation which correspond to the absence of parts of the scanned character above a horizontal row positioned in the lower half of the binary raster representation, and (b) a number proportional to a length in the central region of the binary raster representation which corresponds to the absence of a part of the scanned character above said horizontal row.

12. A method in accordance with claim 7 wherein the features of said binary raster representation which are represented by said set of numbers further include a number which is dependent upon a length in the binary raster representation which corresponds to the absence of a part of the scanned character above a horizontal row positioned in the lower half of the binary raster representation, which length is measured in the vertical direction immediately to the left of the leftmost portion of said horizontal row which corresponds to a part of the scanned character.

13. A method in accordance with claim 7 wherein the features of said binary raster representation which are represented by said set of numbers further include a number which is dependent upon the difference between (a) a number proportional to a length in the central region of the binary raster representation which corresponds to the absence of a part of the scanned character at the top of the binary raster representation, and (b) the sum of numbers proportional to lengths on the two sides of the binary raster representation which correspond to the absence of parts of the scanned character at the top of the binary raster representation.

14. A method in accordance with claim 7 wherein the features of said binary raster representation which are represented by said set of numbers further include a number which is dependent upon the average horizontal width between the leftmost and rightmost portions of the binary raster representation which represents parts of the scanned character taken along horizontal rows of the binary raster representation in the bottom portion thereof.

15. A method in accordance with claim 7 wherein the features of said binary raster representation which are represented by said set of numbers further include a number which is dependent upon the average horizontal width between the leftmost and rightmost portions of the binary raster representation which represents parts of the scanned character taken along horizontal rows of the binary raster representation in the central region thereof, which central region includes less than half of the total number of rows of the binary raster representation.

16. A method in accordance with claim 7 wherein the features of said binary raster representation which are represented by said set of numbers further include a number which is dependent upon the average horizontal width between the leftmost and rightmost portions of the binary raster representation which represents parts of the scanned character taken along horizontal rows of the binary raster representation in the central region thereof, which central region includes more than half of the total number of rows of the binary raster representation.

17. A method in accordance with claim 7 wherein the features of said binary raster representation which are represented by said set of numbers further include a number which is dependent upon the total number of continuous line segments represented by said binary raster representation along a group of rows thereof, said group consisting of rows in the central region of the upper half of the binary raster representation.

18. A method in accordance with claim 7 wherein the features of said binary raster representation which are represented by said set of numbers further include a number which is dependent upon the total number of continuous line segments represented by said binary raster representation along a group of rows thereof, said group consisting of rows in the central region of the lower half of the binary raster representation.

19. A method in accordance with claim 7 wherein step (3) includes the sub-steps of:

(3a) computing at least two differently directed histograms for said binary raster representation, (3b) computing a pair of difference strings for said binary raster representation by subtracting each element in each of said differently directed histograms from an adjacent element, (3c) changing the values of pairs of successive elements in each of said difference strings to minimize the effects of noise in said binary raster representation, thereby producing edited differently directed difference strings, (3d) deriving a list of magnitude and direction codes for a sequence of straight-line segments for each of the edited differently directed difference strings in accordance with the element values thereof, the direction of each straight-line segment being one of a predetermined relatively small number, (3e) inserting magnitude and direction codes for additional straight-line segments in each of said lists in accordance with the magnitudes and direction codes for the straight-line segments derived in step (3d) to derive a composite list of straight-line segments whose direction codes change in a predetermined order which causes the successive straight-line segments in each list to represent bumps of alternating opposite convexities, and (3f) combining said lists to derive said set of numbers representative of the features of said binary raster representation.

20. A method in accordance with claim 19 wherein step (3) further includes the sub-step of:

(3g) computing each of a group of special feature numbers from said binary raster representation in accordance with a respective formula, said group of special feature numbers being combined with said lists in sub-step (3f) to derive said set of numbers representative of the features of said binary raster representation.

21. A method in accordance with claim 7 wherein step (3) includes the sub-steps of:

(3a) computing at least two differently directed histograms for said binary raster representation, (3b) computing a pair of lists of straight-line segments from respective ones of said differently directed histograms, the straight-line segments in said lists representing bumps of alternating opposite convexities conforming to the contour of said binary raster representation, (3c) computing each of a group of special feature numbers from said binary raster representation in accordance with a respective formula, and (3d) combining the lists computed in step (3b) and the special feature numbers computed in step (3c) to derive said set of numbers representative of the features of said binary raster representation.

22. A method in accordance with claim 21 wherein the pairwise tests are included in a plurality of groups, the groups being associated with respective numbers of alternating bumps of opposite convexities and the pairwise tests included in the respective groups being those for discriminating between characters whose features correspond to the respective number of alternating bumps of opposite convexities, and in step (4) the only pairwise tests which are performed are those in the group for discriminating between characters whose features correspond to the same number of alternating bumps of opposite convexities as the number corresponding to the features determined in step (3).

23. A method in accordance with claim 22 wherein each of said groups of tests includes a test for discriminating between each possible pair of characters in said predetermined set whose features correspond to the number of alternating bumps of opposite convexities associated with the group.

24. A method in accordance with claim 23 wherein in step (5) the character is identified as a particular character only if during the performance of pairwise tests in step (4) the particular character was determined to be the more likely identity of the character to be identified in a predetermined number of the tests in each of which the particular character was one of the two in the test pair, and the pairwise tests are performed in step (4) in an order determined by the probabilities of occurrence of the characters to be discriminated to reduce the average number of pairwise tests which otherwise would be performed to identify a character.

25. A method in accordance with claim 24 wherein each of the pairwise tests performed in step (4) is the computation of an optimal linear discriminant designed to distinguish between the two characters of the respective pair.

26. A method in accordance with claim 25 wherein in step (5) the character is identified as a particular character only if during the performance of pairwise tests in step (4) the particular character was determined to be the more likely identity of the character to be identified in a predetermined number of the tests in each of which the particular character was one of the two in the test pair.

27. A method in accordance with claim 26 wherein the pairwise tests are included in a plurality of groups, the groups being associated with respective numbers of alternating bumps of opposite convexities and the pairwise tests included in the respective groups being those for discriminating between characters whose features correspond to the respective numbers of alternating bumps of opposite convexities, and in step (4) the only pairwise tests which are performed are those in the group for discriminating between characters whose features correspond to the same number of alternating bumps of opposite convexities as the number corresponding to the features determined in step (3).

28. A method in accordance with claim 8 wherein for a group of pairwise tests the tests are performed in a sequence such that $T_{IJ}$ precedes $T_{RQ}$ if and only if $P_I > P_R$ for $I \neq R$ and $P_J > P_Q$ for $I = R$, where $T_{ij}$ represents a test for discriminating between characters i and j, and $P_K$ represents the probability of character K being identified from among all of the characters which are scanned and are discriminated by the pairwise tests in said group.

29. A method in accordance with claim 28 wherein in step (5) the character is identified as a particular character only if during the performance of pairwise tests in step (4) the particular character was determined to be the more likely identity of the character to be identified in a predetermined number of the tests in each of which the particular character was one of the two in the test pair.

30. A method in accordance with claim 29 wherein said predetermined number is equal to the number of the tests in each of which the particular character was one of two in the test pair.

31. A method in accordance with claim 28 wherein the data for each pairwise test includes a plurality of weights to be used in computing a respective optimal linear discriminant, threshold values for enabling a character decision to be made after the optimal linear discriminant is computed, and pointer values for indicating the data to be used for the next pairwise test in accordance with the character decision made at the end of the current test.

32. A method in accordance with claim 8 wherein the data for each pairwise test includes a plurality of weights to be used in computing a respective optimal linear discriminant, threshold values for enabling a character decision to be made after the optimal linear discriminant is computed, and pointer values for indicating the data to be used for the next pairwise test in accordance with the character decision made at the end of the current test.

33. A method in accordance with claim 7 wherein during the performance of each of the pairwise tests of step (4) the set of numbers representative of respective features of the binary raster representation which are used represent the contour of the binary raster representation as seen in directions from outside the binary raster representation, the particular directions being dependent upon the pair of characters to be discriminated by the pairwise test to be performed.

34. A method in accordance with claim 2 wherein the pairwise tests are included in a plurality of groups, each group being associated with a respective group of characters which are known to have some features in common, the pairwise tests included in each group being those for discriminating between the characters having said common features, and in step (4) the pairwise tests in only one group are performed, said one group being that whose characters have the common features represented by the set of numbers derived in step (3).

35. A method in accordance with claim 34 wherein each of said groups of tests includes a test for discriminating between all possible pairs of characters associated with the group.

36. A method in accordance with claim 35 wherein in step (5) the character is identified as a particular character only if during the performance of pairwise tests in step (4) the particular character was determined to be the more likely identity of the character to be identified in a predetermined number of the tests in each of which the particular character was one of the two in the test pair.

37. A method in accordance with claim 36 wherein said predetermined number is equal to the number of the tests in each of which the particular character was one of two in the test pair.

38. A method in accordance with claim 34 wherein in step (5) the character is identified as a particular character only if during the performance of pairwise tests in step (4) the particular character was determined to be the more likely identity of the character to be identified in a predetermined number of the tests in each of which the particular character was one of the two in the test pair, and the pairwise tests are performed in step (4) in an order determined by the probabilities of occurrence of the characters to be discriminated to reduce the average number of pairwise tests which otherwise would be performed to identify a character.

39. A method in accordance with claim 34 wherein for a group of pairwise tests the tests are performed in a sequence such that $T_{IJ}$ precedes $T_{RQ}$ if and only if $P_I > P_R$ for $I \neq R$ and $P_J > P_Q$ for $I = R$, where $T_{ij}$ represents a test for discriminating between characters i and j, and $P_K$ represents the probability of character K being identified from among all of the characters which are scanned and are discriminated by the pairwise tests in said group.

40. A method in accordance with claim 39 wherein the data for each pairwise test includes a plurality of weights to be used in computing a respective optimal linear discriminant, threshold values for enabling a character decision to be made after the optimal linear discriminant is computed, and pointer values for indicating the data to be used for the next pairwise test in accordance with the character decision made at the end of the current test.

41. A method to be practiced on a machine for identifying a character on a document as being one of a predetermined set comprising the steps of:

1. using apparatus to scan said document in the area of the character to generate electrical signals corresponding to the image of the character on the document,
2. using apparatus responsive to the electrical signals generated in step (1) to generate a sequence of signals composed of two different signal types, said sequence corresponding to a binary raster representation of said character,
3. using apparatus to convert said binary raster representation to a set of numbers representative of features which include the numbers, shapes and locations of alternating bumps of opposite convexities as seen looking from outside said binary raster representation, and
4. using apparatus to perform tests on said set of numbers to determine the identity of the scanned character.

42. A method in accordance with claim 41 wherein said set of numbers represents the numbers and shapes of alternating bumps of opposite convexities as seen looking from at least two different directions outside said binary raster representation.

43. A method in accordance with claim 41 wherein the features of said binary raster representation which are represented by said set of numbers further include a number which is dependent upon the difference between (a) the sum of numbers proportional to lengths on the two side regions of the binary raster representation which correspond to the absence of parts of the scanned character above a horizontal row positioned in the lower half of the binary raster representation, and (b) a number proportional to a length in the central region of the binary raster representation which corresponds to the absence of a part of the scanned character above said horizontal line.

44. A method in accordance with claim 41 wherein the features of said binary raster representation which are represented by said set of numbers further include a number which is dependent upon a length in the binary raster representation which corresponds to the absence of a part of the scanned character above a horizontal row positioned in the lower half of the binary raster representation, which length is measured in the vertical direction immediately to the left of the leftmost portion of said horizontal row which corresponds to a part of the scanned character.

45. A method in accordance with claim 41 wherein the features of said binary raster representation which are represented by said set of numbers further include a number which is dependent upon the difference between (a) a number proportional to a length in the central region of the binary raster representation which corresponds to the absence of a part of the scanned character at the top of the binary raster representation, and (b) the sum of numbers proportional to lengths on the two sides of the binary raster representation which corresponds to the absence of parts of the scanned character at the top of the binary raster representation.

46. A method in accordance with claim 41 wherein the features of said binary raster representation which are represented by said set of numbers further include a number which is dependent upon the average horizontal width between the leftmost and rightmost portions of the binary raster representation which represents parts of the scanned character taken along horizontal rows of the binary raster representation in the bottom portion thereof.

47. A method in accordance with claim 41 wherein the features of said binary raster representation which are represented by said set of numbers further include a number which is dependent upon the average horizontal width between the leftmost and rightmost portions of the binary raster representation which represents parts of the scanned character taken along horizontal rows of the binary raster representation in the central region thereof, which central region includes less than half of the total number of rows of the binary raster representation.

48. A method in accordance with claim 41 wherein the features of said binary raster representation which are represented by said set of numbers further include a number which is dependent upon the average horizontal width between the leftmost and rightmost portions of the binary raster representation which represents parts of the scanned character taken along horizontal rows of the binary raster representation in the central region thereof, which central region includes more than half of the total number of rows of the binary raster representation.

49. A method in accordance with claim 41 wherein the features of said binary raster representation which are represented by said set of numbers further include a number which is dependent upon the total number of continuous line segments represented by said binary raster representation along a group of rows thereof, said group consisting of rows in the central region of the upper half of the binary raster representation.

50. A method in accordance with claim 41 wherein the features of said binary raster representation which are represented by said set of numbers further include a number which is dependent upon the total number of continuous line segments represented by said binary raster representation along a group of rows thereof, said group consisting of rows in the central region of the lower half of the binary raster representation.

51. A method in accordance with claim 41 wherein step (3) includes the sub-steps of:

(3a) computing at least two differently directed histograms for said binary raster representation, (3b) computing a pair of difference strings for said binary raster representation by subtracting each element in each of said differently directed histograms from an adjacent element, (3c) changing the values of pairs of successive elements in each of said difference strings to minimize the effects of noise in said binary raster representation, thereby producing edited differently directed difference strings, (3d) deriving a list of pairwise and direction codes for a sequence of straight-line segments for each of the edited differently directed difference strings in accordance with the element values thereof, the direction of each straight-line segment being one of a predetermined relatively small number, (3e) inserting magnitude and direction codes for additional straight-line segments in each of said lists in accordance with the magnitudes and direction codes for the straight-line segments derived in step (3d) to derive a composite list of straight-line segments whose direction codes change in a predetermined order which causes the successive straight-line segments in each list to represent bumps of alternating opposite convexities, and (3f) combining said lists to derive said set of numbers representative of the features of said binary raster representation.

52. A method in accordance with claim 51 wherein step (3) further includes the sub-step of:

(3g) computing each of a group of special feature numbers from said binary raster representation in accordance with a respective formula, said group of special feature numbers being combined with said lists in sub-step (3f) to derive said set of numbers representative of the features of said binary raster representation.

53. A method in accordance with claim 41 wherein step (3) includes the sub-steps of:

(3a) computing at least two differently directed histograms for said binary raster representation, (3b) computing a pair of lists of straight-line segments from respective ones of said differently directed histograms, the straight-line segments in said lists representing bumps of alternating opposite convexities conforming to the contour of said binary raster representation, (3c) computing each of a group of special feature numbers from said binary raster representation in accordance with a respective formula, and (3d) combining the lists computed in step (3b) and the special feature numbers computed in step (3c) to derive said set of numbers representative of the features of said binary raster representation.

54. A method to be practiced on a machine for recognizing a previously scanned character which is represented as a digitized character as being one of a predetermined set of characters comprising the steps of:

1. using apparatus to construct a vector whose elements represent features of said digitized character,
2. using apparatus to perform a plurality of tests on said vector, each of said tests serving to discriminate between a respective pair of characters in said predetermined set relative to said digitized character, and
3. using apparatus to recognize the digitized character based upon the results of the pairwise character tests performed in step (2).

55. A method in accordance with claim 54 wherein in step (3) the character is recognized as being a particular character in said set only if during the performance of pairwise tests in step (2) the particular character passed a predetermined number of the tests in which it was one of the two in the test pair.

56. A method in accordance with claim 55 wherein said predetermined number is equal to the number of the tests in each of which the particular character was one of two in the test pair.

57. A method in accordance with claim 56 wherein the features of said digitized character which are represented by said vector include contour data for said digitized character as seen looking in at least two different directions from outside the digitized character.

58. A method in accordance with claim 54 wherein prior to step (1) the digitized character is operated upon to stretch it in at least one direction such that the stretched digitized character has a predetermined length in said at least one direction.

59. A method in accordance with claim 58 wherein prior to step (1) the digitized character is operated upon to correct breaks in said one direction.

60. A method in accordance with claim 54 wherein the features of said digitized character which are represented by said vector include contour data for said digitized character as seen looking from outside said digitized character.

61. A method in accordance with claim 60 wherein the pairwise tests are included in a plurality of groups, the groups being associated with respective contour data sets and the pairwise tests included in the respective groups being those for discriminating between characters whose contour data features correspond to respective contour data sets, and in step (2) the only pairwise tests which are performed are those in the group for discriminating between characters whose contour data features correspond to the contour data set which is applicable to the contour data features represented by said vector.

62. A method in accordance with claim 61 wherein each of said groups of tests includes a test for discriminating between each possible pair of characters in said predetermined set whose contour data features correspond to the contour data set which is associated with the group.

63. A method in accordance with claim 62 wherein in step (3) the digitized character is recognized as being a particular character in said set only if during the performance of pairwise tests in step (2) the particular character passed a predetermined number of the tests in which it was one of the two in the test pair, and the pairwise tests are performed in step (2) in an order determined by the probabilities of occurrence of the characters to be discriminated to reduce the average number of pairwise tests which otherwise would be performed to recognize a character.

64. A method in accordance with claim 60 wherein the features of said digitized character which are represented by said vector further include a number which is dependent upon the difference between (a) the sum of numbers proportional to lengths on the two side regions of the digitized character which correspond to the absence of parts of the digitized character above a horizontal row positioned in the lower half of the digitized character, and (b) a number proportional to a length in the central region of the digitized character which corresponds to the absence of a part of the digitized character above said horizontal row.

65. A method in accordance with claim 60 wherein the features of said digitized character which are represented by said vector further include a number which is dependent upon a length in the digitized character which corresponds to the absence of a part of the digitized character above a horizontal row positioned in the lower half of the digitized character, which length is measured in the vertical direction immediately to the left of the leftmost portion of said horizontal row which corresponds to a part of the digitized character.

66. A method in accordance with claim 60 wherein the features of said digitized character which are represented by said vector further include a number which is dependent upon the difference between (a) a number proportional to a length in the central region of the digitized character which corresponds to the absence of a part of the digitized character at the top thereof, and (b) the sum of numbers proportional to lengths on the two sides of the digitized character which correspond to the absence of parts of the digitized character at the top thereof.

67. A method in accordance with claim 60 wherein the features of said digitized character which are represented by said vector further include a number which is dependent upon the average horizontal width between the leftmost and rightmost portions of the digitized character which represents part of the digitized character taken along horizontal rows of the digitized character in the bottom portion thereof.

68. A method in accordance with claim 60 wherein the features of said digitized character which are represented by said vector further include a number which is dependent upon the average horizontal width between the leftmost and rightmost portions of the digitized character which represents parts of the digitized character taken along horizontal rows of the digitized character in the central region thereof, which central region includes less than half of the total number of rows of the digitized character.

69. A method in accordandance with claim 60 wherein the features of said digitized character which are represented by said vector further include a number which is dependent upon the average horizontal width between the leftmost and rightmost portions of the digitized character which represents parts of the digitized character taken along horizontal rows of the digitized character in the central region thereof, which central region includes more than half of the total number of rows of the digitized character.

70. A method in accordance with claim 60 wherein the features of said digitized character which are represented by said vector further include a number which is dependent upon the total number of continuous line segments represented by said digitized character along a group of rows thereof, said group consisting of rows in the central region of the upper half of the digitized character.

71. A method in accordance with claim 60 wherein the features of said digitized character which are represented by said vector further include a number which is dependent upon the total number of continuous line segments represented by said digitized character along a group of rows thereof, said group consisting of rows in the central region of the lower half of the digitized character.

72. A method in accordance with claim 60 wherein step (1) includes the sub-steps of:

(1a) computing at least two differently directed histograms for said digitized character, (1b) computing a pair of difference strings for said digitized character by subtracting each element in each of said differently directed histograms from an adjacent element, (1c) changing the values of pairs of successive elements in each of said difference strings to minimize the effects of noise in said digitized character, thereby producing edited differently directed difference strings, (1d) deriving a list of magnitude and direction codes for a sequence of straight-line segments for each of the edited differently directed difference strings in accordance with the element values thereof, the direction of each straight-line segment being one of a predetermined relatively small number, (1e) inserting magnitude and direction codes for additional straight-line segments in each of said lists in accordance with the magnitude and direction codes for the straight-line segments derived in step (2d) to derive a composite list of straight-line segments whose direction codes change in a predetermined order which causes the successive straight-line segments in each list to represent bumps of alternating opposite convexities, and (1f) combining said lists to derive said set of numbers representative of the features of said digitized character.

73. A method in accordance with claim 72 wherein step (1) further includes the sub-step of:

(1g) computing each of a group of special feature numbers from said differently directed histograms in accordance with a respective formula, said group of special feature numbers being combined with said lists in sub-step (1f) to derive said set of numbers representative of the features of said digitized characters.

74. A method in accordance with claim 60 wherein step (1) includes the sub-steps of:

(1a) computing at least two differently directed histograms for said digitized character, (1b) computing a pair of lists of straight-line segments from respective ones of said differently directed histograms, the straight-line segments in said lists representing bumps of alternating opposite convexities conforming to the contour of said digitized character, (1c) computing each of a group of special feature numbers from said differently directed histograms in accordance with a respective formula, and (1d) combining the lists computed in step (1b) and the special feature numbers computed in step (1c) to derive said set of numbers representative of the features of said digitized character.

75. A method in accordance with claim 74 wherein the pairwise tests are included in a plurality of groups, the groups being associated with respective contour data sets and the pairwise tests included in the respective groups being those for discriminating between characters whose contour data features correspond to respective contour data sets, and in step (2) the only pairwise tests which are performed are those in the group for discriminating between characters whose contour data features correspond to the contour data set which is applicable to the contour data features represented by said vector.

76. A method in accordance with claim 75 wherein each of said groups of tests includes a test for discriminating between each possible pair of characters in said predetermined set whose contour data features correspond to the contour data set which is associated with the group.

77. A method in accordance with claim 76 wherein in step (3) the digitized character is recognized as being a particular character in said set only if during the performance of pairwise tests in step (2) the particular character passed a predetermined number of the tests in which it was one of the two in the test pair, and the pairwise tests are performed in step (2) in an order determined by the probabilities of occurrence of the characters to be discriminated to reduce the average number of pairwise tests which otherwise would be performed to recognize a character.

78. A method in accordance with claim 77 wherein each of the pairwise tests performed in step (2) is the computation of an optimal linear discriminant designed to distinguish between the two characters of the respective pair.

79. A method in accordance with claim 78 wherein in step (3) the character is recognized as being a particular character in said set only if during the performance of pairwise tests in step (2) the particular character passed a predetermined number of the tests in which it was one of the two in the test pair.

80. A method in accordance with claim 61 wherein for a group of pairwise tests the tests are performed in a sequence such that $T_{IJ}$ precedes $T_{RQ}$ if and only if $P_I > P_R$ for $I \neq R$ and $P_J > P_Q$ for $I = R$, where $T_{ij}$ represents a test for discriminating between character i and j, and $P_K$ represents the probability of character K being recognized from among all of the characters which are digitized and are discriminated by the pairwise tests in said group.

81. A method in accordance with claim 80 wherein in step (3) the character is recognized as being a particular character in said set only if during the performance of pairwise tests in step (2) the particular character passed a predetermined number of the tests in which it was one of the two in the test pair.

82. A method in accordance with claim 81 wherein said predetermined number is equal to the number of the tests in each of which the particular character was one of two in the test pair.

83. A method in accordance with claim 80 wherein the data for each pairwise test includes a plurality of weights to be used in computing a respective optimal linear discriminant, threshold values for enabling a character decision to be made after the optimal linear discriminant is computed, and pointer valves for indicating the data to be used for the next pairwise test in accordance with the character decision made at the end of the current test.

84. A method in accordance with claim 61 wherein the data for each pairwise test includes a plurality of weights to be used in computing a respective optimal linear discriminant, threshold values for enabling a character decision to be made after the optimal linear discriminant is computed, and pointer values for indicating the data to be used for the next pairwise test in accordance with the character decision made at the end of the current test.

85. A method in accordance with claim 60 wherein during the performance of each of the pairwise tests of step (2) only some of the elements of said vector are utilized, the elements representing contour data features as seen in directions from outside the dizitized character, the particular directions being dependent upon the pair of characters to be discriminated by the pairwise test to be performed.

86. A method in accordance with claim 55 wherein the pairwise tests are included in a plurality of groups, each group being associated with a respective group of characters which are known to have some features in common, the pairwise tests included in each group being those for discriminating between the characters having said common features, and in step (2) the pairwise tests in only one group are performed, said one group being that whose characters have the common features represented by the vector constructed in step (1).

87. A method in accordance with claim 86 wherein each of said groups of tests includes a test for discriminating between all possible pairs of characters associated with the group.

88. A method in accordance with claim 87 wherein in step (3) the character is recognized as being a particular character in said set only if during the performance of pairwise tests in step (2) the particular character passed a predetermined number of the tests in which it was one of the two in the test pair.

89. A method in accordance with claim 88 wherein said predetermined number is equal to the number of the tests in each of which the particular character was one of two in the test pair.

90. A method in accordance with claim 86 wherein in step (3) the digitized character is recognized as being a particular character in said set only if during the performance of pairwise tests in step (2) the particular character passed a predetermined number of the tests in which it was one of the two in the test pair, and the pairwise tests are performed in step (2) in an order determined by the probabilities of occurrence of the characters to be discriminated to reduce the average number of pairwise tests which otherwise would be performed to recognize a character.

91. A method in accordance with claim 86 wherein for a group of pairwise tests the tests are performed in a sequence such that $T_{IJ}$ precedes $T_{RQ}$ if and only if $P_I > P_R$ for $I \neq R$ and $P_J > P_Q$ for $I = R$, where $T_{ij}$ represents a test for discriminating between characters i and j, and $P_K$ represents the probability of character K being recognized from among all of the characters which are digitized and are discriminated by the pairwise tests in said group.

92. A method in accordance with claim 91 wherein the data for each pairwise test includes a plurality of weights to be used in computing a respective optimal linear discriminant, threshold values for enabling a character decision to be made after the optimal linear discriminant is computed, and pointer values for indicating the data to be used for the next pairwise test in accordance with the character decision made at the end of the current test.

93. A method in accordance with claim 55 wherein each of the pairwise tests performed in step (2) is the computation of an optimal linear discriminant designed to distinguish between the two characters of the respective pair.

94. A method in accordance with claim 55 wherein the data for each pairwise test includes a plurality of weights to be used in computing a respective optimal linear discriminant, threshold values for enabling a character decision to be made after the optimal linear discriminant is computed, and pointer values for indicating the data to be used for the next pairwise test in accordance with the character decision made at the end of the current test.

95. A method in accordance with claim 54 wherein each of the pairwise tests performed in step (2) is the computation of an optimal linear discriminant designed to distinguish between the two characters of the respective pair.

96. A method in accordance with claim 54 wherein the data for each pairwise test includes a plurality of weights to be used in computing a respective optimal linear discriminant, threshold values for enabling a character decision to be made after the optimal linear discriminant is computed, and pointer values for indicating the data to be used for the next pairwise test in accordance with the character decision made at the end of the current test.

97. A method in accordance with claim 54 wherein in step (3) the character is recognized as being a particular character in said set only if during the performance of pairwise tests in step (2) the particular character passed more of the tests in which it was one of the two in the test pair than any other character.

98. A method in accordance with claim 87 wherein the features of said digitized character which are represented by said vector include contour data for said digitized character as seen looking in at least two different directions from outside the digitized character.

99. A method in accordance with claim 98 wherein the pairwise tests are included in a plurality of groups, the groups being associated with respective contour data sets and the pairwise tests included in the respective groups being those for discriminating between characters whose contour data features correspond to respective contour data sets, and in step (2) the only pairwise tests which are performed are those in the group for discriminating between characters whose contour data features correspond to the contour data set which is applicable to the contour data features represented by said vector.

100. A method for using apparatus to design a machine program for recognizing a digitized character as being one of a predetermined group of characters comprising the steps of:

1. selecting a set of features for representing characteristics of a digitized character,
2. controlling said apparatus to compute the features of said set for each of a plurality of representative characters in said group,
3. controlling said apparatus to compute a set of discriminants and associated threshold values based on the sets of features computed in step (2) for said representative characters, each of said discriminants and associated threshold values being operative for discriminating between two character classes, and
4. establishing a sequence in which said set of discriminants should be used by a machine for the recognition of a character.

101. A method in accordance with claim 100 wherein prior to the execution of step (3) a plurality of sets of characteristics descriptive of a feature set are identified, and in step (3) a set of discriminants and associated threshold values is computed for each of the characteristic sets in said plurality for discriminating between the character classes whose feature sets exhibit the respective set of characteristics.

102. A method in accordance with claim 101 wherein said set of features includes a representation of contour data for a character, and said sets of characteristics are descriptive of contour data represented by a set of features.

103. A method to be practiced on a machine for recognizing a character as one of a predetermined set comprising the steps of:

1. controlling said machine to perform a plurality of pairwise tests each of which determines which of two character classes, if either, has the greater probability of containing the character to be recognized,
2. controlling said machine to terminate the performance of pairwise tests in step (1) when either
   a. each of said character classes has been determined not to have a greater probability than the other character class in at least one of the pairwise tests performed in which said each character class was one of the classes in the test, or
   b. one of said character classes has been determined to have a greater probability then the other character class in all of the pairwise tests in which said one character class is one of the classes in the test, and
3. controlling said machine to indicate a rejection of said character to be recognized when condition (a) is satisfied, and to indicate identification of said character to be recognized as being contained in said one character class when condition (b) is satisfied.

104. A method in accordance with claim 103 wherein said pairwise tests are performed in a sequence such that $T_{IJ}$ precedes $T_{RQ}$ if and only if $P_I > P_R$ for $I \neq R$ and $P_J > P_Q$ for $I = R$, where $T_{ij}$ represents a test for discriminating between character classes i and j, and $P_K$ represents the probability of character class K, as opposed to all other character classes, containing the character to be recognized.

105. A method in accordance with claim 104 wherein each of the tests performed in step (1) is the computation of a linear discriminant designed to distinguish between two character classes.

106. A method in accordance with claim 105 wherein the linear discriminant computed during each test performed in step (1) is a function of data representing external contour patterns of the character to be recognized.

107. A method in accordance with claim 103 wherein in step (1) two lists are maintained, the first being a list containing an entry for each character class, which entry is the number of pairwise tests performed in which said character class was the one of the two in the pair which was determined to have the greater probability of containing the character to be recognized, and the second being a list containing an entry for each character class, which entry is an indication of the performance of at least one test in which said character class was one of the two in the test pair and was not determined to have the greater probability of containing the character to be recognized, and said two lists are updated following the performance of each pairwise test, the presence of condition (a) is detected by observing an indication in said second list of an entry for each character class, and the presence of condition (b) is detected by observing a number for the entry for any character class in said first list which is equal to the number of pairwise tests which include said any character class as one of the two in the test pair.

108. A method in accordance with claim 107 wherein the tests performed in step (2) serves to discriminate between respective pairs of characters in said predetermined set relative to a character to be recognized.

109. A method in accordance with claim 108 wherein each of the tests performed in step (2) is the computation of a linear discriminant.

110. A method in accordance with claim 109 wherein in step (2) the character is recognized as being a particular character in said set if during the performance of the pairwise tests the associated character class passed a predetermined number of the tests in which it was one of the two in the test pair.

111. A method in accordance with claim 110 wherein the pairwise tests are performed in step (2) in an order determined by the probabilities of occurrence of the characters in said set to reduce the average number of pairwise tests which otherwise would be performed to recognize a character.

112. A method in accordance with claim 103 wherein the tests performed in step (2) serve to discriminate between respective pairs of characters in said predetermined set relative to said character to be recognized.

113. A method in accordance with claim 112 wherein each of the tests performed in step (2) is the computation of a linear discriminant.

114. A method in accordance with claim 113 wherein the pairwise tests are performed in step (2) in an order determined by the probabilities of occurrence of the characters in said set to reduce the average number of pairwise tests which otherwise would be performed to recognize a character.

115. A method in accordance with claim 103 wherein each of the tests performed in step (2) is the computation of a linear discriminant.

116. A method in accordance with claim 115 wherein the pairwise tests are performed in step (2) in an order determined by the probabilities of occurrence of the characters in said set to reduce the average number of pairwise tests which otherwise would be performed to recognize a character.

117. A method in accordance with claim 103 wherein the pairwise tests are performed in step (2) in an order determined by the probabilities of occurrence of the characters in said set to reduce the average number of pairwise tests which otherwise would be performed to recognize a character.

118. A method in accordance with claim 117 wherein in step (1) two lists are maintained, the first being a list containing an entry for each character class, which entry is the number of pairwise tests performed in which said character class was the one of the two in the pair which was determined to have the greater probability of containing the character to be recognized, and the second being a list containing an entry for each character class, which entry is an indication of the performance of at least one test in which said character class was one of the two in the test pair and was not determined to have the greater probability of containing the character to be recognized, and said two lists are updated following the performance of each pairwise test, the presence of condition (a) is detected by observing an indication in said second list of an entry for each character class, and the presence of condition (b) is detected by observing a number for the entry for any character class in said first list which is equal to the number of pairwise tests which include said any character class as one of the two in the test pair.

119. A method to be practiced on a machine for recognizing a character in digitized form as being one of a predetermined set of characters comprising the steps of:

1. controlling said machine to construct a vector whose elements represent features of said character,
2. controlling said machine to select one of a plurality of groups of machine tests to be performed on said character, each group of tests being associated with a sub-set of characters which are known to have a respective set of features in common and serving to discriminate between such characters, the respective set of features associated with each group of tests being a set of character contour features as seen looking from outside the character, the selected group being that whose associated set of features is represented by said vector elements, and
3. performing the machine tests in the selected group and recognizing the character in accordance with the tests results.

120. A method in accordance with claim 119 wherein said tests discriminate respective pairs of characters in the respective sub-set of characters.

121. A method in accordance with claim 120 wherein each of said tests is the computation of a linear discriminant.

122. A method in accordance with claim 120 wherein the pairwise tests are performed in step (3) in an order determined by the probabilities of occurrence of the characters in the sub-set associated with the selected test group to reduce the average number of pairwise tests which otherwise would be performed to recognize a character.

123. A method in accordance with claim 120 wherein the elements of the vector constructed in step (1) are non-binary, continuous measures of features of the character.

124. A method in accordance with claim 119 wherein the elements of the vector constructed in step (1) are non-binary, continuous measures of features of the character.

125. A method in accordance with claim 119 wherein the tests are performed in step (3) in an order determined by the probabilities of occurrence of the characters in the sub-set associated with the selected test group to reduce the average number of tests which otherwise would be performed to recognize a character.

126. A method in accordance with claim 119 wherein each of said tests is the computation of a linear discriminant.

127. A method in accordance with claim 119 wherein the elements of the vector constructed in step (1) are non-binary, continuous measures of features of the character.

128. A method to be practiced on a machine for recognizing a digitized character as being one of a predetermined set of characters comprising the steps of:

1. controlling said machine to construct a vector whose elements are non-binary, continuous measures of characteristics of said digitized character, and
2. controlling said machine to perform pairwise discriminant tests on said vector for recognizing said digitized character based on the results of the tests.

129. A method in accordance with claim 128 wherein said vector elements represent the numbers, shapes and locations of alternating bumps of opposite convexities as seen looking from outside said digitized character.

130. A method in accordance with claim 128 wherein each of the tests performed in step (2) is the computation of a linear discriminant designed to distinguish between two characters.

131. A method in accordance with claim 130 wherein the linear discriminant computed during each test performed in step (2) is a function of data representing external contour patterns of the character to be recognized.

* * * * *